(12) United States Patent
Claxton et al.

(10) Patent No.: US 7,177,839 B1
(45) Date of Patent: Feb. 13, 2007

(54) RELIANCE MANAGER FOR ELECTRONIC TRANSACTION SYSTEM

(75) Inventors: Allen Claxton, New York, NY (US); Charles T. Montgomery, Severna Park, MD (US); Marcel M. Yung, New York, NY (US); Richard Ankney, Chantilly, VA (US); Richard Salz, Boston, MA (US); Thomas Titchener, Boston, MA (US); Peter Lieberwirth, Boston, MA (US); Andrew Konstantaras, Boston, MA (US)

(73) Assignee: Certco, Inc., New York, NY (US)

( * ) Notice: Subject to any disclaimer, the term of this patent is extended or adjusted under 35 U.S.C. 154(b) by 0 days.

(21) Appl. No.: 09/492,459

(22) Filed: Jan. 27, 2000

Related U.S. Application Data

(63) Continuation of application No. 09/206,381, filed on Dec. 7, 1998, now abandoned, and a continuation of application No. 09/026,466, filed on Feb. 19, 1998, now Pat. No. 6,353,812, which is a continuation of application No. 08/767,257, filed on Dec. 13, 1996, now Pat. No. 5,903,882.

(60) Provisional application No. 60/118,379, filed on Jan. 29, 1999, now abandoned.

(51) Int. Cl.
*G06Q 40/00* (2006.01)

(52) U.S. Cl. .................................. 705/44; 713/156

(58) Field of Classification Search .................. 705/17, 705/44, 76, 64, 75, 78; 713/156; 707/9; 235/379, 380
See application file for complete search history.

(56) References Cited

U.S. PATENT DOCUMENTS

| 5,903,882 A | * | 5/1999 | Asay et al. ............ 705/44 |
| 6,353,812 B2 | * | 3/2002 | Frankel et al. ......... 705/44 |

FOREIGN PATENT DOCUMENTS

| WO | WO 96/31965 | 10/1996 |
| WO | WO 98/26385 | 6/1998 |

OTHER PUBLICATIONS

International Search Report, dated Jul. 4, 2000 for PCT Application No. PCT/US00/02013.

* cited by examiner

*Primary Examiner*—Hani M. Kazimi
(74) *Attorney, Agent, or Firm*—Pillsbury Winthrop Shaw Pittman LLP

(57) ABSTRACT

An electronic transaction system includes an authority issuing electronic signals representing subscriber assurance of an attribute of a subscriber to the system; and a reliance server obtaining electronic signals representing information regarding the subscriber assurance issued by the issuing authority, the reliance server issuing electronic signals representing a signed warranty offer to a relying party, the signed warranty offer being based at least on the subscriber attribute assurance, wherein the reliance server only provides the signed warranty offer if the relying party is authorized to make a request for said warranty.

33 Claims, 30 Drawing Sheets

US 7,177,839 B1

RELIANCE MANAGER FOR ELECTRONIC TRANSACTION SYSTEM

RELATED APPLICATIONS

This application relies for priority on U.S. Provisional Patent Application No. 60/118,379, titled "Reliance Manager," filed Jan. 29, 1999 (now abandoned), the contents of which are incorporated herein by reference. This application is also a continuation application of U.S. patent application Ser. No. 09/206,381, titled "Reliance Server For Electronic Transaction System." filed Dec. 7, 1998 (now abandoned), which is a continuation application of U.S. patent application Ser. No. 08/767,257 filed Dec. 13, 1996 (now U.S. Pat. No. 5,903,882), the contents of which are incorporated herein by reference. Additionally, the application is a continuation of U.S. patent application Ser. No. 09/026,466, titled "Computer-Based Method And System For Aiding Transactions," filed Feb. 19, 1998 (now U.S. Pat. No. 6,353,812), the contents of which are incorporated herein by reference.

FIELD OF THE INVENTION

This invention relates to electronic transactions, and, more particularly, to services supporting reliance in an electronic transaction system.

BACKGROUND

Systems for accomplishing business transactions electronically are becoming increasingly widespread, partly because of the advent of global computer networks such as the Internet, and partly because of the evolution and maturity of public key cryptography, which enhances the security of such commerce.

To use secure electronic commerce according to the conventional methods, each user has a pair of related keys, namely a private key (to be kept secret by the user) and a public key (which can be known by anyone without compromising the secrecy of the corresponding private key). Using a particular public key, an algorithm can determine whether the corresponding private key was used to sign or authenticate a given message.

A public key is simply a value (generally a number), and has no intrinsic association with anyone, including the person whose message it is to authenticate. Widespread, commercial use of digital signatures requires reliable information associating public keys with identified persons. Messages of those identified persons can then be authenticated using the keys.

Digital signature certificates (sometimes also called public key certificates or simply certificates) meet this need. These certificates are generally issued by trusted third parties known as certification authorities (CAs) and they certify (1) that the issuing certification authority has identified the subject of the certificate (often according to specifications delineated in a certification practice statement), and (2) that a specified public key (in the certificate) corresponds to the a private key held by the subject of the certificate.

In order to assure that a certificate's authenticity can be subsequently verified, the certification authority digitally signs the certificate when issuing it. The issuing certification authority's digital signature can itself be verified by reference to a public key (the certification authority's public key), which is associated with the certification authority in another certificate issued by a second certification authority to the first certification authority. That other certification authority's digital signature can be verifiable by a public key listed in yet another certificate, and so on along a chain of certificates until one reaches a so-called root or prime certification authority whose public key is widely and reliably distributed. For maximum assurance of the authenticity of a certificate relied upon in a transaction, the relying party must, using conventional methods, verify each certificate in the chain.

Most legal systems treat a certificate as a representation, finding, or conclusion made pursuant to a contract between the issuing certification authority and the subscriber, i.e., the person identified in the certificate as the holder of the private key corresponding to the public key listed in the certificate. Persons other than the subscriber may rely on the certificate. The certification authority's duties in relation to those relying parties may stem from rules governing representations or false statements, rules treating the relying party as a third-party beneficiary of the contract between the certification authority and subscriber, statutes governing digital signatures, or a blend of all of the above as well as perhaps additional legal principles.

Often, a party's right to rely on a certificate is limited. In the law applicable to misrepresentations, for example, reliance is generally required to be reasonable. Further, reliance on some certificates is specified to be per se unreliable. A bright line separates certain classes of clearly unreliable certificates from all others, and a relying party relies on them at its own peril, without recourse against the issuing certification authority or subscriber for a defect in the certificate. Certificates that are per se unreliable are conventionally termed invalid, and may include any certificate which:

(1) Has expired (i.e., the time of reliance is later than the date specified in the certificate for its expiration);
(2) Has been revoked (i.e., have been declared permanently invalid by the certification authority which issued the certificate); and
(3) Is suspended at the time of reliance (i.e. has been declared temporarily invalid by the certification authority which issued the certificate).

In addition, a certificate which has not been accepted by its subscriber or issued by a certification authority should not be considered to have taken effect, and could, perhaps rather loosely, be considered invalid.

Suspending and/or revoking certificates are an important means of minimizing the consequences of errors by the certification authority or subscriber. Depending on applicable legal rules, a certification authority may avert further loss due to inaccuracy in the certificate by revoking it. A subscriber can revoke a certificate to prevent reliance on forged digital signatures created using a compromised, e.g., lost or stolen, private key. Certificates which become invalid by revocation are generally listed in a certificate revocation list (CRL), according one standard, for example ITU X.509. Suspension, or temporary invalidation, was not contemplated in ITU X.509, and may or may not be included in the CRL. Certificates which become invalid by virtue of their age need not be listed in a CRL because each certificate contains its own expiration date.

As a practical matter, the conventional CRL-based system works as follows. Before a subscriber can create a verifiable digital signature, the signer must arrange for a certification authority to issue a certificate identifying the subscriber with the subscriber's public key. The subscriber receives back and accepts the issued certificate, and then creates digital signatures and attaches a copy of the certificate to each of them. When the other party to a transaction receives such a digital signature, the other party must check with the certification authority, generally via its on-line database, to determine whether the certificate is currently valid. If so, and if the digital signature can be verified by the public key in the certificate, the party is usually in a strong position to rely on the digital signature.

Existing, conventional systems have several deficiencies, including:

Little support for risk management: The conventional system provides very few facilities or opportunities to enable a certification authority to manage the risk of certification. The certification authority is not informed when anyone relies on a certificate that the certification authority has issued or the extent to which anyone relies on any certificate it has issued. The certification authority also has no way of monitoring outstanding certificates, ascertaining whether problems arise, evaluating which factors affect the risk of faulty certification or the scope of exposure to risk that the certification authority should prudently undertake. Furthermore, conventional systems provide few facilities to help subscribers and relying parties manage their risks, including the risk of keeping the private key secure.

Relying party is under-served: To a great extent, it is the relying party, not the subscriber, who bears the risk of fraud or forgery in the transaction.

If a document is forged or is fraudulently altered, the relying party will suffer the consequences, which, according to the law of most states, is that the message is treated as void. Although the relying party has the keenest interest in the information security of the transaction, the certification authority's service contract is entirely with the subscriber. In the case of a fraud or forgery, the subscriber may even be the perpetrator. The roles of the conventional system thus set the certification authority up to deal with relatively disinterested parties or even perpetrators in problem cases, but to have no contact with the party who primarily bears the loss. This state of affairs exposes the certification authority to serious liability risks in relation to the relying party and causes the certification authority to forgo the business opportunity of serving the relying party. Rather than dealing exclusively with the subscriber, the digital signature infrastructure also needs a way of dealing with the relying party.

Cost front-loaded onto subscriber: Since the certification authority's contract is with the subscriber alone, not with the relying party, the certification authority has no alternative but to recover all costs and profit from the subscriber, even though, as previously noted, the relying party has the principal interest in the security of the signed message.

Lack of robustness: Because the conventional system fails to address risk management and the needs of relying parties, certification authorities have tended to interpret their roles narrowly. A certification authority may, for example, promise to look by rote at an apparent driver's license, or accept at face value a notarized application for certification, without purposefully endeavoring to serve the real business need for certification, which is to assure the expectations of the parties to the transaction. This mechanical approach to certification limits the potential for CAs to add further value to electronic commerce transactions. A more robust system needs to be serviceable for certifying authorization, accreditation, legal status of a juridical entity, and credit, for example.

BRIEF DESCRIPTION OF THE DRAWINGS

The objects and advantages of the invention will be apparent upon consideration of the following detailed description, taken in conjunction with the accompanying drawings, in which the reference characters refer to like parts throughout and in which.

DETAILED DESCRIPTION OF PRESENTLY PREFERRED EXEMPLARY EMBODIMENTS

Introduction

Figure 1:
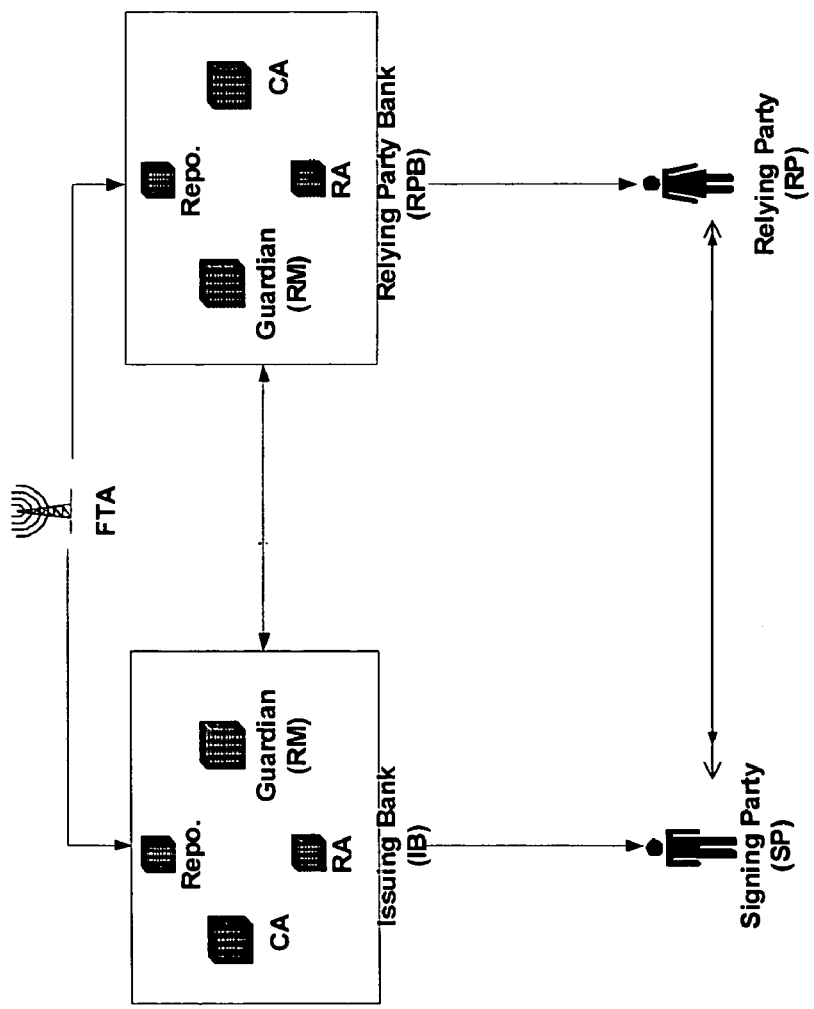
FIG. 1 depicts an overview of components of embodiments of this invention.

An overview of components of this invention is provided with reference to the diagram in FIG. 1. This invention provides a reliance manager (RM) system that enables a Certification Authority (CA) to monitor transactional risk associated with certificates it has issued. In a preferred embodiment, the RM services of the present invention could be implemented within and by a organization of Participating Financial Institutions (PFIs) referred to as a Financial Trust Authority (FTA).

As used herein, a reliance manager (RM) is a general term for the assurance, certificate status, and assurance management services. The RM according to the present invention works within a public key infrastructure (PKI) hierarchy. A Certificate Authority (CA) generally refers to an application that signs and issues certificates. The PKI includes CAs for the itself and for each of the level-one PFI's (banks) in the FTA. In the PKI according to the present invention, a bank (Issuing Bank, IB) issues transaction based liability certificates (TBL Certificates) to entities, e.g., end users (Signing Party, SP). Policies and rules associated with these certificates define what any party receiving a signed message with a TBL Certificate (a Relying Party, RP) must do to obtain assurance associated with the transaction embodied in the signed message. Assurance is the liability protection that the Relying Party (RP) wants with respect to the transaction. Assurance is generally limited to direct damages that the Relying Party (RP) will suffer if information (usually identity information or status information) contained within the TBL Certificate is incorrect or inaccurate, although any type of assurance can be given and is considered within the scope of this invention.

The various entities involved in the operation of the present invention are briefly described with reference to FIG. 1.

Participating Financial Institution (PFI) Issuing Bank (Issuing Bank) provides certification and assurance services to various entities such as corporations and their employees/designees. Certification services include Registration Authority (RA) services, certificate issuance and certificate management. Assurance services include certificate validation and certificate information guarantees/assurance.

Figure 2:
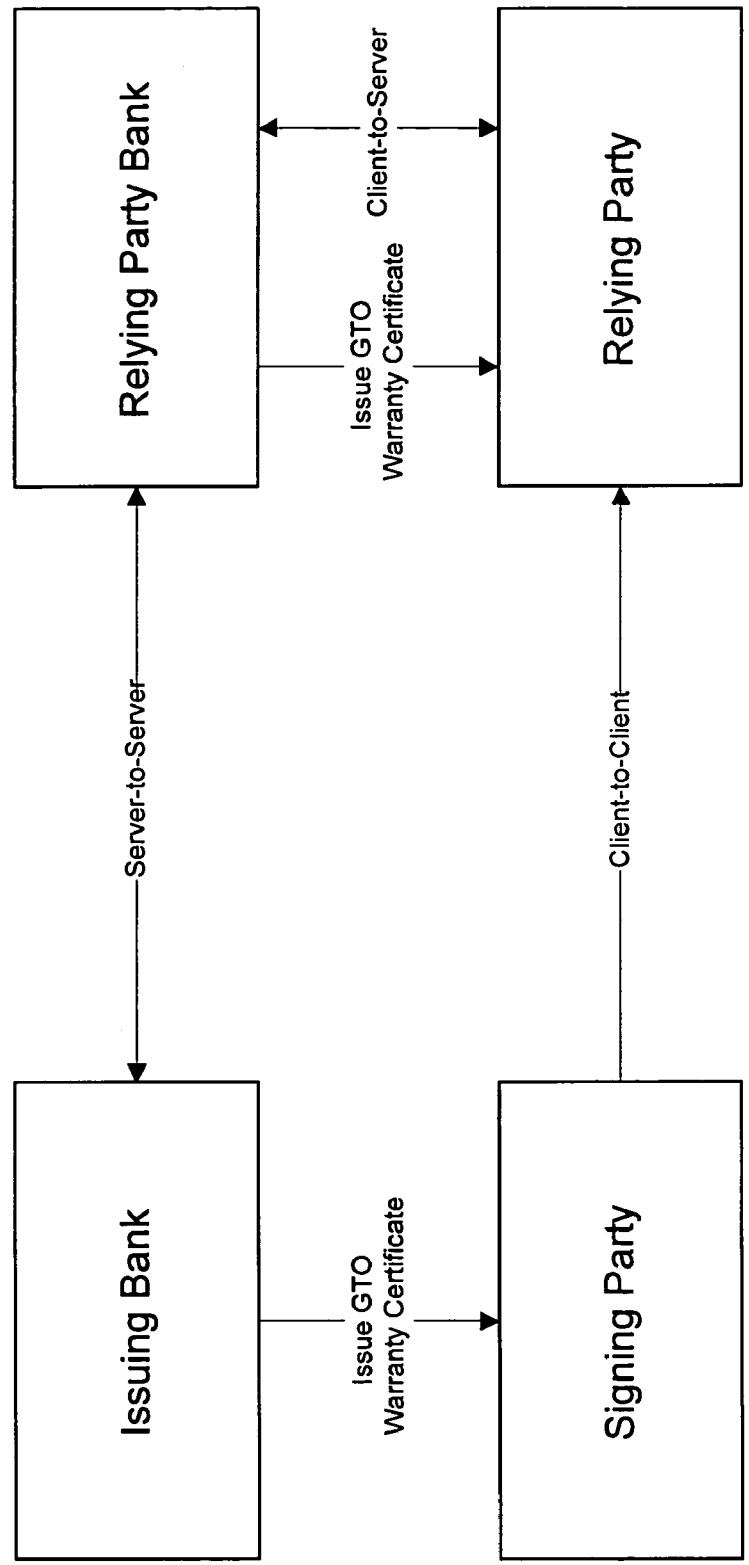
FIG. 2 depicts the four corner model example according to embodiments of this invention.

With respect to the four-corner model example of FIGS. 1–2, the Issuing Bank (IB) is the bank that issues the subscribers' certificates—i.e., a certificate for which a relying party may request assurance—and which responds to assurance requests from a relying party bank RM server. Note that banks will generally implement both issuing and relying party roles.

PFI Issuer Certificate Authority (CA) issues certificates to various entities, usually an institution's subscribers. A Subscriber is generally an end-user for whom an Issuing Bank has created a subscriber, or transaction bearing liability (TBL) certificate. A subscriber engages in an on-line transaction with a relying party by signing a contract and sending the subscriber's TBL certificate. A subscriber is sometimes also referred to as a Signing Party.

The CA may issue multiple types of certificates, as determined by usage, including Transaction Based Liability (TBL) certificates and utility (Secure Socket Layer, SSL) certificates. A Transaction Based (or Bearing) Liability Certificate (TBL) is, e.g., a certificate used under the PKI for identity warranty. That is, TBL Certificates (also known as a Warranty Certificates and Attribute Certificates) certificates given by an issuing bank to its subscribers. It is the certificate given by banks to their end users that implements the certificate profiles specified by the architecture. RM clients use their private keys and their warranty certificates to sign and certify identity warranty and certificate status request messages.

An Attribute Certificate is a certificate that contains additional information about the RM client that may be used in a transaction and can be part of an assurance request. An example of attribute certificates are certificates described in U.S. Pat. No. 5,659,616, issued Aug. 19, 1997, titled "Method For Securely Using Digital Signatures In A Commercial Cryptographic System," which is incorporated herein by reference.

A Utility Certificate is a certificate issued for some use other than Certificate Status or Identity Warranty Service messages, e.g., SSL client and server certificates.

PFI Repository (Repo. in FIG. 1) stores and provides updated certificate status information to relying party banks through the Guardian/RM. A Repository refers generally to the service or application to which CAs publish certificates. Typically there is one repository for each CA, although there may be more than one per CA and CAs may share repositories. A repository service validates that a CA published a certificate and it says whether the certificate has been revoked or not. The RM server for a given bank speaks directly with the Repositories for the bank and for the root CA. Communication with Repositories of other banks is channeled through the other bank's RM. RP clients also access the services of their bank's Repository (and of other bank Repositories) through their bank's RM. Repositories respond to requests for certificate status and for the certificates and certificate revocation lists (CRLs) themselves, sometimes called a CertRepository.

A Signing Party (Signing Party, SP) is an entity, e.g., an employee of a corporation that receives a TBL Certificate from an Issuing Bank. Each Signing Party may also be assigned an assurance limit, which could be a portion of the assurance limit granted by the PFI to the corporation. Generally, a Signing Party (SP), with respect to the four-corner model (see FIG. 1), a warranty certificate holder whose bank maintains an identity warranty account for administering identity warranties, which can be purchased by Relying Parties.

The Guardian (RM) Server (Guardian (RM)) stores and provides access to information about assurance authorization and limits for all PFI's subscribers.

PFI Relying Party Bank (RPB) provides assurance services to Relying Parties. In preferred embodiments, RPB provides RP's only access point to the trust hierarchy. The Relying Party Bank (RPB), with respect to the four-corner model (see FIGS. 1–2), is generally the bank that responds to identity warranty service and certificate status requests from Relying Party clients. That is, the RPB is the bank that issues the relying party certificate—i.e., a certificate that a relying party uses to identify itself when it sends assurance and certificate status requests to its bank—and which responds to assurance requests from a relying party client. As noted above, banks will generally implement both issuing and relying party roles.

Relying Party (RP) is an entity, e.g., an employee of a corporation that has been issued a certificate from a RPB and therefore has the right to seek assurance on individual signed transactions from Signing Parties. (A Signed Transaction generally refers to a CMS SignedData message (described below) that contains the business agreement as payload and content type, content message digest, signing certificate, signing time, and signer contract as authenticated attributes.) Generally, a Relying Party (RP), with respect to the four-corner model (see FIG. 1), is a warranty certificate holder who issues certificate status and identity warranty requests to its Relying Party Bank. Requests are made with respect to a Signing Party's certificate and a Signing Party-signed document. In other words, a Relying Party is an RM client who issues assurance and certificate status requests to his Relying Party Bank. A relying party issues assurance and certificate status requests with respect to a subscriber's certificate.

The Guardian (RM) Administrator manages Identity Warranty accounts and monitors the status of the Guardian (RM) services. Each Guardian (RM) has a local database that contains records for all transactions: Identity Warranty, certificates status and account management. The Guardian (RM) Administrator can run reports on data collected in the database. The various databases are described in greater detail in the section titled "Database Design" below.

Note that the various components of FIG. 1 describe and define a so-called "four corner" model, the "corners" being defined by the issuing bank, the relying party bank, the relying party and the signing party.

The RM according to the present invention provides a comprehensive solution for managing the risk exposure associated with the use of digital certificates. It enables financial institutions to offer their corporate customers financially backed warranties on certificate-based information. It provides various services, including Identity Warranty Service and Certificate Status Service (described below), for Relying Parties who wish to engage in Internet transactions. The present invention also provides Identity Warranty Management Services for the RM administrator.

Identity Warranty Service—The service that guarantees the identity of a Signing Party certificate for a contract signed by the Signing Party's private key against a monetary amount of proven losses by the Relying Party. A Relying Party makes warranty requests to the Guardian (RM) at its bank (Relying Party Bank or RPB). Guardian (RM) will then validate the Relying Party's certificate, then issue an assurance request to Guardian (RM) identified in the TBL Certificate for which assurance is being sought. The Guardian (RM) receiving this request validates the TBL Certificate and then makes a determination as to whether assurance is to be granted. The assurance response is digitally signed by the Issuing Bank and sent to the RPB. The RPB in turn signs the assurance response and sends it to its customer, the Relying Party. Under the policies and contractual terms (System Rules) associated with TBL Certificates, a Relying Party cannot place any legal reliance (and therefore no liability) upon a TBL Certificate unless it has received a grant of assurance signed by its RPB in accordance with the System Rules. This requirement allows an Issuing Bank to manage risk associated with certificates on a transaction-by-transaction basis.

Certificate Status Service—The service that provides status of an Identity Warranty Certificate in response to OCSP requests.

Identity Warranty Management Service—The service that allows Guardian (RM) administrators to manage Identity Warranty accounts, manage Guardian (RM) operation, and monitor the status of Guardian (RM) services.

In preferred embodiments, all messages are encoded using Cryptograpic Message Syntax (CMS) (an IETF standard for signing (and sealing) documents) and all are transported via HTTP over SSL. Reports are transported over SSL only. SSL is a transport-level security facility that can be configured to provide various levels of privacy and authentication, including authentication of the server to the client and of the client to the server. SSL is presently being finalized as an IETF standard as "Transport-Level Security" or TLS.

CMS is defined in IETF RFC2630, published Jul. 12, 1999, ("ftp://ftp.ietf.org/rfc/rfc2630.txt") which is incorporated herein by reference.

The system may be configured under appropriate System Rules to operate, for example, as a three-corner model where an institution provides all the services for relying parties and signing parties. Equally, the System Rules could be formulated and the system configured to allow a participating institution change any parameters in the assurance offer to increase or limit the types of assurance offered. The system can be configured to allow an Issuing Bank to manage risk associated with certificates on a transaction-by-transaction basis or by groups of transactions.

Overview

The RM facility provides four client services: Identity Warranty with Offer and Accept messages, Identity Warranty without Offer and Accept messages, Certificate Status, and Identity Warranty Management. RM clients and servers function within the context of the PKI.

Client Services

The client services are implemented in the context of the "four-corner" model (FIGS. 1–2).

In this model, the Issuing Bank CA creates Warranty and Utility certificates for the Signing Party private keys. The Relying Party Bank CA creates Warranty and Utility certificates for the Relying Party private keys. The Signing Party and Relying Party private keys and certificates are preferably delivered and maintained in a secure manner such as on smart cards.

The Signing Party uses its Warranty Certificate private key to sign a business agreement, which it sends to the Relying Party. The business agreement covered by the Signing Party Warranty Certificate signature includes the contract itself and several Identity Warranty parameters, which qualify the Relying Party's purchase of an Identity Warranty. In addition to the business agreement and signature, the Signing Party sends its Warranty Certificate chain (Warranty Certificate, Issuing Bank CA Certificate, Root CA Certificate).

Note that the Signing Party's Warranty Certificate and private key are only used to protect the business agreement. For SSL and other applications, the Signing Party and Relying Party use their Utility Certificate and private key, which are designed to include no certificate extension that would cause the Certificate to fail generic validation procedures.

A Relying Party who receives a business agreement uses its own Warranty Certificate private key to sign the Identity Warranty Request and Acceptance messages it sends to its Relying Party Bank (RPB) RM.

The Request message includes a checksum for the contract, as the details of the contract are not of concern to the RPB RM. The Request includes the checksum, the Signing Party parameters and attributes, and the Signing Party signature so that the RPB and IB RM servers can verify the binding between the Signing Party signature, the contract, and the parameters. The Request also includes a RP signature for the message as a whole, and the SP and RP Certificate chains, so the RPB RM and IB RM can verify the signatures and the status of the RP and SP certificates.

The Relying Party uses its Utility Certificate and private key for its SSL client identity when challenged for a certificate by the RPB RM.

Identity Warranty Service with Offer and Acceptance Messages

Figure 3:
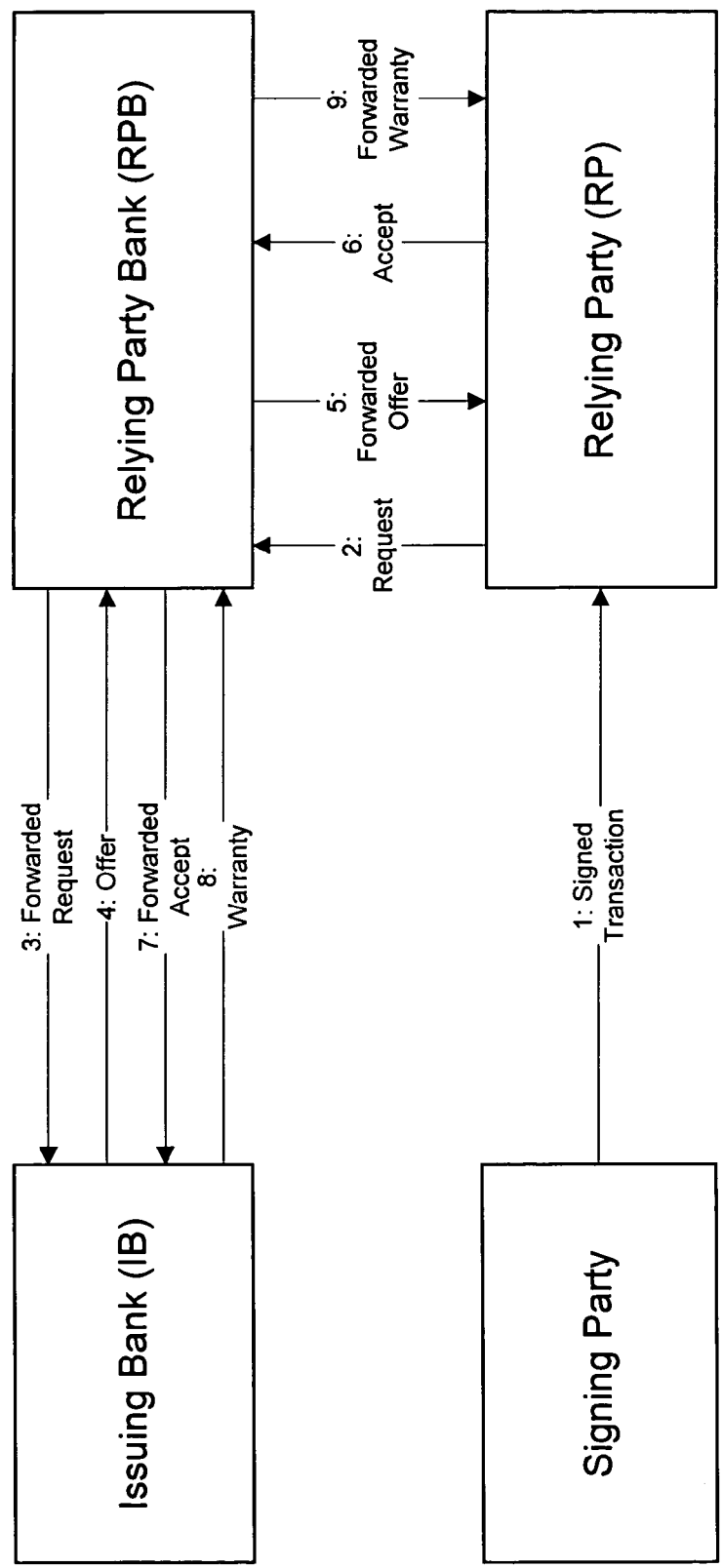
FIGS. 3–4 depict the processing for obtaining an Identity Warranty according to various embodiments of the present invention.

The processing for obtaining an Identity Warranty, with reference to FIG. 3, is as follows:

1. A Relying Party receives a signed transaction.
2. The Relying Party (preferably using some mechanism, e.g., software, provided by the Relying Party Bank) sends a Request for an Offer for a Warranty on the signed transaction.
3. The Relying Party Bank, operating a Reliance Manager system, determines whether to authorize the Relying Party Request. On the basis of the information contained in the Signing Party certificate, the Relying Party's Bank, operating a Reliance Manager system, forwards the Request to the Signing Party's Issuing Bank, which is responsible for the Signing Party's certificate.
4. The Signing Party's bank, i.e., the Issuing Bank, also operating a Reliance Manager system, determines whether to disburse the requested amount of Identity Warranty and sends an Offer for the Identity Warranty or an Error to the Relying Party Bank. The Offer includes an expiration date.
5. The Relying Party Bank updates the Offer and transmits it to the Relying Party. It may assess additional fees for certain value-added services it provides to the Relying Party.

6. The Relying Party chooses to accept or not to accept the Offer and sends an Acceptance message to the Relying Party Bank.
7. The Relying Party Bank determines a second time whether to authorize the Relying Party Request, commits the transaction, and forwards the Acceptance message to the Signing Party's Issuing Bank.
8. If the offer is still valid, the Issuing Bank determines a second time whether to disburse the requested amount of Identity Warranty, disburses the Identity Warranty amount from the Signing Party's Identity Warranty account (or refuses to disburse the amount) and returns the Warranty to the Relying Party Bank.
9. The Relying Party Bank updates the Warranty and forwards it to the Relying Party.

Identity Warranty Service without Offer and Acceptance Messages

Figure 4:
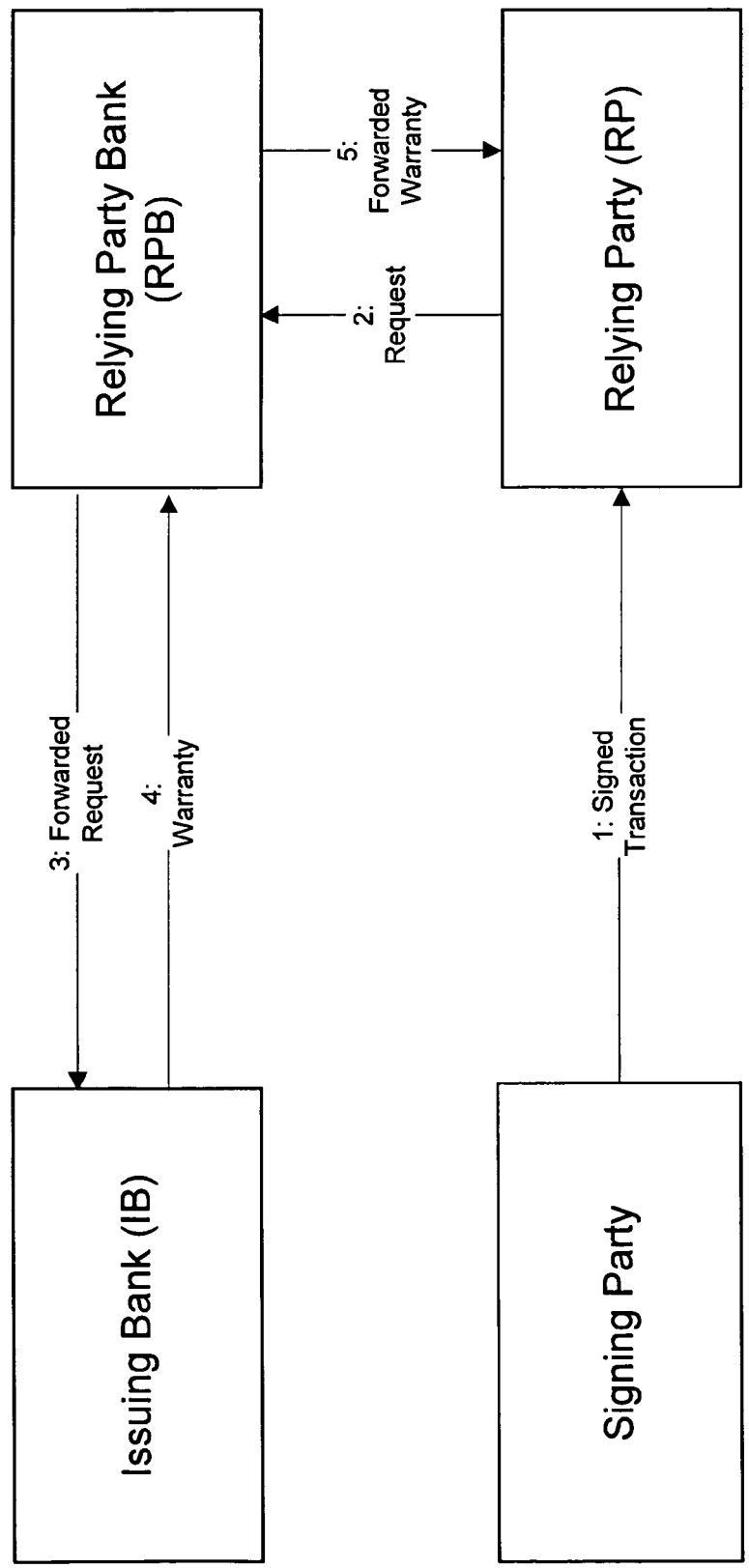

Alternately, as shown in FIG. 4, the Relying Party may choose to avoid the Offer and Acceptance messages and immediately commit the Request. Note that in this version of the protocol, the Relying Party accepts the Identity Warranty fee without knowing ahead of time exactly what the fee will be. The single round-trip version of the protocol makes the most sense when the Signing Party agrees to be charged for the Identity Warranty.

1. A Relying Party receives a signed transaction.
2. The Relying Party sends a request for an Identity Warranty on the contract from the Relying Party Bank.
3. The Relying Party Bank, operating a Reliance Manager system, determines whether to authorize the Relying Party Request. On the basis of the information contained in a certificate, the Relying Party's Bank, operating a Reliance Manager system, communicates with the Signing Party's Issuing Bank, which is responsible for the Signing Party's certificate.
4. The Signing Party's bank, also operating a Reliance Manager system, determines whether to disburse the requested amount of identity warranty, disburses the amount (or refuses to disburse the amount) immediately, and transmits a Warranty or Error to the Relying Party Bank.
5. The Relying Party Bank updates the Warranty and forwards it to the Relying Party. It may assess additional fees for certain value-added services it provides to the Relying Party.

Certificate Status Service

Figure 5:
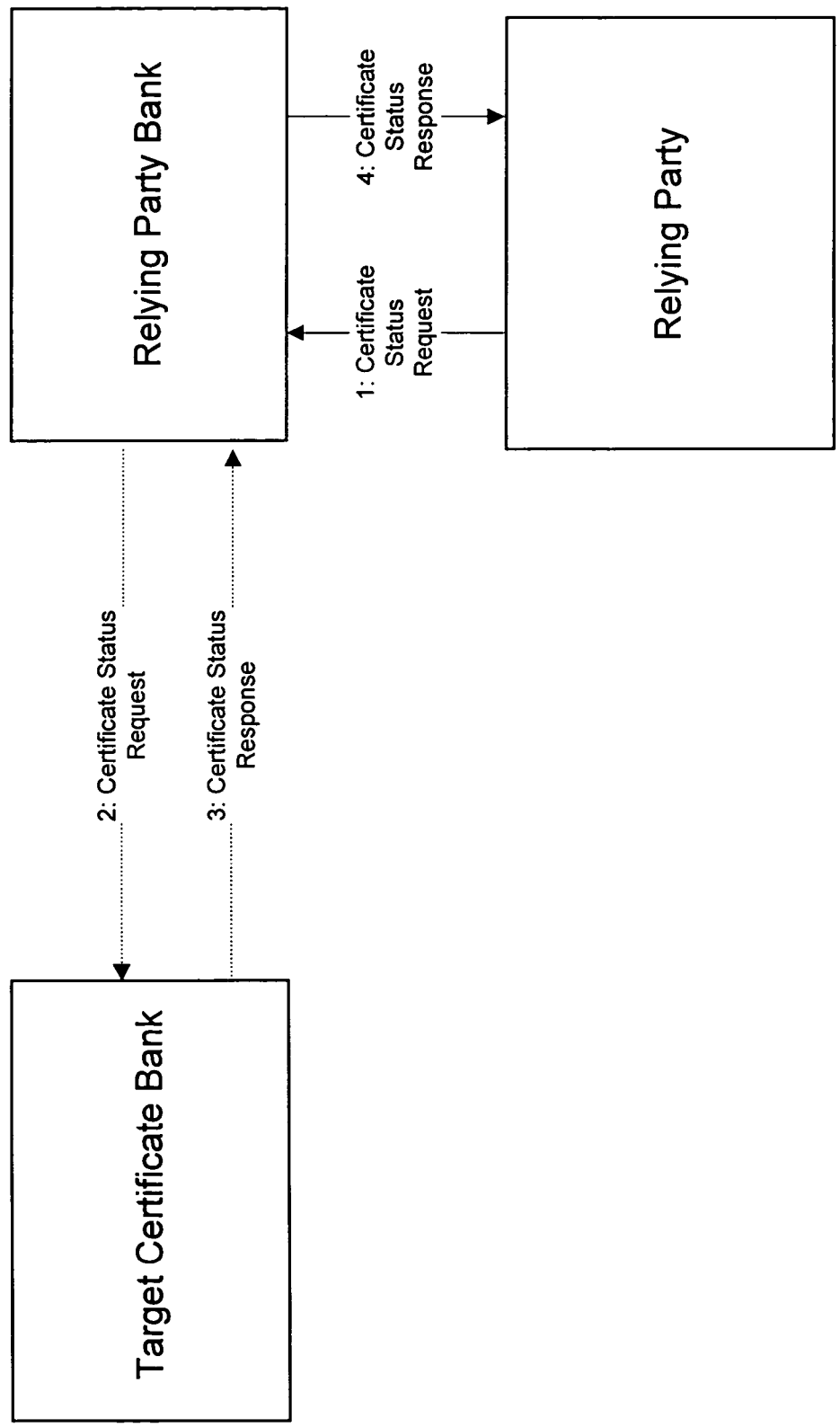
FIG. 5 depicts the processing for the certificate status service according to embodiments of this invention.

A Relying Party may also check with its Relying Party Bank to verify the status of certificates in the certificate chain for a warranty certificate. FIG. 5 depicts the processing for the certificate status service according to embodiments of this invention:

1. The Relying Party sends a certificate status request to the RM server at its Relying Party bank.
2. If the certificate in the message was issued by the Relying Party bank, then the Relying Party bank RM server checks the status of the certificate itself and sends the response to the Relying Party.
3. If the certificate in the message was issued by a different bank ("Target Certificate Bank" in FIG. 5), then the Relying Party bank creates and sends a certificate status request to the Target Certificate Bank RM server on behalf of the Relying Party. The Target Certificate Bank RM server checks the status of the certificate and sends the response back to the Relying Party Bank, which resigns and sends the response to the Relying Party on behalf of the Target Certificate Bank.

Identity Warranty Management Service

Figure 6:
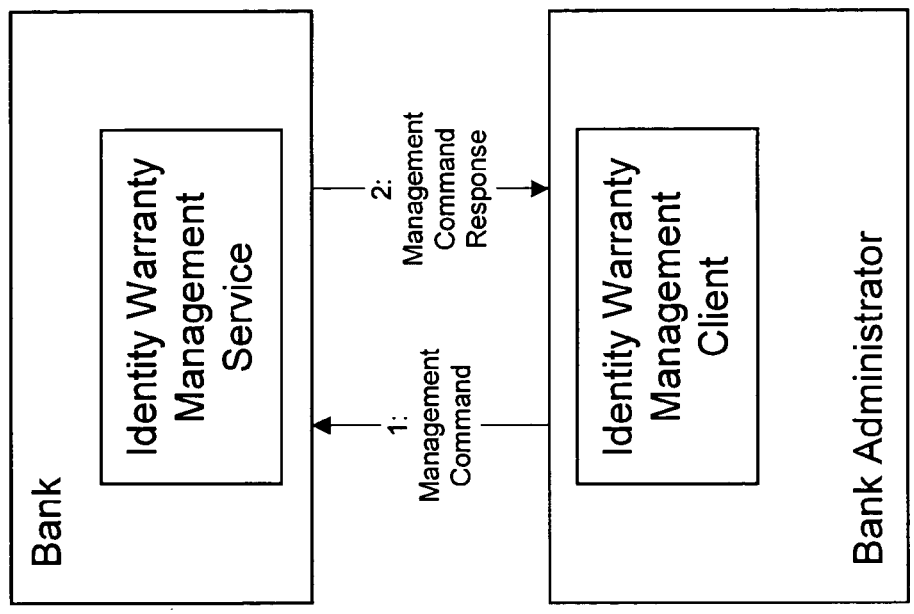
FIG. 6 provides an overview of identity warranty management services according to the present invention.

FIG. 6 provides an overview of identity warranty management services according to the present invention. Each RM server has a local database that contains information about its Identity Warranty accounts. The database also contains records for all transactions: identity warranty, certificate status, account management (e.g., create account, modify account, etc.). RM administrators manage Identity Warranty accounts and monitor the status of RM services through the Identity Warranty Management Service.

All commands are implemented to work within the same framework as a Relying Party client. One example would be from a COTS browser with signing plugin, using an administration version of the plugin, which knows about the administration command and response formats. RM servers export their management interfaces through fixed URLs. RM administrators are issued warranty certificates on smart cards.

When the RM server is first installed, the installer initializes the authorization database to permit access to one RM administrator. The RM administrator inserts his or her smart card in a PC and downloads one of the administration forms (e.g., create new Relying Party) from the RM server, possibly downloading and installing the RM administration plugin in the process. The RM administrator fills out the form and presses the "submit" button. The plugin collects the administrators certificate chain, generates and signs the administration command, and sends the command to the RM server. Then it parses, validates, and displays the response.

Management commands fall into two categories: commands to manage accounts, commands to monitor RM services. Account management commands affect sensitive data such as identity warranty limits. RM servers apply authorization checks for account management commands and require approval of multiple administrators, each signing the request with his/her own warranty certificate before carrying out an actual update to the target account.

Service monitoring commands generate reports listing the status of RM services: e.g., return a list of all identity warranty transactions since 8:00 AM, return a list of all accounts with identity warranty balance equal to identity warranty limit, etc. Unlike account management commands, service monitoring commands do not require approval of multiple RM administrators, although they are verified against the same authorization database.

Given that the nature of reports is likely to vary from bank to bank, the RM server implements an extensible design that banks may easily install customized reports. Service monitoring commands (a.k.a. report generation) are implemented as HTTP POST/RESPONSE messages against HTTPS URLs and authorized against the client's SSL identity (Utility Certificate).

In addition, each RM server implements a local management interface using the resources of the local host system. As the server is initially implemented on Windows/NT, the RM server runs as a Windows/NT service and uses the Windows/NT services control panel to start, stop, and suspend operation. However, instead of using the Windows/NT log services, the RM servers implement their own, cryptographically-protected log files. The log files record information related to the status of the server application itself, especially including utilization of system resources and network connectivity.

The RM servers log significant service events, such as the periodic status of Identity Warranty levels or depletion of Identity Warranty resources (and etc., as determined by experience). This provides a server-activated path for quick response, e.g., via a bank-specific process that continually scans the log and activates a bank-specific alert or alarm when it detects a significant event.

Logging

RM servers log protocol messages and database transactions. The signatures in protocol messages provide non-repudiation proof of communicating partner and local server actions. The RM server logs Identity Warranty messages it receives from RP clients and from other RM servers. The RM server logs Identity Warranty messages it generates itself. The RM server also logs Certificate Status (OCSP) messages it receives from OCSP responders: the local Repository, the Repository, other RM servers. Protocol messages are logged to the local file system. The logging system uses the logging private key to sign individual entries and to sign the series of entries for protection against deleted entries. Although administrators will be able to view log entries remotely, the entries themselves are mainly of value for claims processing.

Database transactions (e.g., create Identity Warranty Account, update Identity Warranty account warranty balance, update Identity Warranty account warranty limit) are logged to database tables. These logs are used to generate billing records and to monitor and manage the distribution of resources such as the total value of all active identity warranties. Database logs are protected by the same mechanisms as the database as a whole, which is to say by database-specific configurations such as restricting access to database tables to stored procedures and limiting the database administrator accounts to the account used by the RM server.

Customization

RM servers provide for integration with bank-specific authorization and currency conversion procedures. To customize an RM server so that it invokes a bank-specific risk management procedure, the RM installer adds a bank-supplied library to the RM configuration. After executing the local authorization procedure, the RM server invokes the bank-supplied procedure through the library. RM servers invoke bank-supplied procedures for authorizing:

1. Request,
2. Forwarded Request,
3. Acceptance,
4. Forwarded Acceptance.

RM servers also provide bank-supplied procedures for currency conversions. An RM server may convert between currencies when authorizing a Request or Acceptance, as the Identity Warranty Account amount and request amount fields must be in a particular currency. An RM server may also convert between currencies when creating or forwarding an Offer, as the currency in the Request may not match the currency the bank uses to compute Identity Warranty fees.

Like other configuration parameters, the shared libraries that implement the bank-specific procedures are bound to a particular cryptographic token through hash values that are computed over the shared library files themselves and stored on the cryptographic token.

RM Identities

Each RM server may maintain multiple identifies, where a identity means a public/private key pair and issued certificate. Key pairs and certificates are all stored on a cryptographic device (i.e., a hardware token, possibly more than one). When the RM server is first installed, the installation application generates new public/private key pairs on the cryptographic device and it creates certificate requests for each of key pair. The installer conveys the requests to the CA (which signs all RM certificates), and gets the CA to create the new certificates for each request. The final part of the installation binds the certificates and the RM configuration to the key pairs on the hardware token. The RM private keys are entirely contained on the hardware token. The hardware token is further protected by a passphrase, so each time the RM starts, it prompts a local administrator to type in the passphrase before it can begin. (Alternatively, the installer may choose between being prompted for a passphrase and saving the passphrase in (obscured) local storage, with the caveat that the protection of the local storage then becomes a significant security risk.)

RM servers generate signatures for:

Forwarded Request,
Offer,
Forwarded Offer,
Forwarded Acceptance,
Warranty,
Forwarded Warranty,
OCSP Request,
OCSP Response,
Management Command Response,
Log File Entries.

RM servers also use public/private key pairs to protect transport communication:

SSL.

Servers use five identities for signing and one for SSL:

RPB Identity for RPB Identity Warranty messages: Forwarded Request, Forwarded Offer, Forwarded Acceptance, Forwarded Warranty, Error, IB Identity for IB Identity Warranty messages: Offer, Warranty, Error, Certificate Status Identity for OCSP messages: Request, Response, Management Identity for Management Response messages, Logging Identity for Log File Entries, SSL Identity.

| Operation | Identity |
| --- | --- |
| Sign Forwarded Request | RPB |
| Sign Offer | IB |
| Sign Forwarded Offer | RPB |
| Sign Forwarded Acceptance | RPB |
| Sign Warranty | IB |
| Sign Forwarded Warranty | RPB |
| Sign OCSP Request | Certificate Status |
| Sign OCSP Response | Certificate Status |
| Sign Management Command Response | Management Identity |
| Sign Log File Entries | Logging Identity |
| SSL | SSL |

Certificates for identities other than SSL are preferably Warranty Certificates with extended key usage extension OIDs for each activity.

The SSL certificate is preferably a Utility Certificate.

To update any of the identities, the RM administrator preferably pauses operation of the server and re-runs the installation command that create the new key pairs, certificate requests, and installs the new certificates in the RM configuration.

Warranty Request Protocol

Introduction

Figure 7:
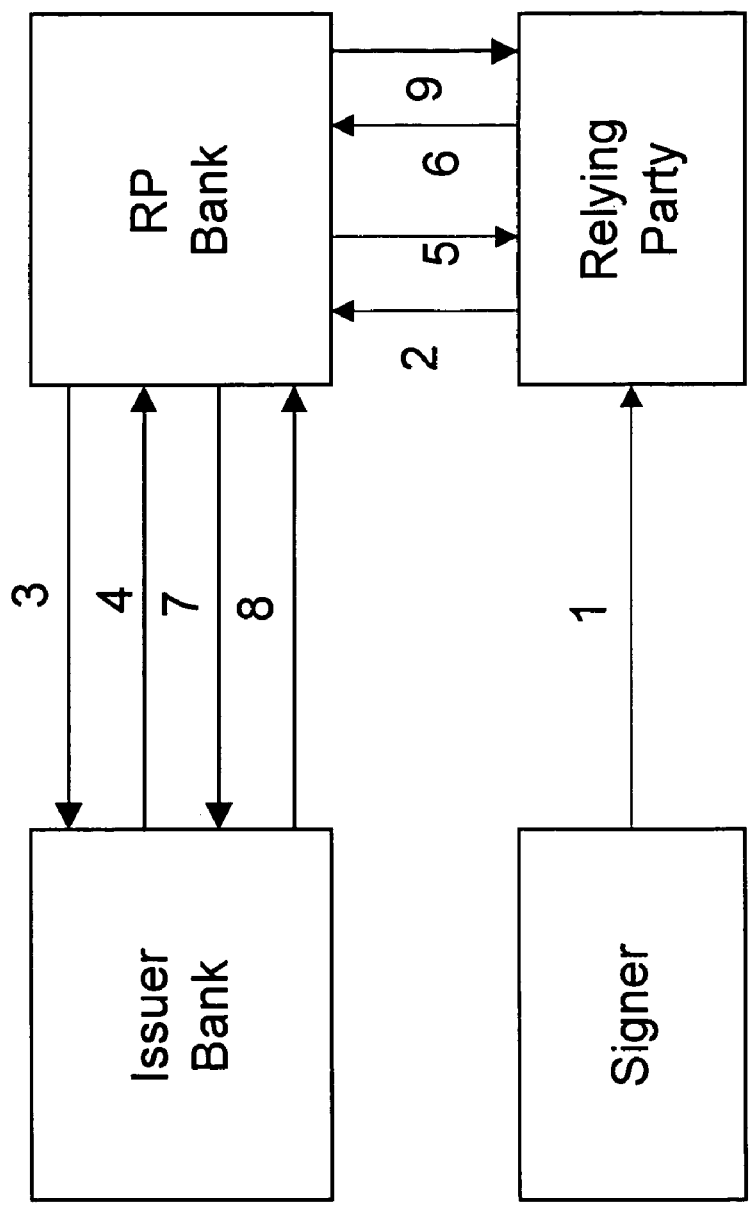
FIGS. 7–9 depict various message flow diagrams for identity warranty management services according to the present invention.
Figure 8:
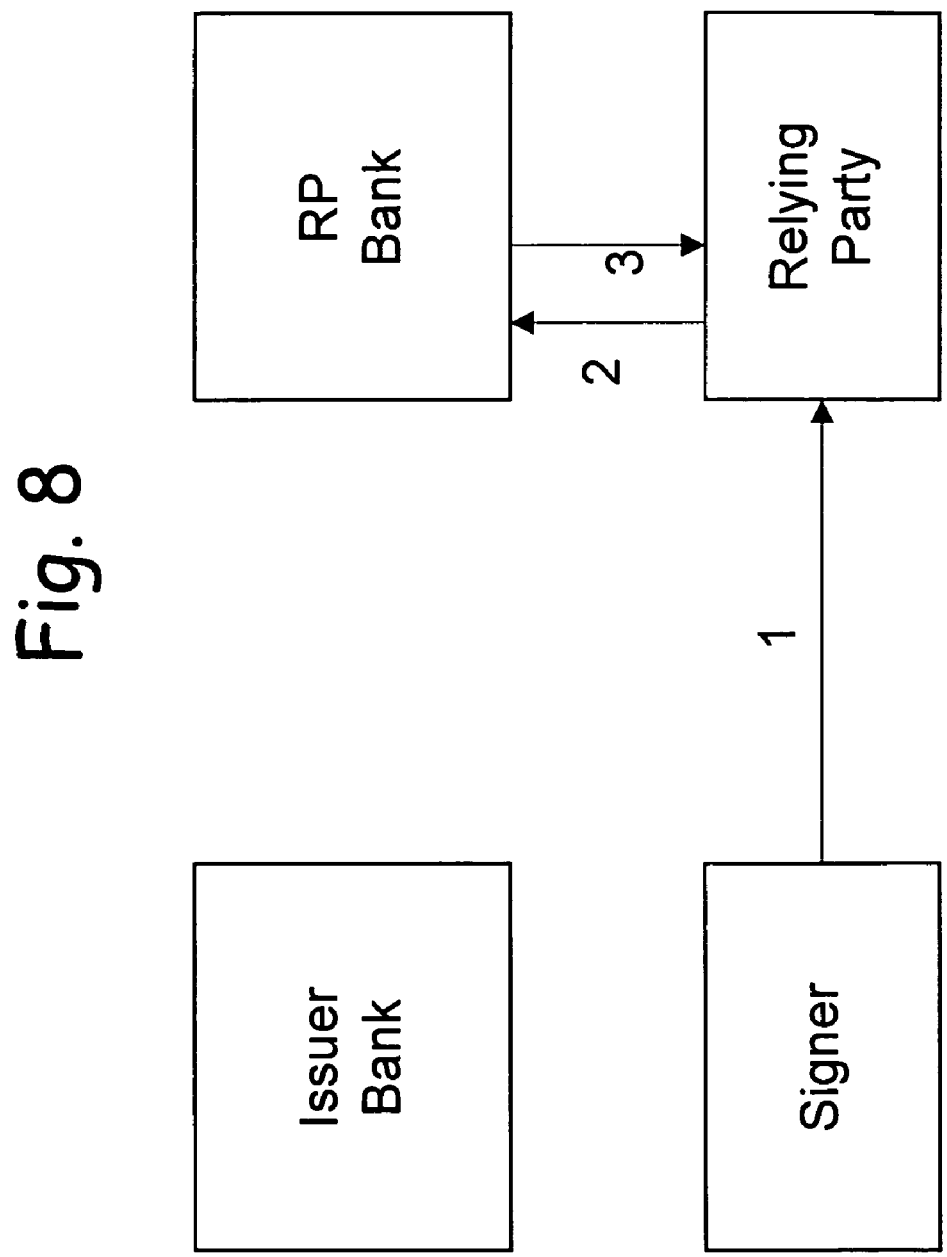
Figure 9:
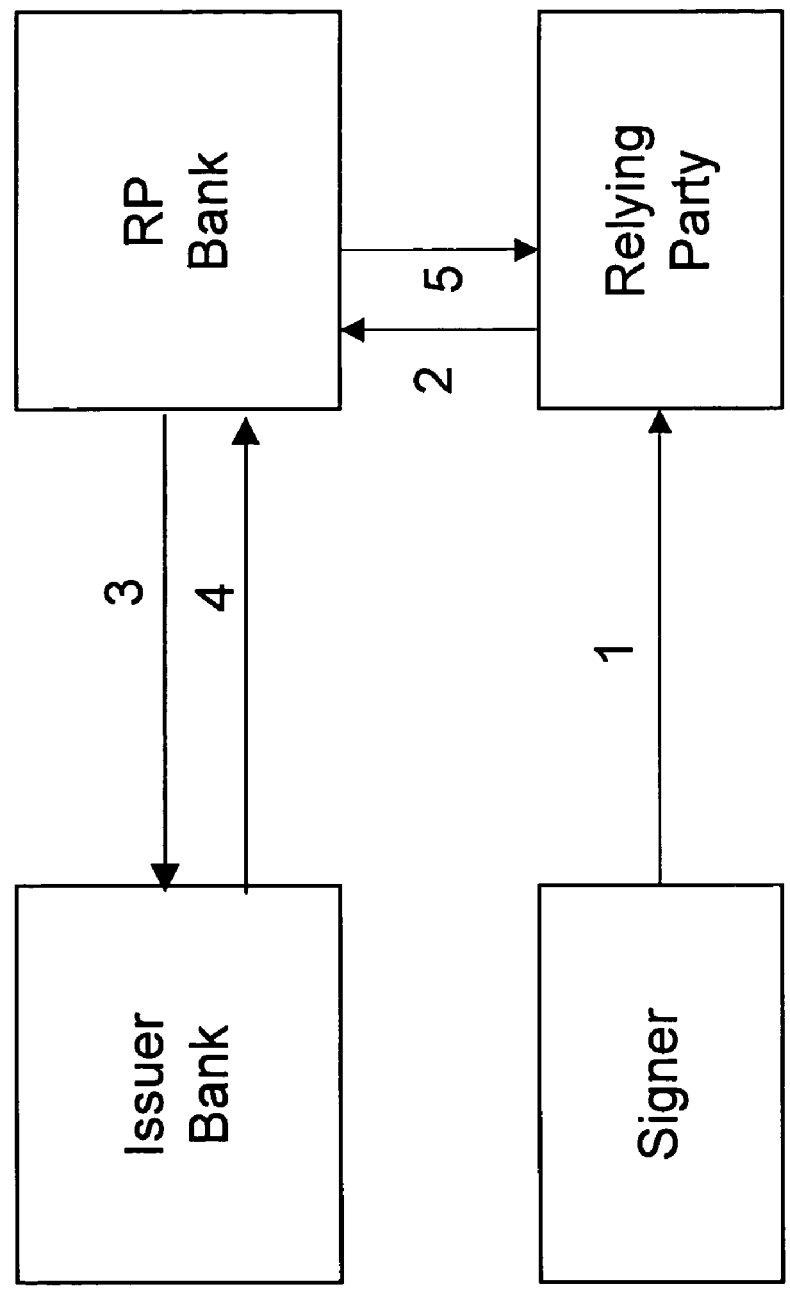

This section describes an identity warranty protocol (IWP) according to embodiments of this invention. In particular, the messages between subscriber and relying party (RP), RP and reliance manager (RM), and between RMs are defined. The protocol is based on the use of CMS (formerly PKCS #7) to encapsulate transactions, using the CMS signedData construct. The individual messages are specified and encoded using ASN.1 DER (which is also used for CMS itself). The signedData instance may be further encoded for transfer (e.g., using base64 encoding), and further protection (e.g., SSL or S/MIME) may be applied. The identity of the signer is contained in its certificate chain. FIGS. 7–9 depict various message flow diagrams for identity warranty management services according to the present invention. FIG. 7 depicts identity warranty protocol message flows according to embodiments of this invention.

The messages of FIG. 7 are follows:

1. Signed transaction (technically, this is not part of the identity warranty protocol)
2. Request
3. Forwarded Request
4. Offer (this and messages 5–7 are optional, depending on the request)
5. Forwarded Offer
6. Acceptance
7. Forwarded Acceptance
8. Warranty
9. Forwarded Warranty Either the Issuing Bank or the Relying Party Bank may return an error, for example, should the Signing Party or the Relying Party certificate prove to have been revoked.

FIG. 8 depicts identity warranty protocol message flows with RP bank error. The messages of FIG. 8 are follows:

1. Signed transaction (technically, this is not part of the identity warranty protocol)
2. Request or Acceptance
3. Error FIG. 9 depicts identity warranty protocol message flows with issuer bank error. The messages of FIG. 9 are follows:

1. Signed transaction (technically, this is not part of the identity warranty protocol)
2. Request or Acceptance
3. Forwarded Request or Acceptance
4. Error
5. Re-signed Error

Signed Transaction Structure

Signed transactions according to the present invention are assumed to use the CMS message structure (SignedData).

The signer provides information on the transaction in a form usable by the parties to the actual identity warranty protocol in the SignerContract structure described below.

```
SignerContract ::= SEQUENCE {
    version         Version,
    contractID      ContractID,
    transactionType [0] TransactionType OPTIONAL,
    paymentType     [1] PaymentType OPTIONAL,
    amountLimit     [2] MonetaryValue OPTIONAL,
    timeLimit       [3] GeneralizedTime OPTIONAL,
    relyingPartyID  [4] CertificateIdentifier OPTIONAL,
    contractAmount  [5] MonetaryValue OPTIONAL,
    contractExpires [6] GeneralizedTime OPTIONAL,
    extensions      [7] Extensions OPTIONAL }
```

-continued

```
Version ::= INTEGER { v1(0), v2(1), v3(2) }  -- from X.509
ContractID ::= OCTET STRING
-- SHA-1 hash f transaction
PaymentType ::= OBJECT IDENTIFIER
-- define values in arc for signing party pays, relying party pays, . . .
TransactionType ::= OBJECT IDENTIFIER
-- define values in arc for fx, purch, c llat, security, . . .
MonetaryValue ::= SEQUENCE {       -- fr m SET and ANSI X9.45
    currency     INTEGER (1 . . . 999),   -- per ISO 4217
    am unt       INTEGER,
    exp nent     INTEGER }
    -- value = amount * 10^exponent
CertificateIdentifier ::= OCTET STRING
-- SHA-1 hash f DER encoding of relying party certificate
```

The contract is included as the content of the SignedData message. The SignerContract structure includes a hash of the transaction for which an identity warranty will be requested. The transaction itself is included as an unsigned attribute. Thus, the signature covers both the actual transaction and the SignerContract.

The contract ID is a hash to verify the integrity of the transaction in the unsigned attribute. The transaction type indicates, at some level of granularity, the type of transaction. This is a minimal amount of context which may be used by the RM when determining the risk associated with the transaction. The payment type field may be used by the Signing Party to offer to pay for the warranty.

The amount limit, time limit, and relying party ID fields constrain the relying party identity warranty request. The amount in the request cannot exceed the amount in the amount limit. The time of the request cannot be later than the time in time limit. The certificate for the relying party who submits the request must be same as the relying party identifier.

The contract amount and transaction expires fields describe the transaction. The contract amount is the actual transaction value. The contract expires field indicates the maximum duration of the transaction. The contract may also contain extensions (e.g., additional transaction context), although no extensions are currently defined.

The signer will also provide an instance of the signing certificate attribute as a signed attribute in the message. This attribute identifies the certificate for verifying the SignerInfo signature. The signer provides the certificates in the chain from its certificate to the root certificate in the CMS message structure.

The transaction for which an identity warranty will be requested is included as an unsigned attribute. This specification does not dictate any particular structure to the transaction contents.

```
spTransaction ATTRIBUTE ::= {
    WITH SYNTAX   SPTransaction
    ID            <. . . an OID . . .> }
SPTransaction ::= OCTET STRING
```

The signer may optionally provide hardware or application-specific authentication or authorization data in one or more instances the signing party authentication information as authenticated or unauthenticated attributes in the message:

```
spAuthInfo ATTRIBUTE ::= {
    WITH SYNTAX    SPAuthData
    ID             <...OID...> }
SPAuthData ::= SEQUENCE {
    version        Version,
    type           OBJECT IDENTIFIER,
    content        ANY DEFINED BY type }
```

For example, the CSSD signature described in the Smart Card specification would be conveyed as an unauthenticated attribute:

```
id-CSSDAuthInfo    ::=   <...OID...>
CSSDAuthInfo       ::=   OCTET STRING
```

Figure 10:
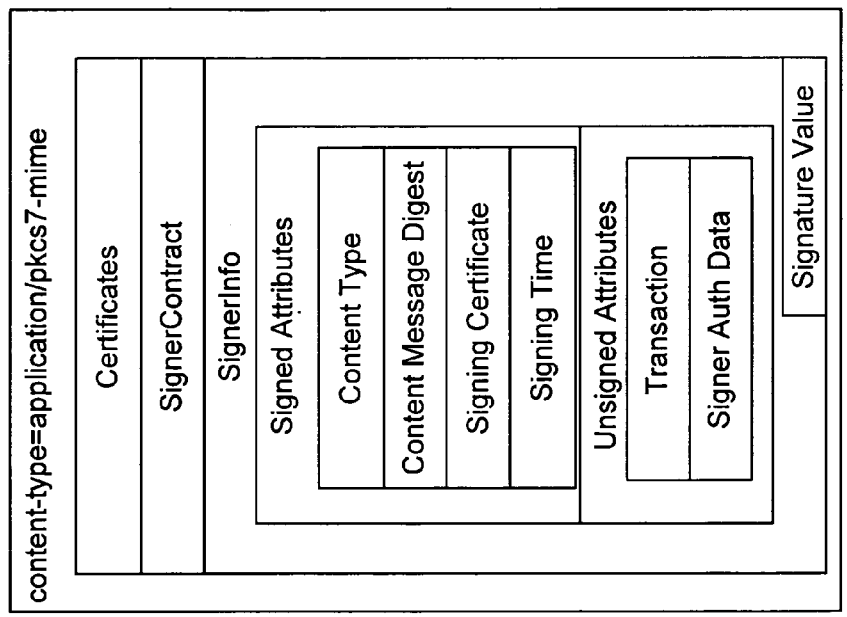
FIG. 10 shows the format of a signed transaction according to embodiments of this invention.

The signed transaction (including signer contract) may easily be conveyed using S/MIME. The transaction may be included as the content of the CMS message, which is sent with MIME type "application/pkcs7-mime". The relying party can re-encode the message without the "transaction" unsigned attribute. The format of a signed transaction (with some details omitted) is shown in FIG. 10.

Identity Warranty Protocol

This section defines the formats of the remaining identity warranty protocol messages. The identity warranty protocol usually requires two round trips. With respect to the four-corner model (FIGS. 1–2), the Relying Party sends a request to its Relying Party Bank, and the Relying Party Bank forwards the request to the Issuing Bank (the two banks could be the same). In response, the Issuing Bank creates an offer and sends it to the Relying Party Bank, which forwards the offer to the Relying Party. This completes the first round trip.

The Relying Party starts the second round trip by creating an acceptance message, which it sends to the Relying Party Bank, who forwards the acceptance message to the Issuing Bank. In response, the Issuing Bank creates the warranty and sends it to the Relying Party Bank, who forwards the warranty back to the Relying Party.

The inner exchange of offer and accept messages is only necessary if the Relying Party indicated it wanted to decide itself whether to accept or reject the offer. If the Relying Party chooses to automatically accept the offer, there is no need for the inner round trip. The Relying Party sends a request to its Relying Party Bank, and the Relying Party Bank forwards the request to the Issuing Bank. In response, the Issuing Bank creates the warranty and sends it to the Relying Party Bank, who forwards the warranty back to the Relying Party Identity warranty protocol messages are assumed to use the CMS message structure (SignedData). The identity warranty protocol takes advantage of the CMS SignedData capability of attaching multiple signatures (i.e., multiple SignerInfo fields), each with its own set of signed and/or unsigned attributes, to the same message content. The message originator assembles and signs the message content and additional authenticated or unauthenticated attributes. An intermediate party (e.g., the Relying Party Bank) forwards the originator's message content and SignerInfo and adds its own certificates and SignerInfo, with authenticated and/or unauthenticated attributes and signature.

To protect sensitive upstream information that an intermediate party may wish not to expose to a downstream recipient and still be able to preserve the upstream signature for the downstream client to verify, the upstream neighbor sends a digest of the sensitive information in the signed portion of the message and the sensitive information itself in the unauthenticated portion of the message. The intermediate party forwards the signed portion of the message and signature to the downstream neighbor as evidence of the upstream neighbor's participation in the transaction. And the intermediate party adjusts the sensitive information and includes it in the portion of the message which it signs.

For example, this method is used to protect the Issuing Bank offer and warranty, so that the Relying Party Bank may add its own fee to the Issuing Bank fee while both preserving the Issuing Bank signature and protecting the relationship of Issuing Bank and Relying Party Bank fees from the Relying Party. This method also protects the business transaction between the Signing and Relying Parties from the Banks.

Request

Figure 11:
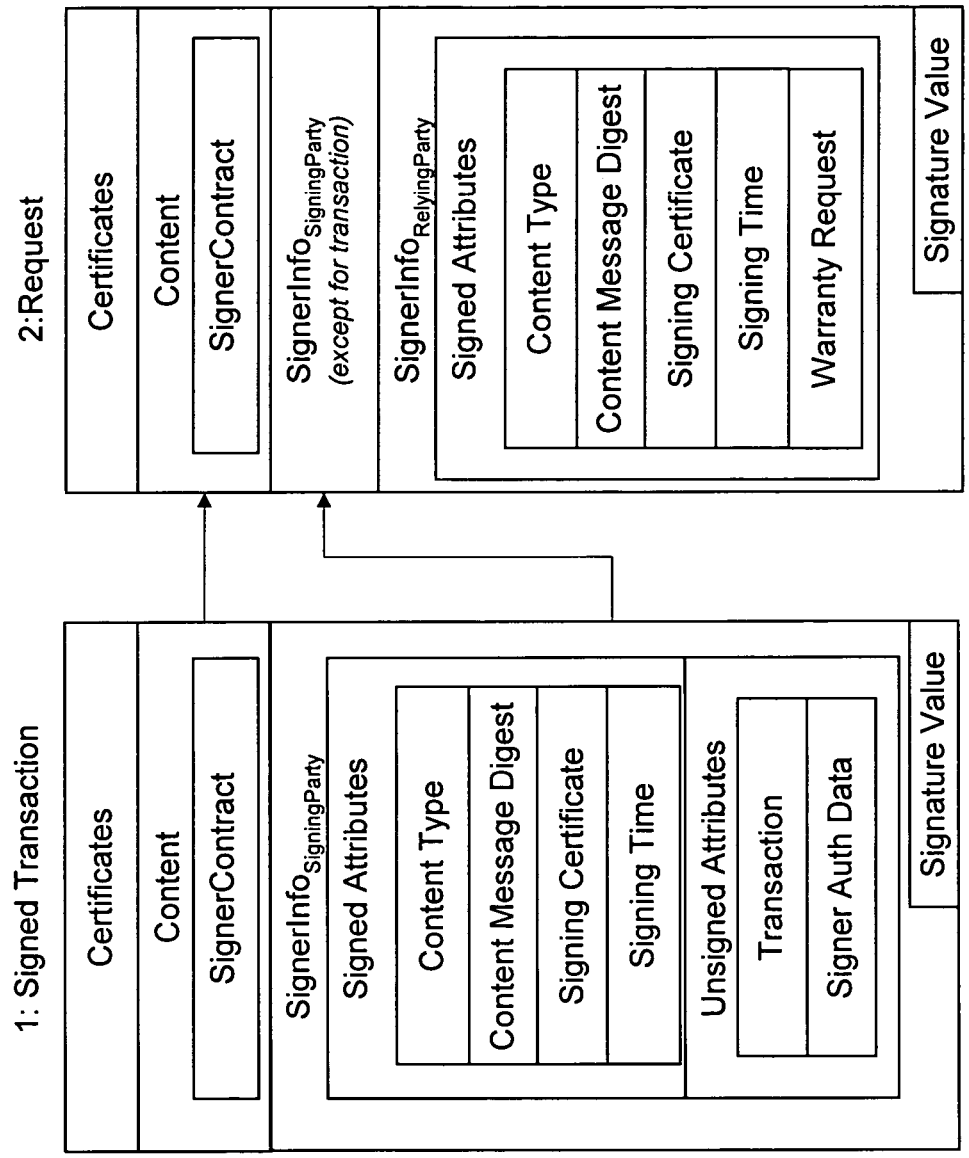
FIGS. 11–19 depict various messages associated with services according to the present invention.

With reference to FIG. 11, to start an identity warranty transaction, the Relying Party creates a CMS SignedData message containing the content and SignerInfo from the Signing Party message—except for the transaction unsigned attribute—together with a Relying Party SignerInfo. (Omitting or including unsigned attributes makes no difference to the basic protocol. If an embodiment requires the relying party bank to forward the signing party transaction, this unsigned attribute can simply be included in the request.) The content type for the message is "signer contract"; this is included as the message content signed attribute, per the CMS specification. The Relying Party specifies Identity Warranty amount and duration in the rpRequestInfo signed attribute, whose syntax is specified below and with reference to FIG. 11.

```
rpRequestInfo ATTRIBUTE ::= {
    WITH SYNTAX    IdentityWarrantyRequest
    ID             <...OID...> }
IdentityWarrantyRequest ::= SEQUENCE {
    version        Version,
    warrantyAmount MonetaryValue,
    warrantyExpires GeneralizedTime,
    requestType    IdentityWarrantyRequestType,
    extensions     Extensions OPTIONAL - none currently
                   defined}
IdentityWarrantyRequestType ::= OBJECT IDENTIFIER
-- define values in arc for bid, purchase, accept purchase
```

Warranty amount specifies the maximum value of identity warranty for which the Relying Party could issue a claim against the validity of the certificate identities for this transaction.

Warranty expires specifies the duration for the identity warranty contract. Request type specifies whether the Relying Party wishes explicitly accept the offer by sending an acceptance message (requestType is bid), whether the Relying Party wishes to implicitly accept the offer without reviewing it first (requestType is purchase), or whether the Relying Party wishes to accept the Signing Party offer to purchase the warranty (requestType is accept purchase). Extensions may be specified as needed.

Forwarded Request

Figure 12:
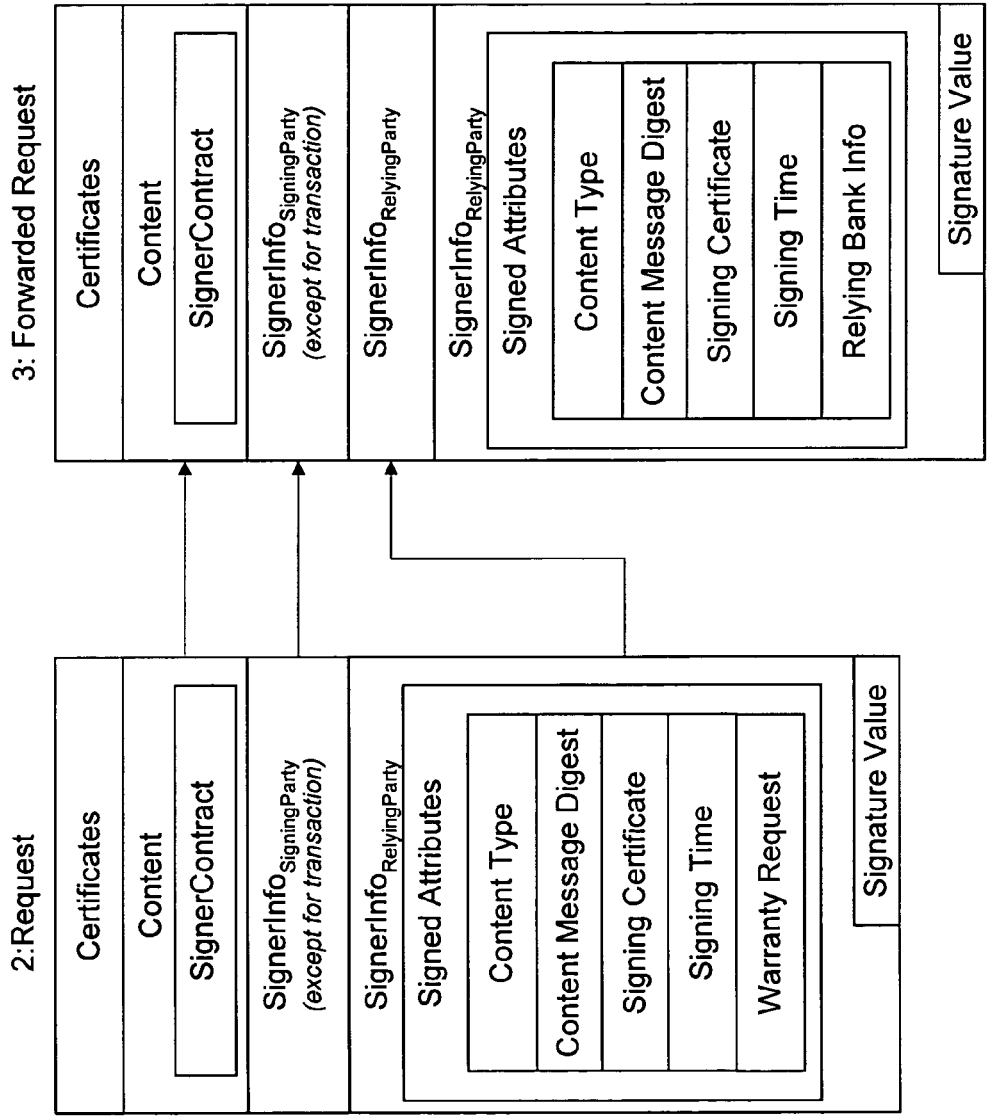
Figure 13:
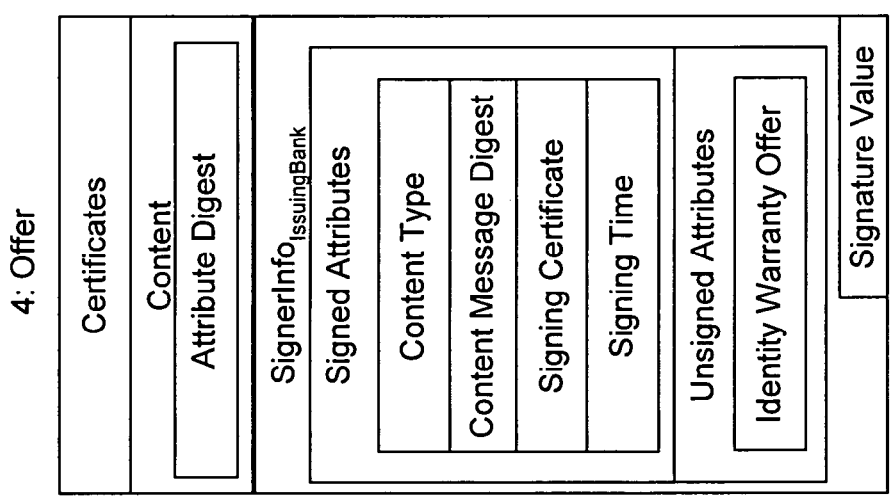

With reference to FIG. 12, the Relying Party Bank creates a CMS SignedData message containing CMS message content and SignerInfo from the Relying Party CMS message, together with a SignerInfo of its own. The SignerInfo content type for the message is "signer contract"; this is included as the message content signed attribute, per the CMS specification. The Relying Party Bank specifies additional information in the rpBankInfo attribute whose syntax is specified below (and see FIG. 12).

```
rpBankInfo ATTRIBUTE ::= {
    WITH SYNTAX    RPBankInfo
    ID             <...OID...> }
RPBankInfo ::= SEQUENCE {
    version        Version,
    extensions     Extensions OPTIONAL}
```

Alternate embodiments may include authentication or authorization information such as the OCSP responses for the Relying Party certificates.

Offer

With reference to FIG. 12, the Issuing Bank creates a CMS SignedData message containing the offer digest (AttributeDigest described below) as CMS message content. The content type for the message is "identity warranty offer"; this is included as the message content signed attribute, per the CMS specification. The Issuing Bank specifies offer details in the ibIdentityWarrantyOffer attribute whose syntax is specified below (and in FIG. 12).

```
AttributeDigest ::= SEQUENCE {
    version        Version,
    attributeId    OBJECT IDENTIFIER,
    randomPad      OCTET STRING (SIZE 80),
    -- 160 bits of entropy for hash to follow
    digestValue    OCTET STRING (SIZE 20)
    -- SHA-1 hash of DER encoding of attribute and random pad }
```

Attribute ID identifies the unsigned attribute for which this structure is the digest. The digest value is computed over the concatenation of the DER encoding of the IdentityWarrantyOffer attribute and randomPad. It protects the contents of the offer, which is transmitted as an unsigned attribute. Sending the offer as an unsigned attribute lets the relying party bank customize the offer it sends to the relying party, e.g., add its own charge to the issuing bank charge.

```
ibIdentityWarrantyOffer ATTRIBUTE ::= {
    WITH SYNTAX    IdentityWarrantyOffer
    ID             <...OID...> }
IdentityWarrantyOffer ::= SEQUENCE {
    version        Version,
    transactionID  TransactionID,
    warrantyAmount MonetaryValue,
    warrantyExpires GeneralizedTime,
    warrantyFee    MonetaryValue,
    offerExpires   GeneralizedTime,
    extensions     Extensions OPTIONAL }
TransactionID ::= SEQUENCE {
    contractDigest OCTET STRING (SIZE 20),
    -- SHA-1 hash of SignerContract
    seqNum         INTEGER }
    -- distinguishes multiple protocol runs for the same transaction
```

The transaction ID consists of the SHA-1 hash of the concatenation of the DER encodings (i.e., including all ASN.1 type and length information) of:
1. the Signing Party SignerContract,
2. the signing time attribute from the Signing Party SignerInfo, along with a sequence number which distinguishes multiple runs of the protocol for the same signer contract and signing time. The transaction ID sequence number is assigned by the Issuing Bank, and starts at 1 for the first offer for a transaction.

The Issuing Bank uses the TransactionID to coordinate multiple requests by the same Relying Party for a warranty for the same SignerContract. For each request, the Issuing Bank generates a new Offer with a new TransactionID.seqNum. When the Issuing Bank receives an Accept message, it uses the TransactionID in the Accept message to locate the Offer and it deletes all other Offers with the same TransactionID.contractDigest.

The Issuing Bank also uses the TransactionID.contractDigest to prevent the Relying Party from obtaining a second warranty for the same SignerContract while an existing warranty has yet to expire. A Signing Party who wishes to prevent a Relying Party from serially obtaining warranties for the same SignerContract after the warranty expires should use SignerContract.timeLimit. Alternately, the Issuing Bank may implement a policy that refuses to grant warranties for any SignerContract at some time later than the Signing Time date (e.g., 30 days) in the Signing Party SignerInfo.

The offer also identifies the amount and duration for the offered warranty (warrantyAmount and warrantyExpires), the warranty fee (warrantyFee), and the time for which the offer is valid (offerExpires).

Forwarded Offer

Figure 14:
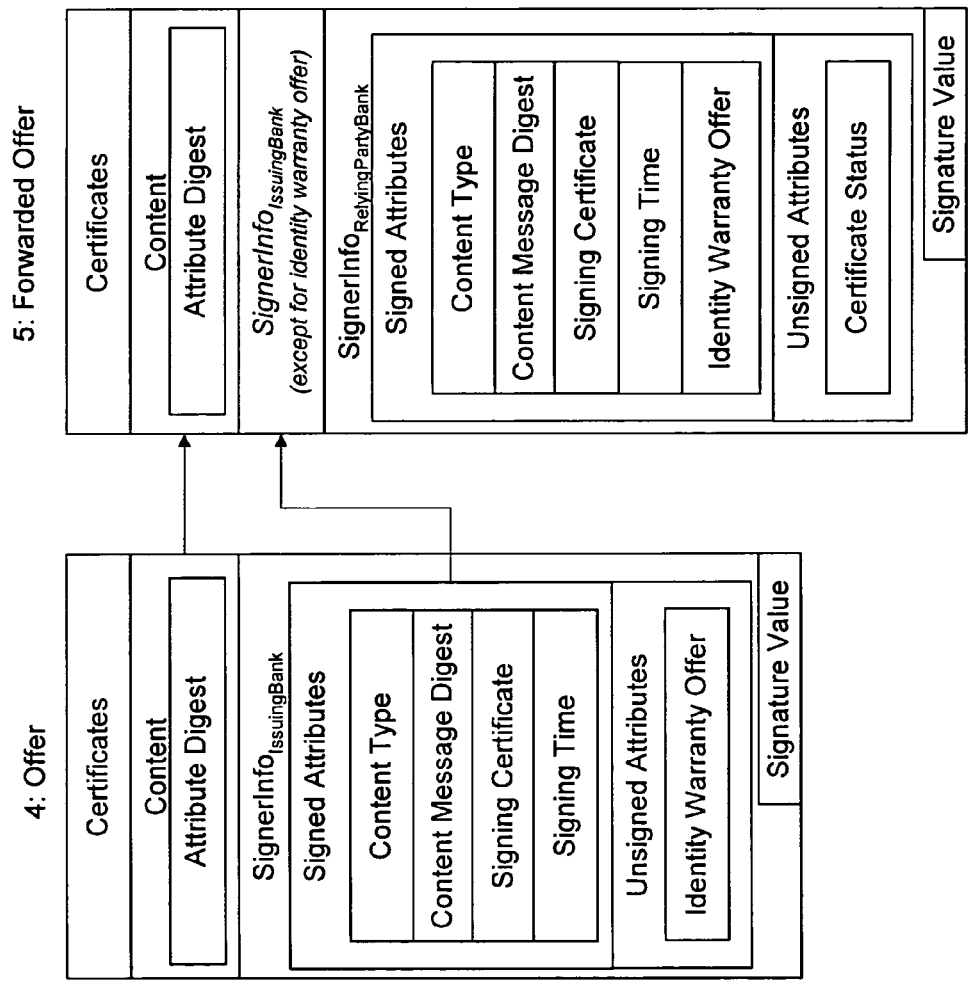

With reference to FIG. 14, the Relying Party Bank creates a CMS SignedData message containing CMS message content and SignerInfo from the Issuing Bank CMS message, together with a SignerInfo of its own. The forwarded offer includes the content and signer info of the Issuing Bank Offer for claims processing evidence, should it be necessary. The Relying Party does not use them when it processes the response. (Whether or not the Issuing Bank signature is preserved depends in part upon who is legally responsible for the warranty. If it should become unnecessary to include the Issuing Bank signature, then the Relying Party Bank simply omits the Issuing Bank Signer Info from the Forwarded Offer.) The content type attribute for the message is "identity warranty offer"; this is included as the message content signed attribute, per the CMS specification. The Relying Party Bank specifies the identity warranty offer details in the rpbIdentityWarrantyOffer attribute whose syntax is specified below (and see FIG. 14).

The Relying Party supplies OCSP replies (signed by the repository) that verify the status of its own certificate in the rpbCertificateStatus attribute whose syntax is specified below. The Relying Party uses a local copy of the OCSP signing certificate to verify the OCSP replies in the rpbCertificateStatus attribute. Then it uses the public key in the Relying Party Bank certificate to verify the Relying Party Bank SignerInfo.

```
rpbIdentityWarrantyOffer ATTRIBUTE ::= {
    WITH SYNTAX    IdentityWarrantyOffer
    ID             <...OID...> }
rpbCertificateStatus ATTRIBUTE ::= {
    WITH SYNTAX    SignedOCSPResp nseSet
    ID             <...OID...> }
SignedOCSPResponseSet ::= SEQUENCE OF SignedOCSPResp nse
SignedOCSPResp nse ::= OCTET STRING   -- per OCSP spec.
```

Acceptance

Figure 15:
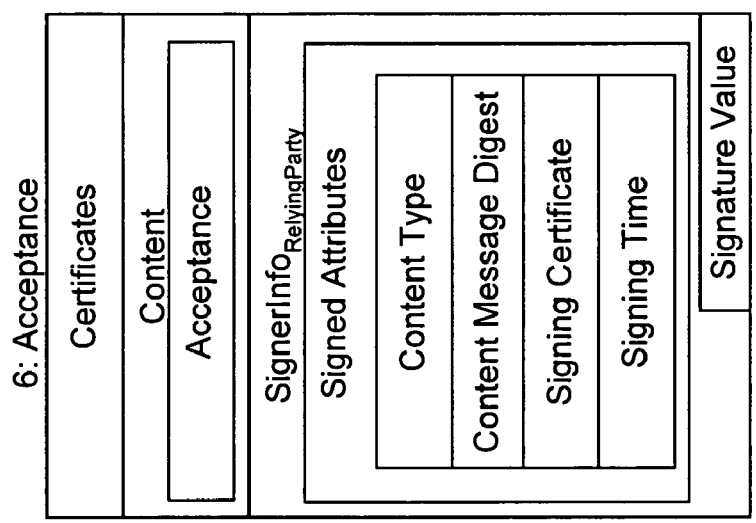

With reference to FIG. 15, the Relying Party creates a CMS SignedData message containing the acceptance (Acceptance described below and see FIG. 15) as CMS message content. The SignerInfo content type for the message is "identity warranty acceptance"; this is included as the message content signed attribute, per the CMS specification.

```
Acceptance ::= SEQUENCE {
    version           Version,
    transactionID     TransactionID,
    acceptanceStatus  AcceptanceStatus,
    extensions        Extensions }
AcceptanceStatus::= OBJECT IDENTIFIER
-- define values in arc for accept, reject
```

Forwarded Acceptance

Figure 16:
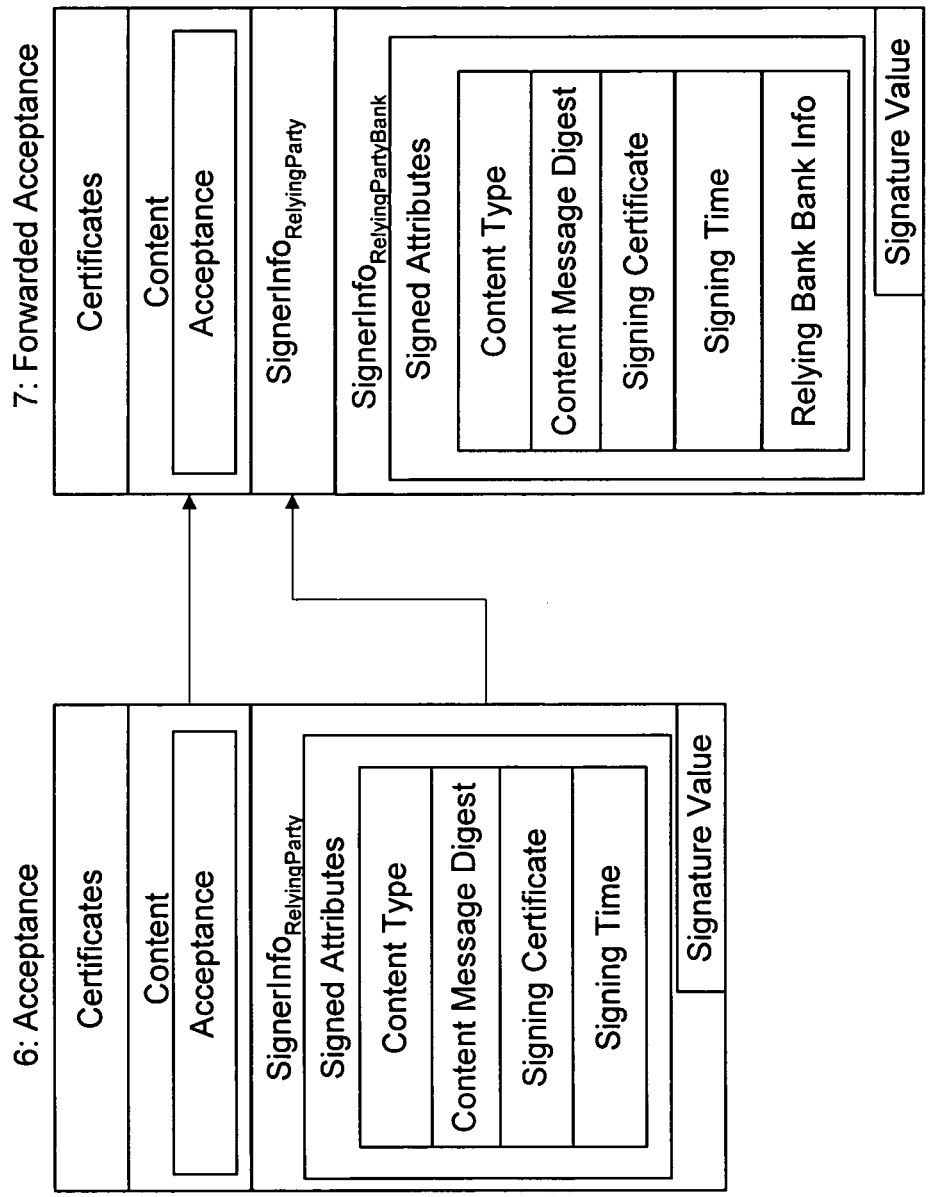

With reference to FIG. 16, the Relying Party Bank creates a CMS SignedData message containing CMS message content and SignerInfo from the Relying Party CMS message, together with a SignerInfo of its own. The SignerInfo content type for the message is "identity warranty acceptance"; this is included as the message content signed attribute, per the CMS specification. The Relying Party Bank specifies additional information in the rpbCertificateStatus attribute whose syntax is specified above and in FIG. 16.

Identity Warranty

Figure 17:
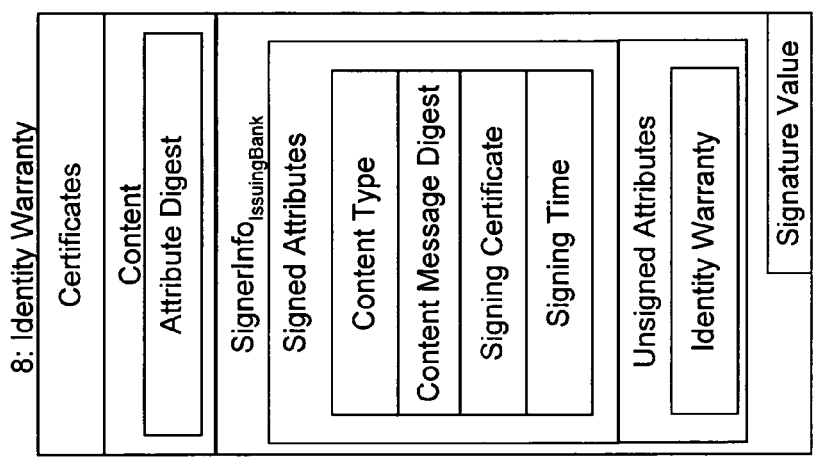

With reference to FIG. 17, the Issuing Bank creates a CMS SignedData message containing the identity warranty digest (AttributeDigest described above) as CMS message content. The content type for the message is "identity warranty"; this is included as the message content signed attribute, per the CMS specification. The Issuing Bank specifies warranty details in the ibIdentityWarranty attribute whose syntax is specified below (and see FIG. 17).

```
ibIdentityWarranty ATTRIBUTE ::= {
    WITH SYNTAX    IdentityWarranty
    ID             <. . . OID . . .> }
IdentityWarranty ::= SEQUENCE {
    version          Version,
    transactionID    TransactionID,
    signerContract   SignerContract,
    warrantyRequest  IdentityWarrantyRequest,
    warrantyAmount   MonetaryValue,
    warrantyExpires  GeneralizedTime,
    warrantyFee      MonetaryValue,
    extensions       Extensions OPTIONAL }
```

The signer contract and warranty request record the Signing Party and Relying Party inputs to the warranty. Warranty amount and warranty expires describe the resulting warranty. Warranty fee describes the charge for the warranty.

Forwarded Identity Warranty

Figure 18:
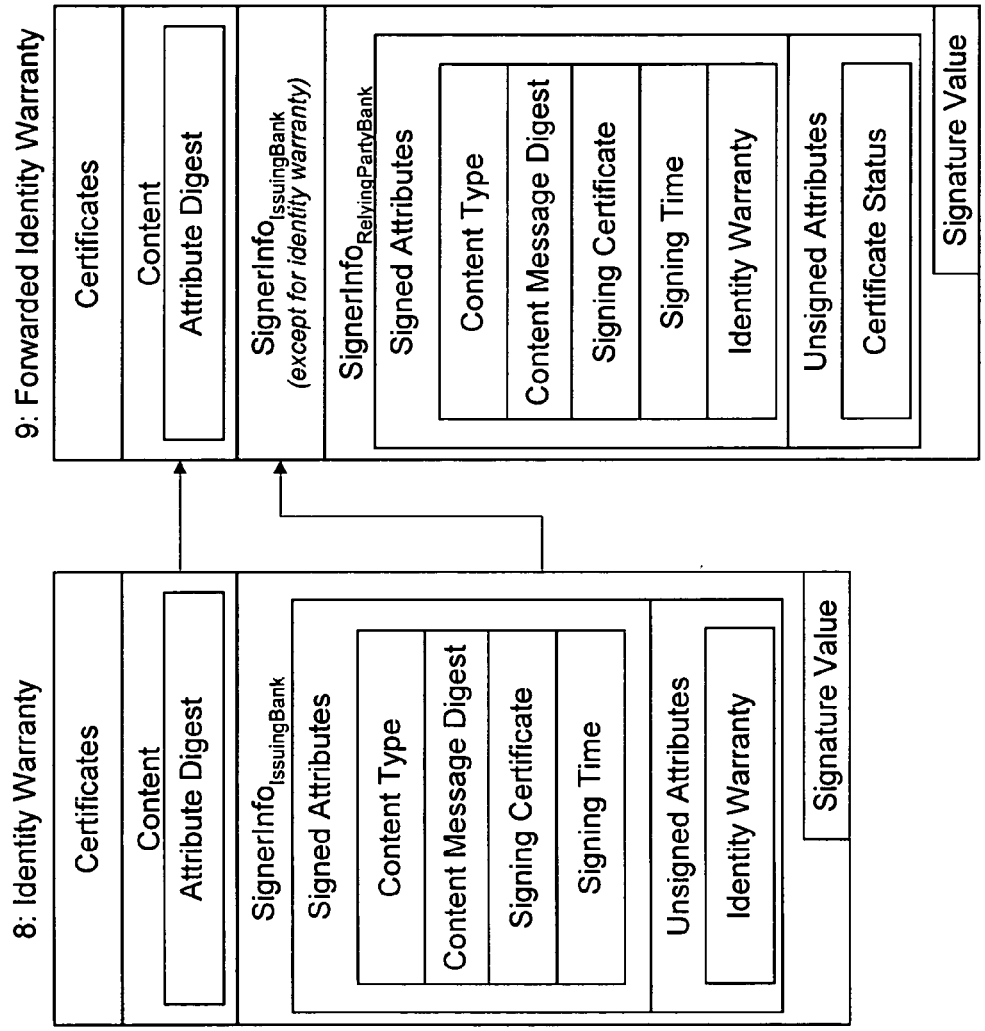

With reference to FIG. 18, the Relying Party Bank creates a CMS SignedData message containing CMS message content and SignerInfo from the Issuing Bank CMS message, together with a SignerInfo of its own. The SignerInfo content type for the message is "identity warranty"; this is included as the message content signed attribute, per the CMS specification. The Relying Party Bank specifies signed OCSP replies attesting to the status of its own certificate in the rpbCertificateStatus attribute whose syntax is specified above and see FIG. 18.

Identity Warranty Error

Figure 19:
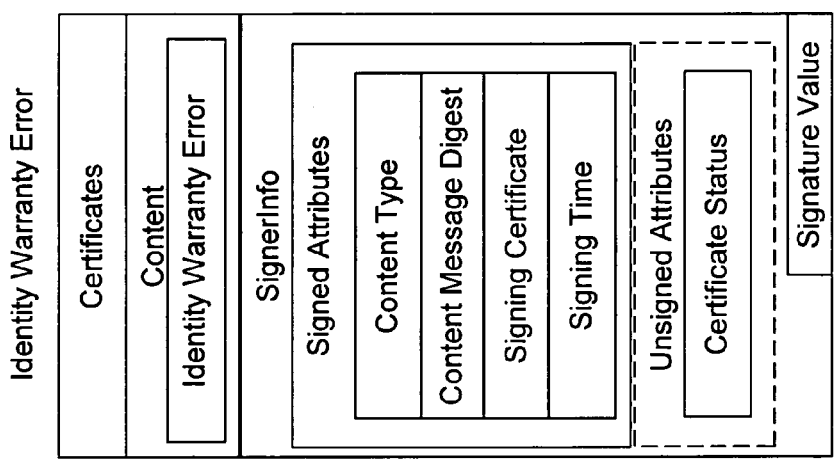

With reference to FIG. 19, if the Issuing Bank or the Relying Party Bank encounters an error processing the request or if it chooses to deny the request, then it returns this error message. The Bank creates a CMS SignedData message containing the error (IdentityWarrantyError described below) as CMS message content. The content type for the message is "identity warranty error"; this is included as the message content signed attribute, per the CMS specification.

Either the Issuing Bank or the Relying Party Bank may generate the identity warranty error message. The messages vary only in that the identity warranty error generated by the Issuing Bank does not include the certificate status attribute. When the Relying Party Bank receives an error generated by the Issuing Bank, then the Relying Party Bank re-signs the Issuing Bank IdentityWarrantyError content, creates the certificate status attribute, and sends the message with only the Relying Party Bank signature. If the Issuing Bank signature on an error message is determined to be significant, then the protocol will be expanded to include a forwarded error composed of an IdentityWarrantyError content with Issuing Bank and Relying Party Bank SignerInfos.

```
Identity WarrantyError ::= SEQUENCE {
    version         Version,
    error           Identity WarrantyStatus,
    transactionID   TransactionID OPTIONAL,
    certStatus      OCSPResponse OPTIONAL }
IdentityWarrantyStatus ::= SEQUENCE {
    statusCode      IdentityWarrantyStatusCode,
    errorText       IA5String OPTIONAL }
IdentityWarrantyStatusCode ::= ENUMERATED { success(0),
    subscriberCertChainOCSPErr r(1),
    rpCertChainOCSPError(2), rpServiceCertChainOCSPError(3),
    subscriberServiceCertChainOCSPErr r(4), Identity
WarrantyValueExceedsLimit(5), . . . }
OCSPResp nse ::= OCTET STRING  -- per OCSP spec.
```

If the error was caused by an OCSP response then the Issuing Bank includes the OCSP response in the certificate status field of the error.

While the protocol messages may be described (as above) using CMS, they may also be described using XML. This section defines the formats of the identity warranty protocol messages using XML.

Identity Warranty Protocol (XML)

As noted above, the identity warranty protocol usually requires two round trips. With respect to the four-corner model, the Relying Party sends a request to its Relying Party Bank, and the Relying Party Bank forwards the request to the Issuing Bank (the two banks could be the same). In response, the Issuing Bank creates an offer and sends it to the Relying Party Bank, which forwards the offer to the Relying Party. This completes the first round trip.

The Relying Party starts the second round trip by creating an acceptance message, which it sends to the Relying Party Bank, who forwards the acceptance message to the Issuing Bank. In response, the Issuing Bank creates the warranty and sends it to the Relying Party Bank, which forwards the warranty back to the Relying Party.

The inner exchange of offer and accept messages is only necessary if the Relying Party indicated it wanted to decide itself whether to accept or reject the offer. If the Relying Party chooses to automatically accept the offer, there is no need for the inner round trip. The Relying Party sends a request to its Relying Party Bank, and the Relying Party Bank forwards the request to the Issuing Bank. In response, the Issuing Bank creates the warranty and sends it to the Relying Party Bank, who forwards the warranty back to the Relying Party.

The warranty protocol defines nine XML messages:

```
<!-Warranty Protocol DTD       -->
<!-- PUBLIC "-//CertCo//DTD WP 1.0//EN" -->
<!-- SYSTEM "wp.dtd" -->
<!ELEMENT wpmsg
    (warranty-request | interbank-request |interbank-offer |
    customer-offer | acceptance | interbank-acceptance |
    interbank-warranty | warranty | error) >
<!ATTLIST wpmsg version   CDATA   #FIXED "1.0" >
```

Warranty Request (XML)

To start an identity warranty transaction, the Relying Party creates a CMS SignedData message containing the detached signature from the from the Signing Party message, together with the warranty request message defined below.

The warranty request message is defined as:

```
<!ELEMENT warranty-request (amount, expires) >
<!ATTLIST warranty-request reqtype (BID | BUY | ACCEPT) "BID") >
<!ELEMENT amount              (#PCDATA) >
<!-- currency codes per ISO 4217 -->
<!ATTLIST amount          &currcodes; "USD" >
<!ENTITY currcodes
        "(  AED  | AFA  | ALL  | AMD  | ANG  | AOK  | AON  | ARA  | ARS  | ATS  |
            AUD  | AWG  | AZM  | BAD  | BBD  | BDT  | BEF  | BGL  | BHD  | BIF  |
            BMD  | BND  | BOB  | BRE  | BRL  | BRR  | BSD  | BTN  | BWP  | BYB  |
            BZD  | CAD  | CDF  | CHF  | CLP  | CNY  | COP  | CRC  | CUP  | CVE  |
            CYP  | CZK  | DEM  | DJF  | DKK  | DOP  | DZD  | ECS  | EEK  | EGP  |
            ERB  | ESP  | ETB  | EUR  | FIM  | FJD  | FKP  | FRF  | GBP  | GEL  |
            GHC  | GIP  | GMD  | GNF  | GNS  | GQE  | GRD  | GTQ  | GWP  | GYD  |
            HKD  | HNL  | HRK  | HTG  | HUF  | IDR  | IEP  | ILS  | INR  | IQD  |
            IRR  | ISK  | ITL  | JMD  | JOD  | JPY  | KES  | KGS  | KHR  | KMF  |
            KPW  | KWD  | KYD  | KZT  | LAK  | LBP  | LKR  | LRD  | LSL  | LTL  |
            LUF  | LVL  | LYD  | MAD  | MDL  | MGF  | MKD  | MLF  | MMK  | MNT  |
            MOP  | MRO  | MTL  | MUR  | MVR  | MWK  | MXP  | MYR  | MZM  | NAD  |
            NGN  | NIC  | NLG  | NOK  | NPR  | NZD  | OMR  | PAB  | PEI  | PEN  |
            PGK  | PHP  | PKR  | PLZ  | PTE  | PYG  | QAR  | ROL  | RUR  | RWF  |
            SAR  | SBD  | SCR  | SDP  | SEK  | SGD  | SHP  | SIT  | SKK  | SLL  |
            SOS  | SRG  | STD  | SVC  | SYP  | SZL  | THB  | TJR  | TMM  | TND  |
            TOP  | TRL  | TTD  | TWD  | TZS  | UAH  | UGS  | UGX  | USD  | UYN  |
            UYP  | UYU  | UZS  | VEB  | VND  | VUV  | WST  | XAF  | XCD  | XDR  |
            XEU  | XOF  | XPF  | YER  | YUN  | ZAR  | ZMK  | ZRN  | ZWD  )" >
<!ELEMENT expires             (#PCDATA) >
<!-- expiration time in ISO 8601 format -->
<!-- an example -->
<wpmsg>
    <warranty-request>
        <amount ccy=" GBP" >10000</amount>
        <expires>19990731T16:00:00</expires>
    </warranty-request>
</wpmsg>
```

All messages in the protocol consist of the detached signature from the signing party's transaction, and a warranty protocol message represented in XML. The two components are conveyed in a MIME multipart/message structure, which forms the actual content of the SignedData. The content type for the message is "data"; this is included as the content type signed attribute, per the CMS specification. The structure of the MIME message is thus:

Content-Type: multipart/mixed; boundary=9afb45g

--9afb45g

Content-Type: application/pkcs7-signature

<base64 encoding of detached signature from signing party>

--9afb45g

Content-Type: text/plain

<XML warranty request message>

--9afb45g

If it is desired to pass on to the RP the warranty message from the issuing bank to the RP bank, the message can be encapsulated as a third MIME body part.

The warranty amount specifies the maximum value of identity warranty for which the Relying Party could issue a claim against the validity of the certificate identities for this transaction.

"Expires" specifies the desired duration for the identity warranty contract.

The request type specifies whether the Relying Party wishes explicitly accept the offer by sending an acceptance message (reqType is "BID"), whether the Relying Party wishes to implicitly accept the offer without reviewing it first (reqType is "BUY"), or whether the Relying Party wishes to accept the Signing Party offer to purchase the warranty (reqType is "ACCEPT").

The signer's certificate chain is conveyed in the detached signature, rather than as a separate XML element. The detached signature consists of the SignerInfo structure, a version number, digest algorithm ID, and (optionally) certificates.

The relying party may include the entire signed transaction rather than the detached signature. This would be the entire CMS-encapsulated message, without MIME headers. The content type would be application/pkcs7-mime.

Interbank Request (XML)

The Relying Party Bank creates an interbank request and sends it, along with the detached signature from the signer, to the Issuing Bank. The message contents and structure are the same as for the warranty request. Note the detached signature contains the signer's certificate chain.

<!ELEMENT interbank-request (amount, expires)>

<!ATTLIST interbank-request reqtype (BID|BUY|ACCEPT) "BID")>

Interbank Offer (XML)

The Issuing Bank creates a CMS SignedData message containing the detached signature of the original transaction, and the warranty offer, as the message content. The two components are structured as a MIME multipart/mixed message as described previously. Note the signer's certificate chain may be discarded from the detached signature at this point.

The offer is defined as:

```
< !ELEMENT interbank-offer
       (transid, amount, expires, fee, offer-expires) >
< !ELEMENT transid      (#PCDATA) >
< !-- hash of the SignerInfo portion
       of the original detached signature structure -->
< !ATTLIST transid algorithm    (SHA1) #IMPLIED
               seq             (#PCDATA) #REQUIRED >
< !ELEMENT fee         (#PCDATA) >
< !ATTLIST fee         ccy &currcodes; "USD">
< !ELEMENT offer-expires             (#PCDATA) >
< !-- offer expiration time in ISO 8601 format -->
< !-- an example -->
<wpmsg>
       <interbank-offer>
             <transid seq="1">IzBgNVNK45FZV1acHk8qDSouC9A=
             </transid>
             <amount ccy="GBP">10000</amount>
             <expires>19990731T16:00:00</expires>
             <fee ccy="GBP">10</fee>
             <offer-expires>19990611T14:20:00</offer-expires>
       </interbank-offer>
</wpmsg>
```

The transaction ID consists of the SHA-1 hash of the DER of the Signing Party SignerInfo, along with a sequence number which distinguishes multiple runs of the protocol for the same signer contract and signing time. The transaction ID sequence number is assigned by the Issuing Bank, and starts at one for the first offer for a transaction.

The Issuing Bank uses the transaction ID to coordinate multiple requests by the same Relying Party for a warranty for the same transaction. For each request, the Issuing Bank generates a new Offer with a new sequence number.

When the Issuing Bank receives an Accept message, it uses the transaction ID in the Accept message to locate the Offer and it deletes all other Offers for the transaction.

The Issuing Bank also uses the transaction ID to prevent the Relying Party from obtaining a second warranty for the same transaction while an existing warranty has yet to expire.

The offer also identifies the amount and duration for the offered warranty, the warranty fee, and the time for which the offer is valid.

Customer Offer (XML)

The Relying Party Bank creates a CMS SignedData message containing the detached signature of the original transaction and the offer. The forwarded offer is identical in syntax to the interbank offer <!ELEMENT customer-offer (transid, amount, expires, fee, offer-expires)>

Acceptance (XML)

The Relying Party creates a CMS SignedData message containing the detached signature from the original transaction and the acceptance message.

```
< !ELEMENT acceptance   (transid) >
< !ATTLIST acceptance   status (ACCEPT|REJECT) #REQUIRED >
```

Forwarded Acceptance (XML)

The Relying Party Bank creates a CMS SignedData message containing the detached signature of the original transaction and the acceptance message. The message has the same syntax as the customer acceptance message:

```
< !ELEMENT interbank-acceptance         (transid) >
```

Interbank Warranty (XML)

The Issuing Bank creates a CMS SignedData message containing the detached signature of the original transaction and the identity warranty. The warranty has syntax:

<!ELEMENT interbank-warranty (transid, warranty-request, amount, expires, fee)>

The warranty request records the Signing Party and Relying Party inputs to the warranty. The remainder of the message includes the warranty amount, expiration time, and fees.

Identity Warranty (XML)

The Relying Party Bank creates a CMS SignedData message containing the detached signature of the original transaction and the warranty to be issued to the relying party. The warranty has the same structure as the interbank warranty.

<!ELEMENT warranty (transid, warranty-request, amount, expires, fee)>

Identity Warranty Error (XML)

If the Issuing Bank or the Relying Party Bank encounters an error processing the request or if it chooses to deny the request, then it returns this error message. The Bank creates a CMS SignedData message containing the error (described below) and the detached signature of the original transaction as the CMS message content.

Either the Issuing Bank or the Relying Party Bank may generate the identity warranty error message. The messages vary only in that the identity warranty error generated by the Issuing Bank does not include the certificate status. When the Relying Party Bank receives an error generated by the Issuing Bank, then the Relying Party Bank re-signs the Issuing Bank error message content, creates the certificate status field, and sends the message with only the Relying Party Bank signature. If the Issuing Bank signature on an error message is determined to be significant, then the protocol will be expanded to include a forwarded error composed of an error message content with Issuing Bank and Relying Party Bank SignerInfos.

```
< !ELEMENT error (error-text?, transid?, cert-status?) >
< !ATTLIST error status(success|subscriber-ocsp-error|
       rp-ocsp-error|rp-service-ocsp-error|subscriber-service=error|
       exceeds-limit) #REQUIRED >
< !ELEMENT error-text (#PCDATA) >
< !ELEMENT cert-status (#PCDATA) >
< !-- base64-encoded OCSP response message -->
```

If the error was caused by an OCSP response then the Issuing Bank includes the OCSP response in the cert status field of the error.

Warranty Protocol DTD

The warranty protocol DTD is included here:

```
<!--Warranty Protocol DTD    -->
<!-- PUBLIC "-//CertCo//DTD WP 1.0//EN" -->
<!-- SYSTEM "wp.dtd" -->
<!ELEMENT wpmsg
    (warranty-request | interbank-request |interbank-offer |
    customer-offer | acceptance | interbank-acceptance |
    interbank-warranty | warranty | error) >
<!ATTLIST wpmsg version      CDATA      #FIXED "1.0" >
<!ELEMENT warranty-request (amount, expires) >
<!ATTLIST warranty-request reqtype (BID | BUY | ACCEPT) "BID") >
<!ELEMENT amount             (#PCDATA) >
<!-- currency codes per ISO 4217 -->
<!ATTLIST amount             &currcodes; "USD" >
<!ENTITY currcodes
    "( AED | AFA | ALL | AMD | ANG | AOK | AON | ARA | ARS | ATS |
       AUD | AWG | AZM | BAD | BBD | BDT | BEF | BGL | BHD | BIF |
       BMD | BND | BOB | BRE | BRL | BRR | BSD | BTN | BWP | BYB |
       BZD | CAD | CDF | CHF | CLP | CNY | COP | CRC | CUP | CVE |
       CYP | CZK | DEM | DJF | DKK | DOP | DZD | ECS | EEK | EGP |
       ERB | ESP | ETB | EUR | FIM | FJD | FKP | FRF | GBP | GEL |
       GHC | GIP | GMD | GNF | GNS | GQE | GRD | GTQ | GWP | GYD |
       HKD | HNL | HRK | HTG | HUF | IDR | IEP | ILS | INR | IQD |
       IRR | ISK | ITL | JMD | JOD | JPY | KES | KGS | KHR | KMF |
       KPW | KWD | KYD | KZT | LAK | LBP | LKR | LRD | LSL | LTL |
       LUF | LVL | LYD | MAD | MDL | MGF | MKD | MLF | MMK | MNT |
       MOP | MRO | MTL | MUR | MVR | MWK | MXP | MYR | MZM | NAD |
       NGN | NIC | NLG | NOK | NPR | NZD | OMR | PAB | PEI | PEN |
       PGK | PHP | PKR | PLZ | PTE | PYG | QAR | ROL | RUR | RWF |
       SAR | SBD | SCR | SDP | SEK | SGD | SHP | SIT | SKK | SLL |
       SOS | SRG | STD | SVC | SYP | SZL | THB | TJR | TMM | TND |
       TOP | TRL | TTD | TWD | TZS | UAH | UGS | UGX | USD | UYN |
       UYP | UYU | UZS | VEB | VND | VUV | WST | XAF | XCD | XDR |
       XEU | XOF | XPF | YER | YUN | ZAR | ZMK | ZRN | ZWD | )" >
<!ELEMENT expires            (#PCDATA) >
<!-- expiration time in ISO 8601 format -->
<!ELEMENT interbank-request (amount, expires) >
<!ATTLIST interbank-request reqtype (BID | BUY | ACCEPT) "BID") >
<!ELEMENT interbank-offer
    (transid, amount, expires, fee, offer-expires) >
<!ELEMENT transid            (#PCDATA) >
<!-- hash of the SignerInfo portion
    of the original detached signature structure -->
<!ATTLIST transid    algorithm (SHA1) #IMPLIED
                     seq       (#PCDATA) #REQUIRED >
<!ELEMENT fee                (#PCDATA) >
<!ATTLIST fee        ccy &currcodes; "USD">
<!ELEMENT offer-expires      (#PCDATA) >
<!-- offer expiration time in ISO 8601 format -->
<!ELEMENT customer-offer
    (transid, amount, expires, fee, offer-expires) >
<!ELEMENT acceptance         (transid) >
<!ATTLIST acceptance         status (ACCEPT|REJECT) #REQUIRED >
<!ELEMENT interbank-acceptance      (transid) >
<!ELEMENT interbank-warranty
        (transid, warranty-request, amount, expires, fee) >
<!ELEMENT warranty
        (transid, warranty-request, amount, expires, fee) >
        <!ELEMENT error (error-text?, transid?, cert-status?) >
        <!ATTLIST error   status (success|subscriber-ocsp-error|
    rp-ocsp-error|rp-service-ocsp-error|subscriber-service=error|
    exceeds-limit) #REQUIRED >
<!ELEMENT error-text         (#PCDATA) >
<!ELEMENT cert-status        (#PCDATA) >
<!-- base64-encoded OCSP response message -->
```

Functional Description

This section provides further details about the Identity Warranty, Certificate Status, and Identity Warranty Management services. FIGS. 20–28 depict message flow details associated with services according to the present invention.

Identity Warranty Service

The Identity Warranty Service provides Identity Warranties in response to Requests by a Relying Party (RP). The RP communicates directly with the Relying Party Bank (RPB), which performs operations related to the RP: authentication, validation of the status of the RP certificate, etc. The RPB Identity Warranty Service that communicates with the RP is known as the RPBIWS. Assuming these operations are successful, the RPB then signs and forwards the Request to the Signing Party's Issuing Bank (IB). The IB Identity Warranty Service that communicates with the RPB is known as the IBIWS. The IB performs operations related to the RPB and the Signing Party (SP): authentication, authorization and of disbursement of the identity warranty amount, validation of the RPB and SP certificates, etc. The IB sends a response to the RPB, which combines the IB information with its own information and signs and forwards the combined result to the RP.

Operation of the RPBIWS and IBIWS is controlled by the value of the requestType field in the Request message. If the requestType field is set to id—requestOffer then the IB creates and sends an Offer, which the RPB updates, signs, and forwards to the RP. The Offer includes an expiration date, after which the Offer is no longer valid. If the RP wishes to accept the Offer, then at some point before the expiration date, the RP creates and sends an Acceptance message, which the RPB signs and forwards to the IB. The IB disburses the warranty amount from the Signing Party Identity Warranty account, and returns a Warranty message, which the RPB updates, signs and forwards to the RP.

A Request message with requestType field set to id—requestwarranty eliminates the inner round of messages. The IB immediately disburses (or refuses to disburse) the warranty amount and returns a Warranty message to the RPB. The RPB updates, signs and forwards the Warranty to the RP. The Warranty completes the message exchange. The RP does not send an Acceptance message.

All connections preferably use SSL v3 with client authentication (i.e., client certificates).

RPB Identity Warranty Service with Offer and Acceptance: First Round-Trip

Figure 20:
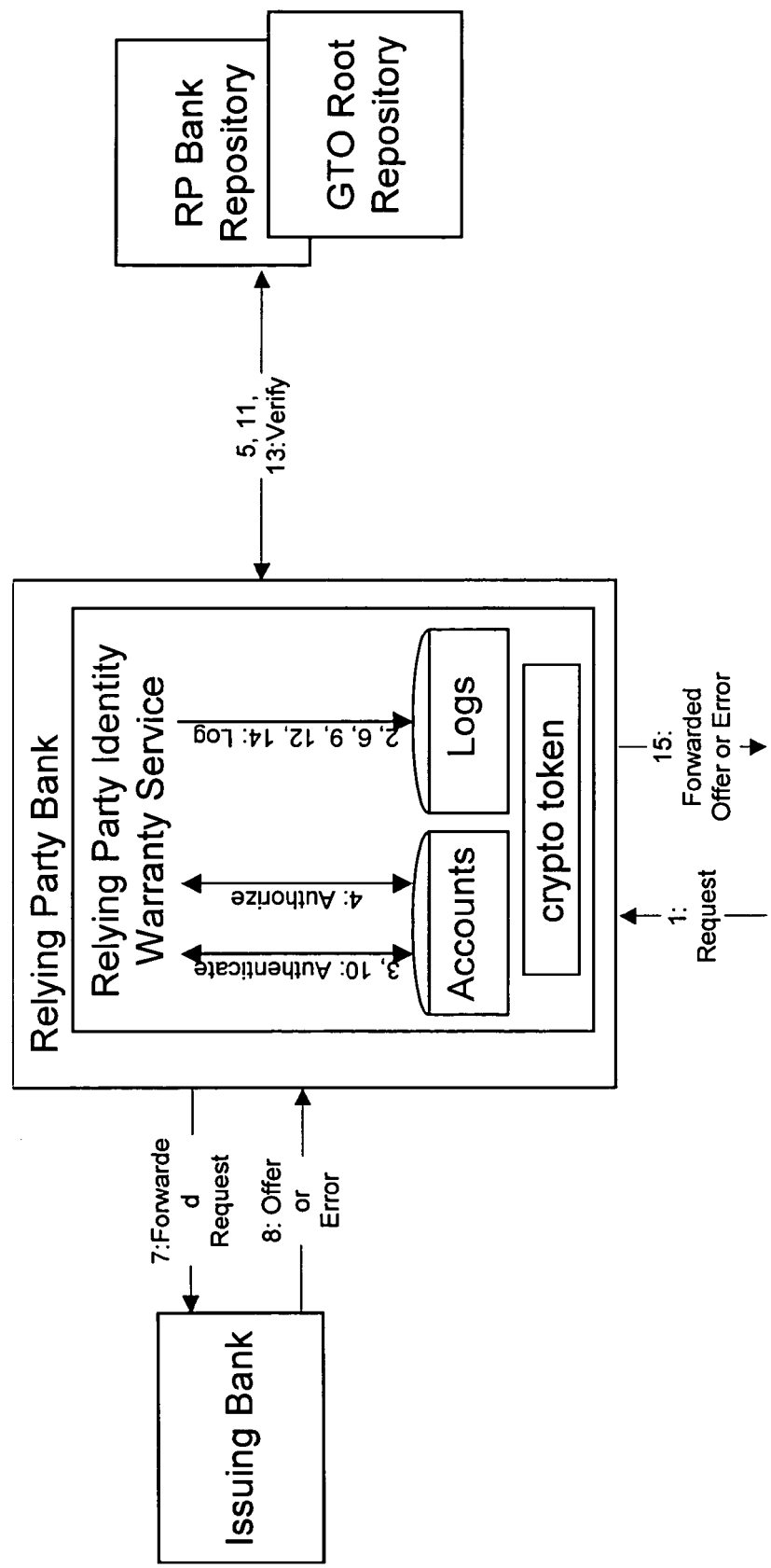
FIGS. 20–29 depict message flow details associated with services according to the present invention.

With reference to FIG. 20, the Relying Party Bank Identity Warranty Service (RPBIWS) is the Relying Party's portal to the Identity Warranty Service provided by the Relying Party Bank (RPB) and Issuing Bank (IB) RM servers.

The RPBIWS authenticates the Relying Party (RP) against the local database of Identity Warranty Accounts and against the Root and RPB Repositories. Then, the RPBIWS authorizes the Request against the Spending Balance and Spending Limit values in the RP's Identity Warranty account.

The Spending Balance and Spending Limit fields restrict the total value of Identity Warranties for which a RP has yet to pay Identity Warranty fees. To authorize a Request, the RPB compares the sum of the Spending Balance and the warranty amount of the Request to the Spending Limit. If the sum exceeds the limit, then the RPB sends an error message with an appropriate status value.

The bank may also choose to extend Request authorization by registering a bank-specific Request authorization method with the RM.

After authorizing the Request, the RPBIWS signs the Request with its RPB Identity Warranty key, logs the Request, forwards the Request to the IB, and waits for the IB response. If the IB approves the Request, it returns an Offer. Otherwise, it returns an Error.

When the RPBIWS receives an Offer from the IB, it authenticates the IB against the local database of Identity Warranty Accounts and against the Repository. Then, the RPBIWS updates the IB Offer, e.g., adds its own charge to the warrantyFee.

Finally, the RPBIWS signs the Offer with its RPB Identity Warranty key, logs the Offer, and forwards the Offer to the RP.

If the RPBIWS receives an Error from the IB, then it still authenticates the IB against the local database of Identity Warranty Accounts and against the Repository. Then, it generates its own Error message, copying or updating the IB error status, signs the Error with its RPB Identity Warranty key, logs the Error, and sends the Error to the RP.

Message flows associated with the relying party bank request/forwarded offer details are described here with reference to FIG. 20.

1. Request message contents (1):
   i. Signer Contract,
   ii. Request (requestType set to id—requestOffer).
2. Log the Request (2).
3. Authenticate RP: check that the account from the RP Identity Warranty certificate in the Request exists in the accounts database and that the SSL client certificate identifier in the account matches the SSL client certificate for the session (3).
4. Authorize Request: check the sum of the Request warranty amount and the Spending Balance field in the RP Identity Warranty Account doesn't exceed the Spending Limit field in the RP Identity Warranty Account, invoke the bank RP authorization method if one is registered (4).
5. Verify RP certificates: check the extensions for the RP Utility Certificate; check the extensions for the certificates in the chain for the RP Identity Warranty Certificate; check the RPB and Root Repositories for the status of the RP Identity Warranty Certificate chain and for the RPB Repository OCSP certificate, log the OCSP responses (5, 6).
6. Sign and forward the Request to the IB for the Signing Party certificate; wait for the response, log response (7, 8, 9).
7. Authenticate Offer or Error: check that the account from the IB Identity Warranty certificate in the Offer or Error exists in the accounts database and that the SSL client certificate identifier in the account matches the SSL server certificate for the session (10).
8. Verify IB certificates: check the extensions for the IB Identity Warranty certificate; query the Root Repository for the status of the IB Identity Warranty certificate, log the OCSP responses (11, 12).
9. Query Root Repository for status of RPB Identity Warranty certificate (13). The signed response for the RPB Identity Warranty certificate, together with a local copy of the Root Repository certificate, enables the RP to verify the status of the RPB Identity Warranty certificate.
10. Update, sign and log the forwarded Offer or Error (14).
11. Send forwarded Offer or Error to RP (15).

The RPBIWS maintains a table that associates the Transaction ID in an Offer with the IB and the Offer itself so that the RPBIWS knows where to forward the Acceptance message and what warranty amount to use to authorize the Acceptance.

IB Identity Warranty Service with Offer and Acceptance: First Round-Trip

The Issuing Bank Identity Warranty Service (IBIWS) provides the Issuing Bank's control over disbursement of Identity Warranties for Identity Warranty accounts. When the IBIWS receives a Forwarded Request with requestType set to id—requestOffer, it begins by authenticating the RPB and the Signing Party against the local database of Identity Warranty Accounts and against the Root and IB Repositories. Then, the IBIWS authorizes the Forwarded Request. Inputs to the authorization decision include:
1. the list of active warranties,
2. the limits imposed by the Signing Party (in the Signer Contract),
3. a limit on the outstanding Identity Warranty amounts for the Signing Party, 4. a limit for the outstanding Identity Warranty amounts for a group of Signing Parties.

First, the IBIWS scans the list of active warranties to see if a warranty for this Signed Transaction is still in effect. Warranties include a copy of the Transaction ID, for which the contractDigest hash uniquely identifies an instance of a Signer Contract in a Signed Transaction. To determine if a warranty for this Signed Transaction is still in effect, the IBIWS generates the contractDigest hash for this Request and scans the list of current warranties for one with a Transaction ID with the same value. Note this does not prevent the IBIWS from repeatedly issuing warranties for the same SignerContract after the previously issued warranty expires. If the SP wishes to prevent an RP from repeatedly obtaining a warranty for the same SignerContract, the SP should specify a warranty duration limit in the SignerContract itself.

Next, the IBIWS authorizes the Forwarded Request against the limits in the Signer Contract. The Signing Party may optional limit any combination of the warranty amount, the warranty duration, or the identity of the RP requesting the Warranty. If:
  a) the warranty amount in the Request exceeds the warranty amount in the Signer Contract, or
  b) the warranty duration in the Request exceeds the warranty duration in the Signer Contract, or
  c) if the RP Identity Warranty certificate in the Request does not match the RP identity in the Signer Contract, then the IBIWS rejects the Forwarded Request with an appropriate status code. Next, the IBIWS checks the sum of
  a) the warranty amount in the Request, and
  b) the Warranty Balance field in the SP Identity Warranty Account do not exceed the Warranty Limit field in the same account. Finally, if the SP is a member of a group, then the IBIWS checks the sum of
  a) the warranty amount in the Request and
  b) the Warranty Balance field for the group account does not exceed the Warranty Limit field for the group.

The bank may also choose to extend Forwarded Request authorization by registering a bank-specific Forwarded Request authorization method with the RM. After authorizing the Request, the IBIWS invokes a bank-specific method to calculate the warranty fee, and records the completed Offer in a local database, which it uses to verify the timeliness of the forwarded Acceptance message (if any). At this time, the IBIWS also creates a unique Transaction ID for the Offer. An RP may request multiple Offers for the same Signer Contract. The IBIWS differentiates between different Offers for the same Signer Contract by including a sequence number in the Transaction ID, which it calculates as the enumeration of Offers with the same Transaction ID contractDigest. Finally, the IBIWS signs the Offer, logs it, and sends it to the RPB.

Figure 21:
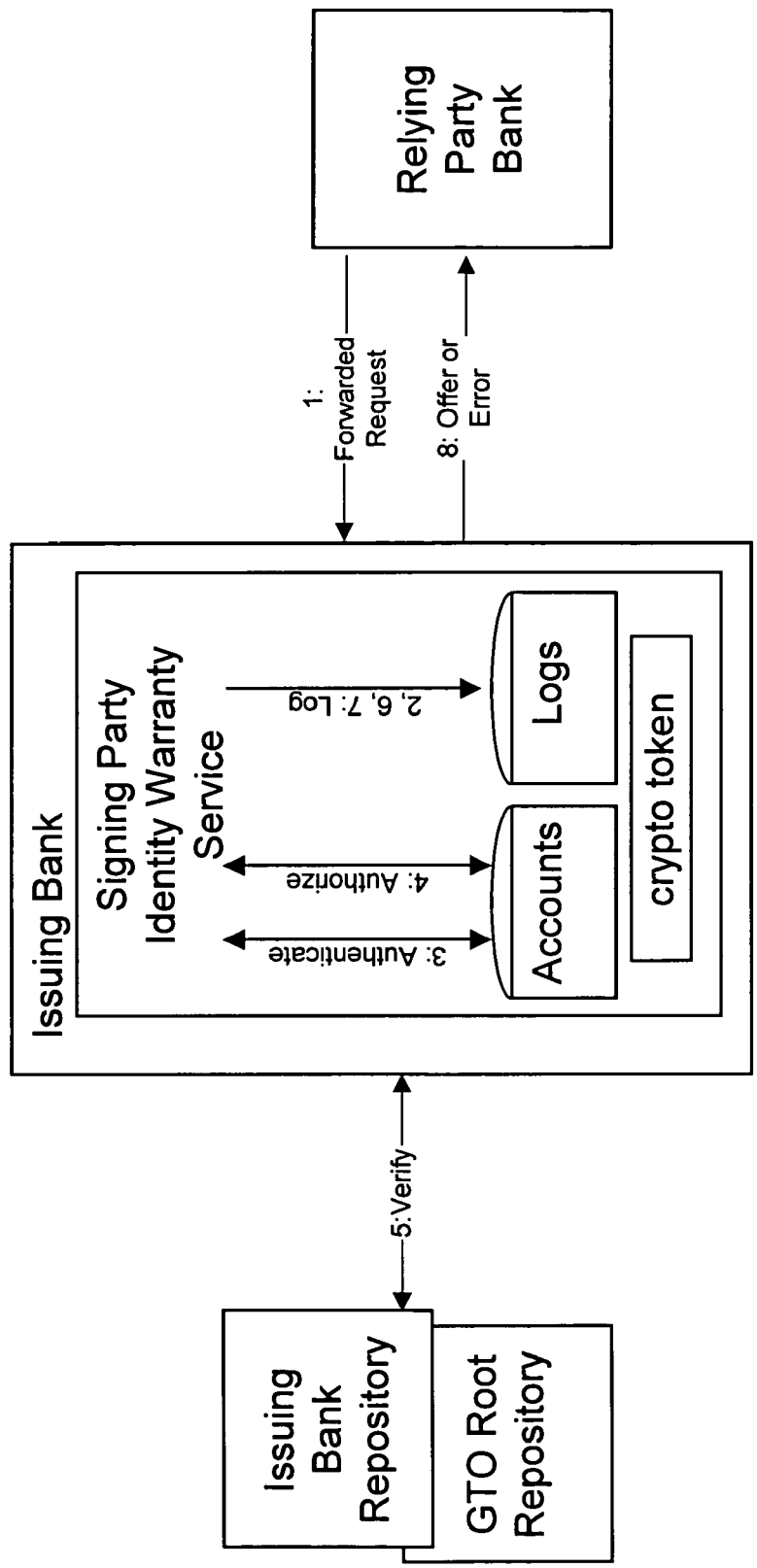

The Message Flow associated with the above is described with reference to FIG. 21.
  1. Forwarded Request message contents (1):
     i. Signer Contract,
     ii. Request (requestType set to id—requestOffer),
     iii. RPB Info.
  2. Log the Forwarded Request (2).
  3. Authenticate RPB and SP: check the accounts from the RPB and SP Identity Warranty certificates exists in the database and that the SSL client certificate identifier in the RPB Identity Warranty Account matches the SSL client certificate for the session (3).
  4. Authorize Forwarded Request: check that no active warranty exists for this Forwarded Request, check the Identity Warranty amount in the Forwarded Request does not exceed the identity warranty amount limit in the Signer Contract, check the time of the Request does not exceed the identity warranty time limit in the Signer Contract, check the identity Relying Party certificate matches the relying party ID in the Signer Contract, check the identity warranty amount does not cause the balance for the SP Identity Warranty account or group of SP Identity Warranty Accounts to exceed its limit, invoke the bank Request authorization method if one is registered (4).
  5. Verify RPB and SP certificates: check the extensions for the RPB Utility Certificate; check the extensions for the certificates in the chains for the RPB and SP Identity Warranty Certificates; check the IB and Root Repositories for the status of the certificates in the chains for the RPB and SP Identity Warranty Certificates and for the IB Repository OCSP Certificate, log OCSP responses (5, 6).
  6. Sign and log the Offer, log OCSP responses (7).
  7. Send Offer to RPB (8).

The IBIWS maintains a list of outstanding Offers sorted by expiration date, which it periodically scans to eliminate Offers whose expiration date has passed and which it also uses to process Forwarded Acceptance messages from the RPB. The list associates a Transaction ID with an Offer and Signing Party Identity Warranty account.

RPB Identity Warranty Service with Offer and Acceptance: Second Round-Trip

Having received and reviewed the RPB Offer message, the RP client chooses either to accept or reject the Offer and sends the RPBIWS an Acceptance message with a field indicating this decision (accept or reject). Alternately, if the RP chooses not to accept the offer, the RP can simply let the Offer expire without sending the Acceptance message. The Relying Party Bank Identity Warranty Service (RPBIWS) authenticates the RP against the local database of Identity Warranty Accounts and against the Root and RPB Repositories. Then, the RPBIWS authorizes the Acceptance against the Spending Balance and Spending Limit values in the Relying Party's Identity Warranty account.

The RPBIWS authorizes the Acceptance the same way it authorized the Request, namely by comparing the sum of the Spending Balance and the warranty amount of the Request to the Spending Limit. The RPBIWS also invokes the bank-supplied Request authorization method, if one is supplied. The RPBIWS authorizes the amount from the Request a second time because the Spending Balance value may have changed since the RPBIWS received and authorized the corresponding Request, e.g., if the RP accepted an Offer for a different Request.

If the sum of the Spending Balance and the warranty amount of the Offer are less than the Spending Limit, then the RPBIWS adds the warranty amount from the Offer to the Spending Balance and logs the transaction. Thus, for the two-round-trip version of the Identity Warranty Protocol, the RPB authorizes the RP two times: once for the Request, for the amount in the Request—at which point the Spending Balance is not modified, once for the Acceptance, for the amount in the Offer—at which point the Spending Balance is modified. (This double authorization is consistent with the IBIWS procedure for authorizing the Forwarded Offer and Forwarded Acceptance messages. Both the RPBIWS and IBIWS wait for the Acceptance message before updating the Spending Balance and Warranty Balance fields in the RP and SP Identity Warranty Accounts. An alternative design would be to update the Balance fields in response to the successful authorization of the Request message, which would have the desirable property of not requiring the second authorization. Unfortunately, it would also mean successive Requests for the same Signer Contract would be authorized (or fail to be authorized) against artificially inflated balances. The IBIWS accepts only one Offer, at which point the warranty amounts for all rejected Offers would flow back to the SP and RP account balances.) After authorizing the Acceptance, the RPBIWS signs the Acceptance with its RPB Identity Warranty key, logs the Acceptance, forwards the Acceptance to the IB, and waits for the IB response. If the IB approves the Acceptance, it returns a Warranty. Otherwise, it returns an Error.

When the RPBIWS receives a Warranty from the IB, it authenticates the IB against the local database of Identity Warranty Accounts and against the Repository. Then, the RPBIWS updates the IB Warranty, e.g., adds its own charge to the warrantyFee. The RPB may also have to adjust the Spending Balance if the warranty amount in the Warranty differs from the amount in the Offer. When the RP pays the bank for the Warranty, then the RM administrator decrements the Spending Balance by the Warranty amount. Finally, the RPBIWS signs the Warranty with its RPB Identity Warranty key, logs the Warranty, and forwards the Warranty to the RP.

If the RPBIWS receives an Error from the IB, then it still authenticates the IB against the local database of Identity Warranty Accounts and against the Repository. Then, it generates its own Error message, copying or updating the IB error status, signs the Error with its RPB Identity Warranty key, logs the Error, and sends the Error to the RP. The RPB also decrements the Offer warranty amount from the Spending Balance.

Figure 22:
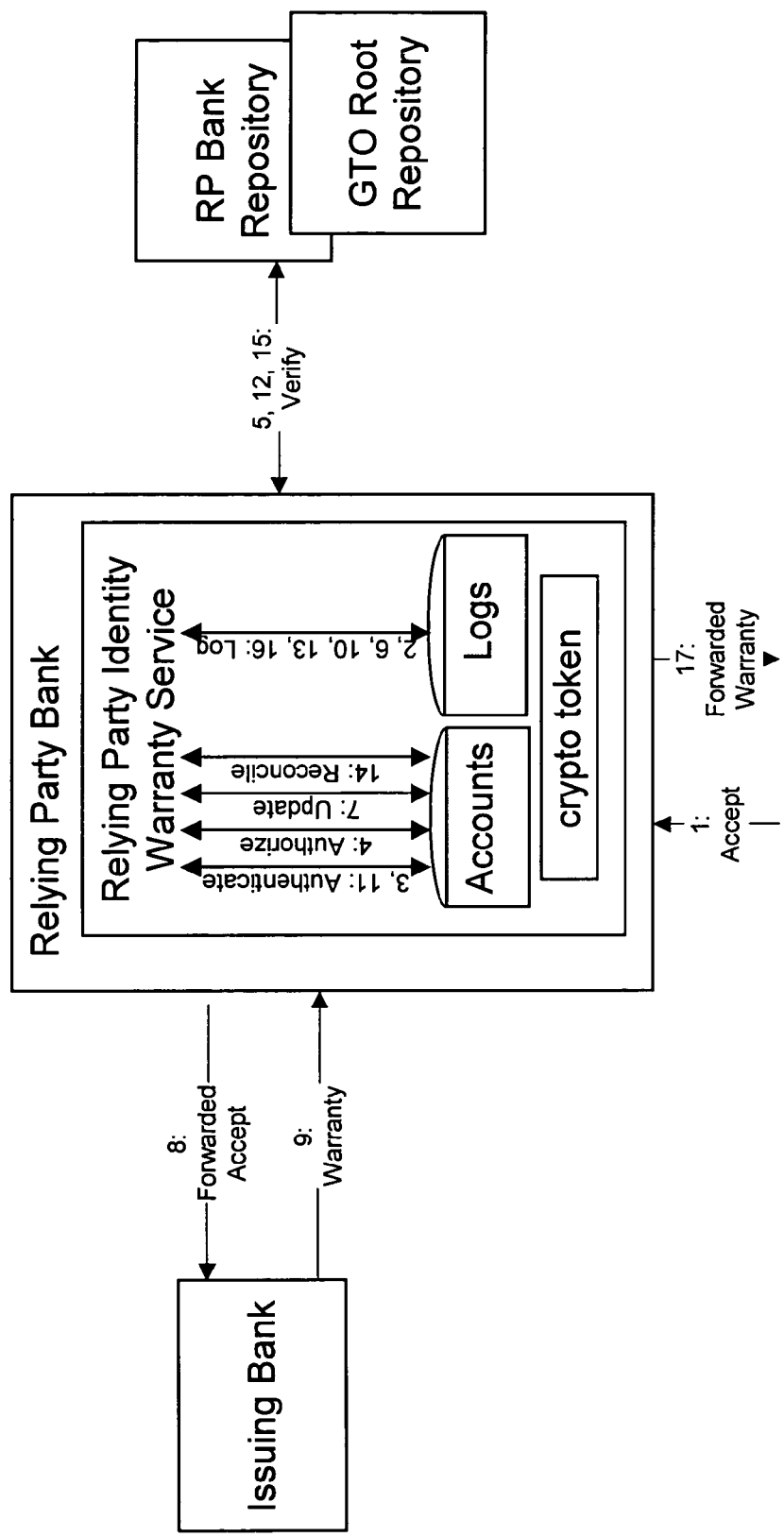

Message flows associated with rpb identity warranty service with offer and acceptance: second round-trip are described with reference to FIG. 22.

1. RP Acceptance message contents (1):
    i. Acceptance (Transaction ID, status)
2. Log the Acceptance (2).
3. Authenticate RP: check that the account from the RP Identity Warranty certificate in the Request exists in the accounts database and that the SSL client certificate identifier in the account matches the SSL client certificate for the session. Also, check that a record for the Offer (stored in the local table by Transaction ID) exists (3).
4. Authorize Acceptance: check the sum of the Identity Warranty amount and the RP Identity Warranty Account Spending Balance field doesn't exceed the RP Identity Warranty Account Spending Limit field, invoke the bank Request authorization method if one is registered (4).
5. Verify RP certificates: check the extensions for the RP Utility Certificate; check the extensions for the certificates in the chain for the RP Identity Warranty Certificate; check the RPB and Root Repositories for the status of the RP Identity Warranty Certificate chain and for the RPB Repository OCSP certificate, log the OCSP responses (5, 6).
6. Update the Relying Party Identity Warranty Account request balance with the Identity Warranty amount (7).
7. Sign and forward the Acceptance to the IB for the Signing Party certificate; wait for the response, log response (8, 9, 10).
8. Authenticate Warranty or Error: check that the account from the IB Identity Warranty certificate in the Warranty exists in the accounts database and that the SSL client certificate identifier in the account matches the SSL server certificate for the session (11).
9. Verify IB certificates: check the extensions for the IB Identity Warranty certificate; query the Root Repository for the status of the IB Identity Warranty certificate, log the OCSP responses (12, 13).
10. Reconcile the Relying Party Identity Warranty Account Spending Balance with the Identity Warranty amount, if necessary (14).
11. Query Root Repository for status of RPB Identity Warranty certificate (15). The signed response for the RPB Identity Warranty certificate, together with a local copy of the Root Repository certificate enables the RP to verify the status of the RPB Identity Warranty certificate.
12. Generate, sign and log the forwarded Warranty (16).
13. Send forwarded Warranty to RP (17).

IB Identity Warranty Service with Offer and Acceptance: Second Round-Trip

Receipt of the Forwarded Acceptance message with the acceptanceStatus field set to id—acceptStatus signals the IBIWS to disburse the Identity Warranty value. First, the IBIWS authenticates the RPB against the local database of Identity Warranty Accounts and against the Root Repository. Next, the IBIWS uses the Transaction ID to locate the Offer in its internal table of outstanding Offers to verify the Offer has not expired. If the Offer has not expired, then the IBIWS authorizes the Forwarded Acceptance.

To authorize the Forwarded Acceptance, the IBIWS checks the warranty amount in the Offer against the Warranty Balances in the SP Identity Warranty Account and the SP Group Account (if one exists). The IBIWS also invokes the bank-supplied Forwarded Acceptance authorization method, if one is supplied.

The IBIWS authorizes the amount from the Forwarded Request a second time in the event other RPs (or even the same RP) might have executed additional Identity Warranties for the SP—and hence changed the values in the SP Identity Warranty Account amount balance field—between the time the IBIWS authorized the amount from the Request and the time it authorized the Forwarded Acceptance.

If the Warranty Balances are less than the Warranty Limits, the IBIWS adds the Identity Warranty amount to the Identity Warranty Balances in the SP and SP Group accounts. This effectively reduces the warranty amount available for the SP and SP Group until the warranty expires, at which time the IBIWS returns the warranty amount to the pool by subtracting it from the SP and SP Group Account Balance fields.

The IBIWS also adds a record of the Warranty to an internal list of active Warranties so the IBIWS can return the Warranty amount after the Warranty expires—assuming no claim has been filed—and so the IBIWS can detect duplicate Requests for the same Signer Contract. The IBIWS may also scan the list of outstanding Offers for entries with the same Transaction ID contractDigest hash and remove each match. (This is a slight optimization. Without it, the IBIWS timer will eventually delete entries when they expire.)

Finally, the IBIWS generates and signs the Warranty, logs it, and sends it to the RPB.

Figure 23:
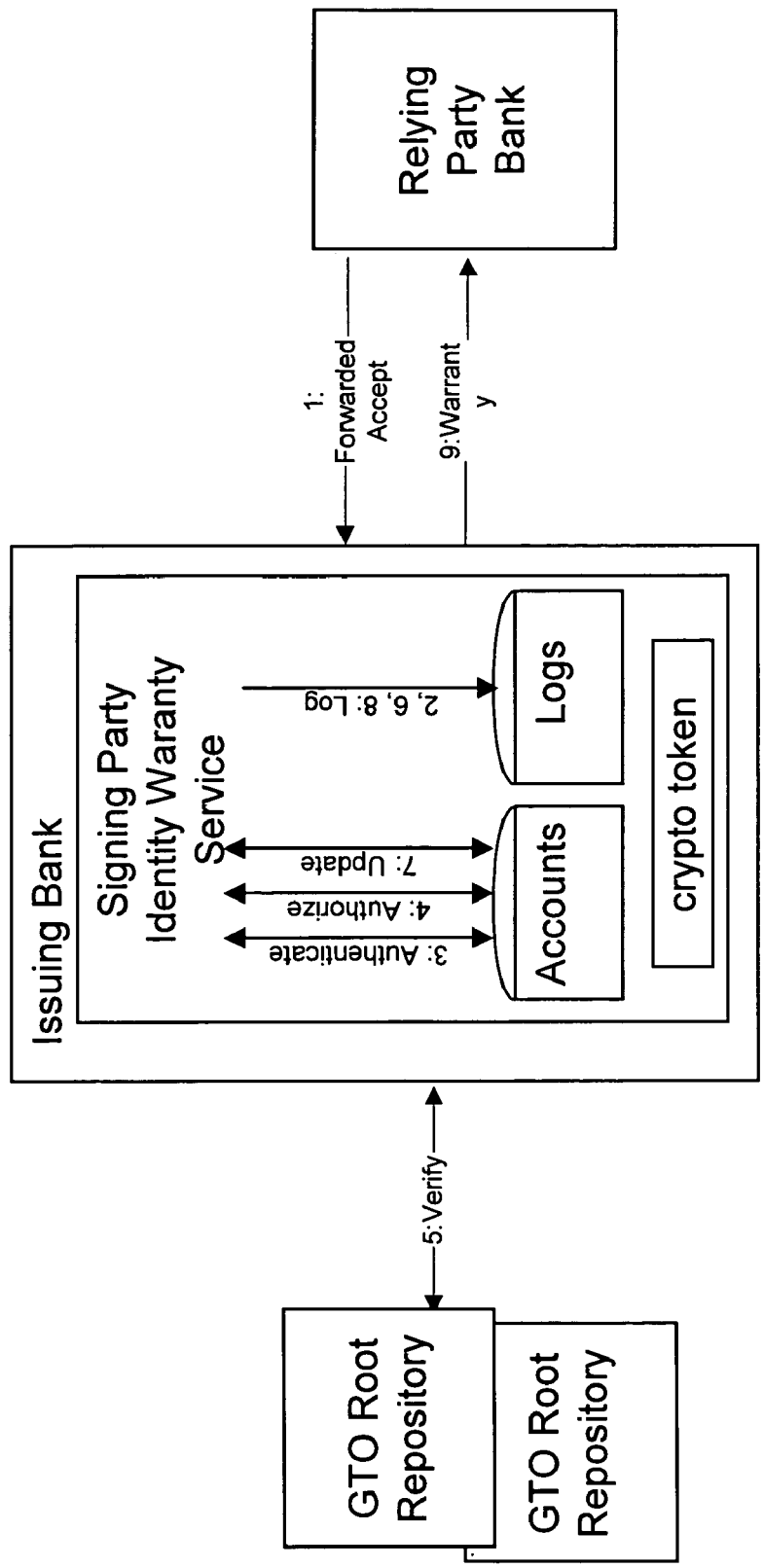

The message flows associated with ib identity warranty service with offer and Acceptance: second round-trip are described with reference to FIG. 23.

1. Forwarded Acceptance message contents (1):
   i. Acceptance (transaction ID, status),
   ii. RPB Info.
2. Log the Forwarded Acceptance (2).
3. Authenticate RPB: check the account from the RPB certificate exists in the database and that the SSL client certificate identifier in the RPB Identity Warranty Account matches the SSL client certificate for the session (3).
4. Authorize Forwarded Acceptance: check the Offer has not expired, check the Identity Warranty amount does not cause the balance for the SP Identity Warranty account or group of SP Identity Warranty Accounts to exceed its limit, invoke the bank Offer authorization method if one is registered, update the Identity Warranty Account amount (4).
5. Verify RPB and SP certificates: check the extensions for the RPB Utility Certificate; check the extensions for the certificates in the chain for the RPB Identity Warranty Certificate; check the IB and Root Repository for the status of the certificates in the chain for the RPB and SP, log OCSP responses (5, 6).
6. Update the warranty balance in the SP Identity Warranty and SP Group accounts (7).
7. Sign and log the Warranty (8).
8. Send Warranty to RPB (9).

RPB Identity Warranty Service without Offer and Acceptance

A Request message with requestType field set to id—requestwarranty eliminates the inner round of messages. The IB immediately disburses (or refuses to disburse) the warranty amount and returns a Warranty (or Error) message. The RPB updates, signs and forwards the Warranty (or Error) to the RP. The Warranty completes the message exchange. The RP does not send an Acceptance message. The message flow and processing steps are the same as for the equivalent steps in the two-part version of the protocol.

The Relying Party Bank Identity Warranty Service (RPBIWS) authenticates the RP against the local database of Identity Warranty Accounts and against the Root and RPB Repositories. Then, the RPBIWS authorizes the Request against the Spending Balance and Spending Limit values in the Relying Party's Identity Warranty account.

If the sum of the Spending Balance and the warranty amount of the Request are less than the Spending Limit, then the RPBIWS adds the warranty amount from the Request to the Spending Balance and logs the transaction.

After authorizing the Request, the RPBIWS signs the Request with its RPB Identity Warranty key, logs the Request, forwards the Request to the IB, and waits for the IB response. If the IB approves the Request, it returns a Warranty. Otherwise, it returns an Error.

When the RPBIWS receives a Warranty from the IB, it authenticates the IB against the local database of Identity Warranty Accounts and against the Repository. Then, the RPBIWS updates the Warranty, e.g., adds its own charge to the warrantyFee. The RPB may also have to adjust the Spending Balance if the warranty amount in the Warranty differs from the amount in the Request. When the RP pays the bank for the Warranty, then the RM administrator decrements the Spending Balance by the Warranty amount.

Finally, the RPBIWS signs the Warranty with its RPB Identity Warranty key, logs the Warranty, and forwards the Warranty to the RP.

If the RPBIWS receives an Error from the IB, then it still authenticates the IB against the local database of Identity Warranty Accounts and against the Repository. Then, it generates its own Error message, copying or updating the IB error status, signs the Error with its RPB Identity Warranty key, logs the Error, and sends the Error to the RP.

Figure 24:
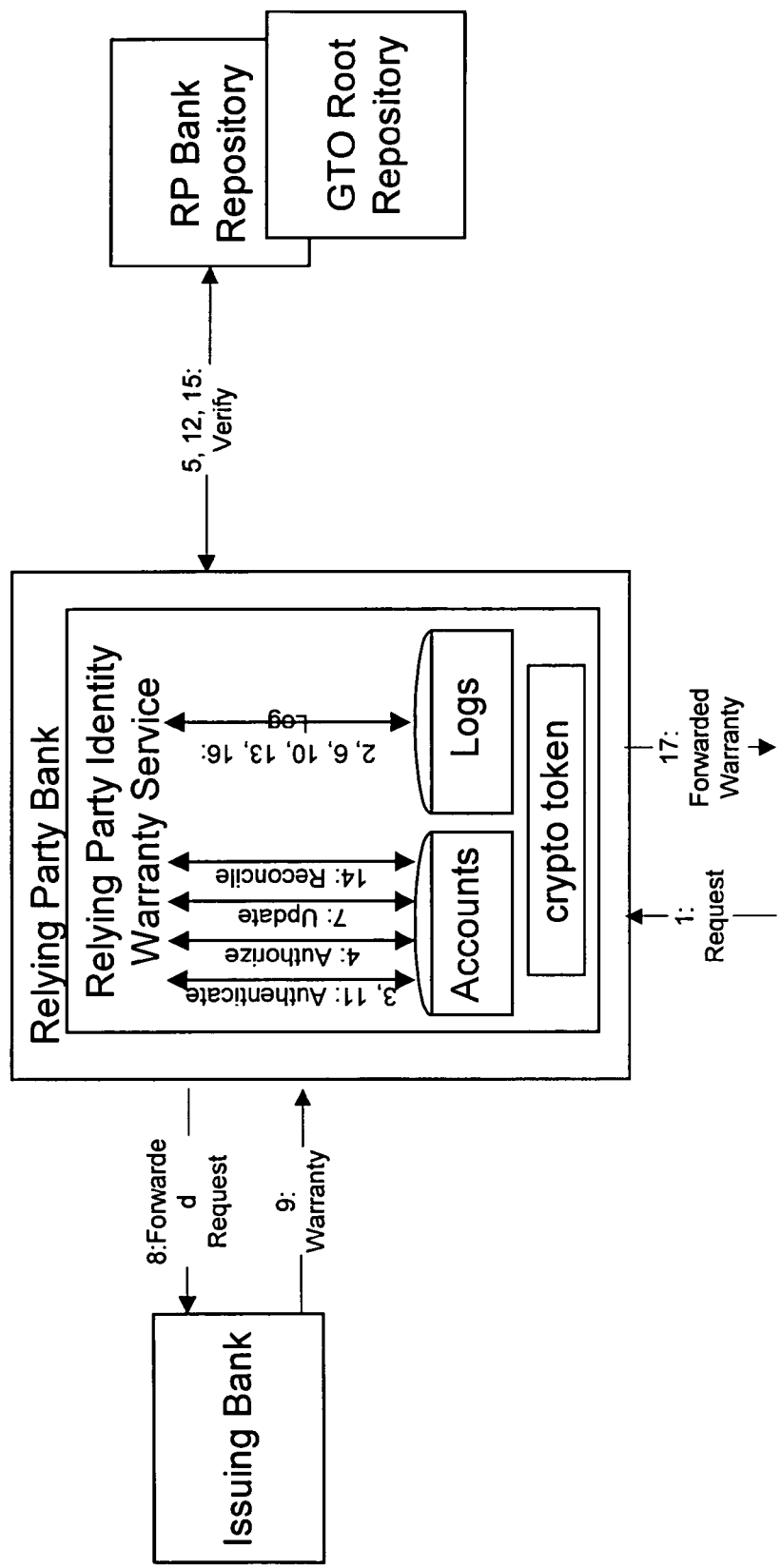

Message flows associated with RPB identity warranty service without offer and Acceptance are described here with reference to FIG. 24.

1. Request message contents (1):
   i. Signer Contract,
   ii. Request (requestType set to id-requestWarranty).
2. Log the Request (2).
3. Authenticate RP: check that the account from the RP Identity Warranty certificate in the Request exists in the accounts database and that the SSL client certificate identifier in the account matches the SSL client certificate for the session (3).
4. Authorize Request: check the sum of the Identity Warranty amount and the RP Identity Warranty Account Spending Balance field doesn't exceed the RP Identity Warranty Account Spending Limit field, invoke the bank Request authorization method if one is registered (4).
5. Verify RP certificates: check the extensions for the RP Utility Certificate; check the extensions for the certificates in the chain for the RP Identity Warranty Certificate; check the RPB and Root Repositories for the status of the RP Identity Warranty Certificate chain and for the RPB Repository, log the OCSP responses (5, 6).
6. Update the Relying Party Identity Warranty Account request balance with the Identity Warranty amount (7).
7. Sign and forward the Request to the IB for the Signing Party certificate; wait for the response, log the response (8, 9, 10).
8. Authenticate Warranty or Error: check that the account from the IB Identity Warranty certificate in the Warranty exists in the accounts database and that the SSL client certificate identifier in the account matches the SSL server certificate for the session (11)
9. Verify IB certificates: check the extensions for the IB Identity Warranty certificate; query the Root Repository for the status of the IB Identity Warranty certificate, log the OCSP responses (12, 13).
10. Reconcile the Relying Party Identity Warranty Account Spending Balance with the Identity Warranty amount, if necessary (14).
11. Query Root Repository for status of RPB Identity Warranty certificate (15). The signed response for the RPB Identity Warranty certificate, together with a local copy of the Root Repository certificate enables the RP to verify the status of the RPB Identity Warranty certificate.
12. Sign and log the forwarded Warranty (16).
13. Send forwarded Warranty to RP (17).

IB Identity Warranty Service without Offer and Acceptance

A Forwarded Request message with requestType field set to id—requestwarranty eliminates the inner round of messages. The IB immediately disburses (or refuses to disburse) the warranty amount and returns a Warranty message.

The message flow and processing steps are the same as for the equivalent steps in the two-part version of the protocol.

The IBIWS authenticates the RPB and the Signing Party against the local database of Identity Warranty Accounts and against the Root and IB Repositories. Then, the IBIWS authorizes the Forwarded Request. The authorization process is the same as that described above.

After authorizing the Forwarded Request, the IBIWS adds the Identity Warranty amount to the Identity Warranty Balances in the SP and SP Group accounts. This effectively reduces the warranty amount available for the SP and SP Group until the warranty expires, at which time the IBIWS returns the warranty amount to the pool by subtracting it from the SP and SP Group Account Balance fields.

The IBIWS also adds a record of the Warranty to an internal list of active Warranties so the IBIWS can return the Warranty amount after the Warranty expires-assuming no claim has been filed-and so the IBIWS can detect duplicate Forwarded Requests for a Warranty for the same Signer Contract.

Next, the IBIWS invokes a bank-specific method to calculate the warranty fee.

Finally, the IBIWS generates and signs the Warranty, logs it, and sends it to the RPB.

Figure 25:
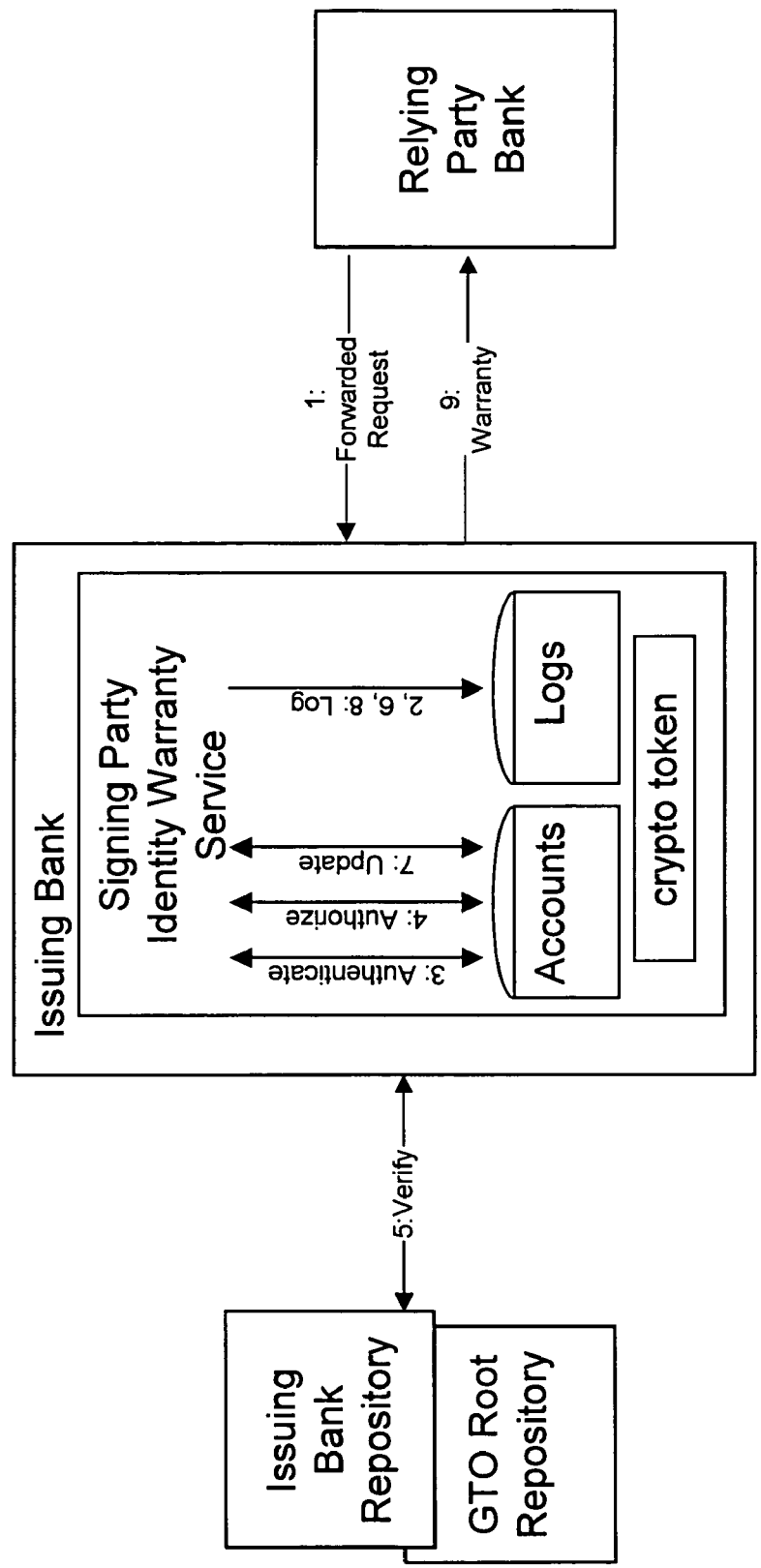

The detailed message flows associated with IB identity warranty service without offer and acceptance are described with reference to FIG. 25.
 1. Forwarded Request message contents (1):
    i. Signer Contract,
    ii. Request (requestType set to id—requestWarranty),
    iii. RPB Info.
 2. Log the Forwarded Request (2).
 3. Authenticate client: check the accounts from the RPB and Signing Party Identity Warranty certificates exists in the database and that the SSL client certificate identifier in the RPB Identity Warranty Account matches the SSL client certificate for the session (3).
 4. Authorize Forwarded Request: check the Identity Warranty amount in the Forwarded Request does not exceed the limit in the Signer Contract and that it does not cause the balance for the Signing Party Identity Warranty Account or group of Signing Party Identity Warranty Accounts to exceed its limit (4).
 5. Verify client certificates: check the extensions for the Relying Party Bank Utility Certificate; check the extensions for the certificates in the chains for the Relying Party Bank and Signing Party Identity Warranty Certificates; check the Relying Party Bank and Root Repositories for the status of the certificates in the chains for the Relying Party Bank and Signing Party Identity Warranty Certificates, log OCSP responses (5, 6).
 6. Update the warranty balance in the SP Identity Warranty and SP Group accounts (7).
 7. Sign and log the Warranty (8).
 8. Send Warranty to RPB (9).

Certificate Status Service

The Certificate Status Service (CSS) determines that a certificate was published by a CA and that the certificate has not been revoked. The CSS communicates directly with its local certificate status service to determine the status of certificates issued by its CA. To determine the status of a certificate issued by a different CA, the CSS creates a new request as though it were the RP and sends the request to the other bank's CSS.

The CSS communicates with clients and with other RMs via the OCSP protocol. In addition, the CSS authenticates clients and saves records of OCSP transactions so they can be used to generate bills for use of the service. To authenticate clients, the CSS requires clients sign their OCSP requests with their Identity Warranty Certificate private key. If the request used SSL, the CSS follows the same authentication algorithm as the RPBIWS and IBIWS, namely, to verify an account exists for the RP Identity Warranty certificate and that the utility certificate identifier in the account matches the RP's SSL client certificate. Note that the CSS authenticates clients whether they are RPs or the CSS at another bank's RM, meaning each RM must include Identity Warranty Accounts for its partner RMs. From the CSS perspective, another bank's RM just looks like a very active RP.

Note also that although the CSS serves OCSP requests, it does not directly fulfill the request, but functions instead as a proxy to the certificate status services of the local bank or possibly of the remote bank RM. The CSS authenticates these certificate status services and messages through OCSP requests of its own and through local copies of top-level certificates. As proxy OCSP, the CSS must implement the OCSP nonce algorithm and it must also verify the nonce returned by the local Repository and by the CSS of neighbor RMs.

Local Certificate

Figure 26:
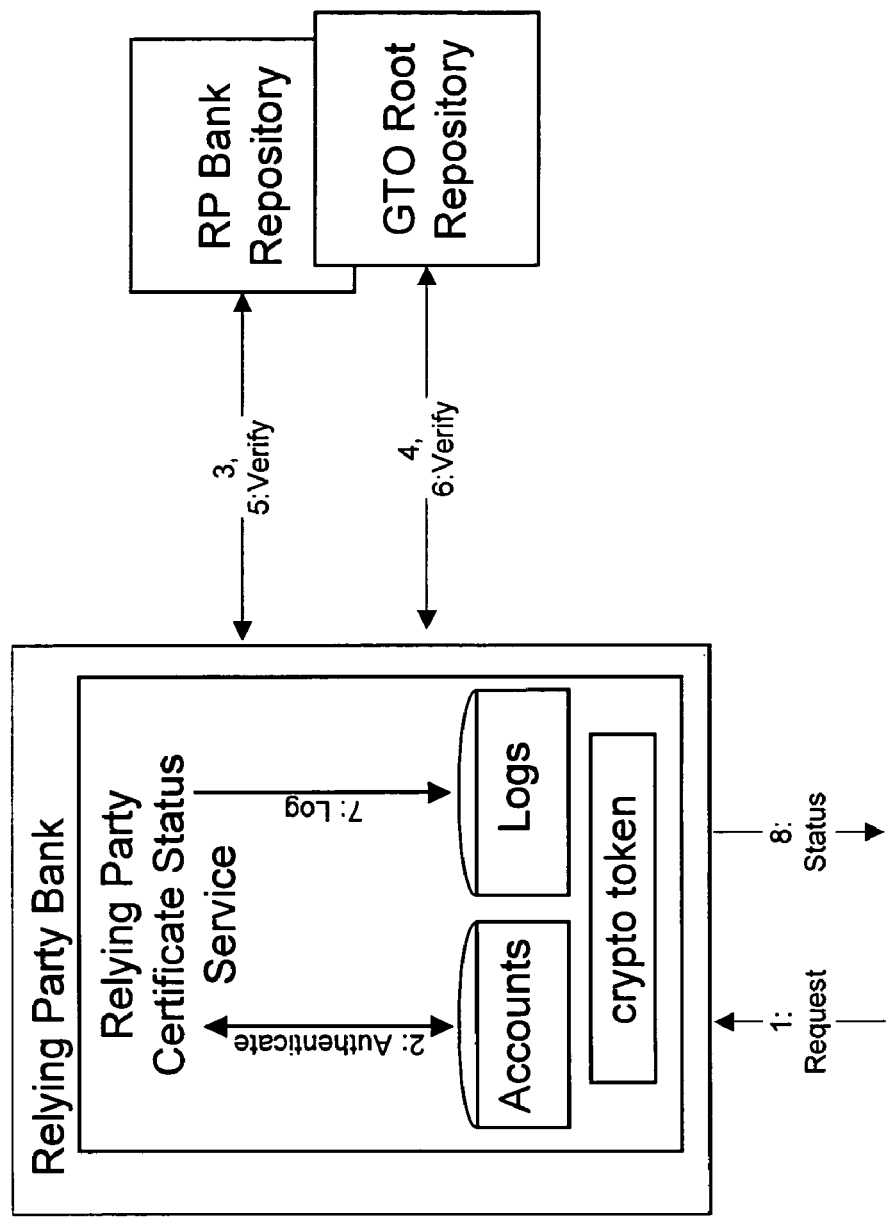

The CSS starts by authenticating and verifying the RP. It checks an account exists for the RP Identity Warranty certificate. If the RP used SSL, it verifies the utility certificate identifier in the account matches the SSL client certificate. Finally, it checks the status of the RP certificate with its local Repository and it checks the status of its Repository Certificate with the Repository. If the CSS successfully authenticates the client, then it checks its local Repository for the status of the certificate in the RP's OCSP request. For completeness, it then checks again with the Repository for the status of the local Repository certificate. The CSS finishes by logging the certificate request and formatting, signing, and sending the OCSP response to the RP. With reference to FIG. 26,
 1. OCSP request contents (1):
    i. Certificate chain (for certificate issued by CA for this bank),
    ii. RP signature and certificate chain.
 2. Authenticate RP: check that the account from the Relying Party Identity Warranty certificate in the Request exists in the accounts database and that the SSL client certificate identifier in the account matches the SSL client certificate for the session (2).
 3. Verify RP certificates: check the extensions for the RP Utility Certificate (if present); check the extensions for the certificates in the chain for the RP Identity Warranty Certificate; check the RPB Repository for the status of the RP certificate; check the Repository for the status of the RPB Repository and RPB CA certificates (3, 4).
 4. Verify requested certificates: check the RPB Repository for the status of the requested certificate; check the Root Repository for the status of the RPB Repository and RPB CA certificates (5, 7).
 5. Record transaction (7)
 6. Sign and return OCSP response to RP (8).

Remote Certificate

The CSS starts by authenticating and verifying the RP. It checks an account exists for the RP Identity Warranty certificate. If the RP used SSL, it verifies the utility certificate identifier in the account matches the SSL client certificate. Finally, it checks the status of the RP certificate with its local Repository and it checks the status of its Repository Certificate with the Repository. If the CSS successfully authenticates the client, then it formats and forwards an OCSP request for the certificate in the RP's OCSP request to the CSS at the Reliance Manager of the bank that issued the certificate. The local CSS authenticates the response by verifying the remote CSS certificate with the Root Repository.

Figure 27:
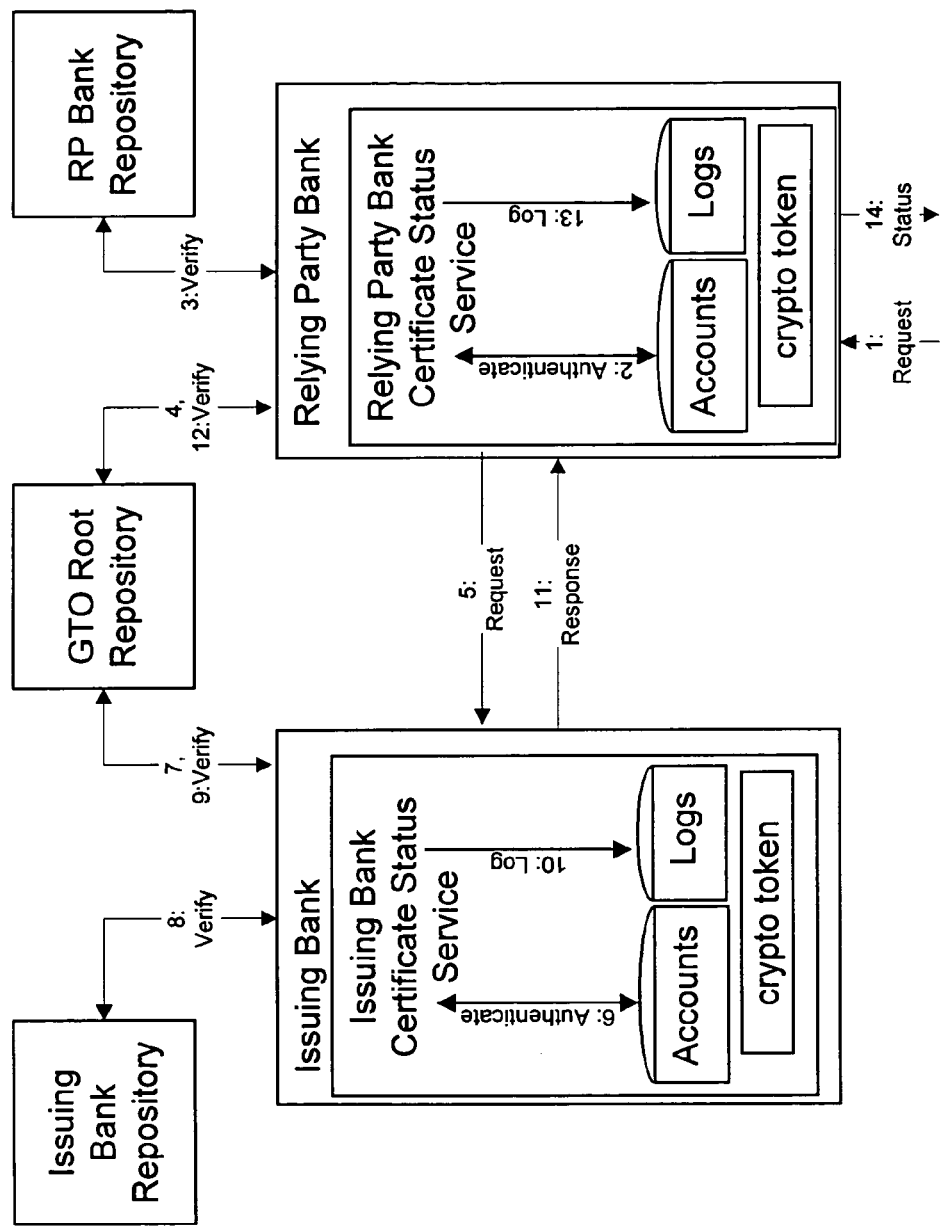

With reference to FIG. 27,
1. OCSP request contents (1):
   i. Certificate chain (for certificate issued by CA for remote bank),
   ii. RP signature and certificate chain.
2. Authenticate client: check that the account from the Relying Party Identity Warranty certificate in the Request exists in the accounts database and that the SSL client certificate identifier in the account matches the SSL client certificate for the session (2).
3. Verify RP certificates: check the extensions for the RP Utility Certificate (if present); check the extensions for the certificates in the chain for the RP Identity Warranty Certificate; check the RPB Repository for the status of the RP certificate; check the Repository for the status of the RPB Repository and RPB certificates (3, 4).
4. Create OCSP request for certificates in RP request. Forward it to remote CSS (Issuing Bank):
   i. Certificate chain (for certificate issued by CA for remote bank),
   ii. RPB signature and certificate chain.
5. Authenticate RPB: check that the account from the Relying Party Bank Identity Warranty certificate in the Request exists in the accounts database and that the SSL client certificate identifier in the account matches the SSL client certificate for the session (6).
6. Verify RPB certificates: check the extensions for the RPB Utility Certificate; check the extensions for the certificates in the chain for the RPB Identity Warranty Certificate; check the Repository for the status of the RPB Identity Warranty certificate (7).
7. Verify requested certificates: check the IB Repository for the status of the requested certificate; check the Root Repository for the status of the IB Repository and IB CA certificates (8, 9).
8. Record transaction (10)
9. Sign and return OCSP response to RPB (11).
10. Verify response: check the Repository for the status of the IB certificate (12).
11. Record transaction (13)
12. Sign and return OCSP response to RPB (14).

Identity Warranty Management Service

The Identity Warranty Management Service (IWMS) implements management actions for the RM server. Management commands act against several targets: Identity Warranty Accounts, the RPBIWS Identity Warranty Transaction Log, the IBIWS Transaction Log, IB internal list of outstanding Identity Warranties, CSS Log, IWMS Log. Management commands vary per target. For many of the targets, the only management command is to return a report of entries given a selection criterion (e.g., a range of dates): RPBIWS Identity Warranty Transaction Log, IBIWS Transaction Log, CSS Log, IWMS Log. Other targets also support create, modify, delete, and approve commands: Identity Warranty Accounts, IBIWS Authorization, IBIWS Pending Commands, IB internal list of outstanding Identity Warranties (e.g., to mark an entry subject to a claim). A final group of management commands controls operation of the RM server itself: edit authorization database records, edit routing tables, etc.

The IWMS supports two protocols, distinguished by URLs: one for reports, one for all other management commands. Report commands are simply HTTP POST messages conveyed via SSL v3 with client certificates. Report responses are comma-delimited lines of data matching the request from the original HTTP POST. The IWMS authenticates the client by verifying the status of the SSL client (a.k.a. Utility) certificate with the Bank's Repository. The IWMS authorizes the command by comparing the "report" management command, the management command target, and the Subject DN from the SSL client (a.k.a. Utility) against the privileges listed for that DN listed in the authorization database.

All other commands are encoded as CMS SignedData messages where the signature is generated by the administrator's Identity Warranty Certificate private key and the messages are conveyed over SSL v3 with client certificates (as with the RPBIWS, IBIWS, and CSS). As with the RPBIWS, IBIWS, and CSS, IWMS clients are authenticated and the status of the IWMS client certificates is verified. Next, the management command in the request is authorized by comparing the management command, the management command target, and the Subject DN from the client certificate with the privileges for that DN listed in the authorization database (create, modify, delete, approve, report, etc.).

IWMS commands that create, modify, or delete Identity Warranty Accounts implement a multi-part change process that requires the action of an administrator, who initially submits a create or edit command, and of one or more authorizers, who approve the command. The change is only applied to the database when a quorum of administrators approves the command. Permission to submit and approve commands is controlled by the RM authorization database. As with the other services, management commands are recorded in a log, and administrators may invoke commands that generate reports, depending on the their rights in the authorization database.

IWMS Report Commands

Figure 28:
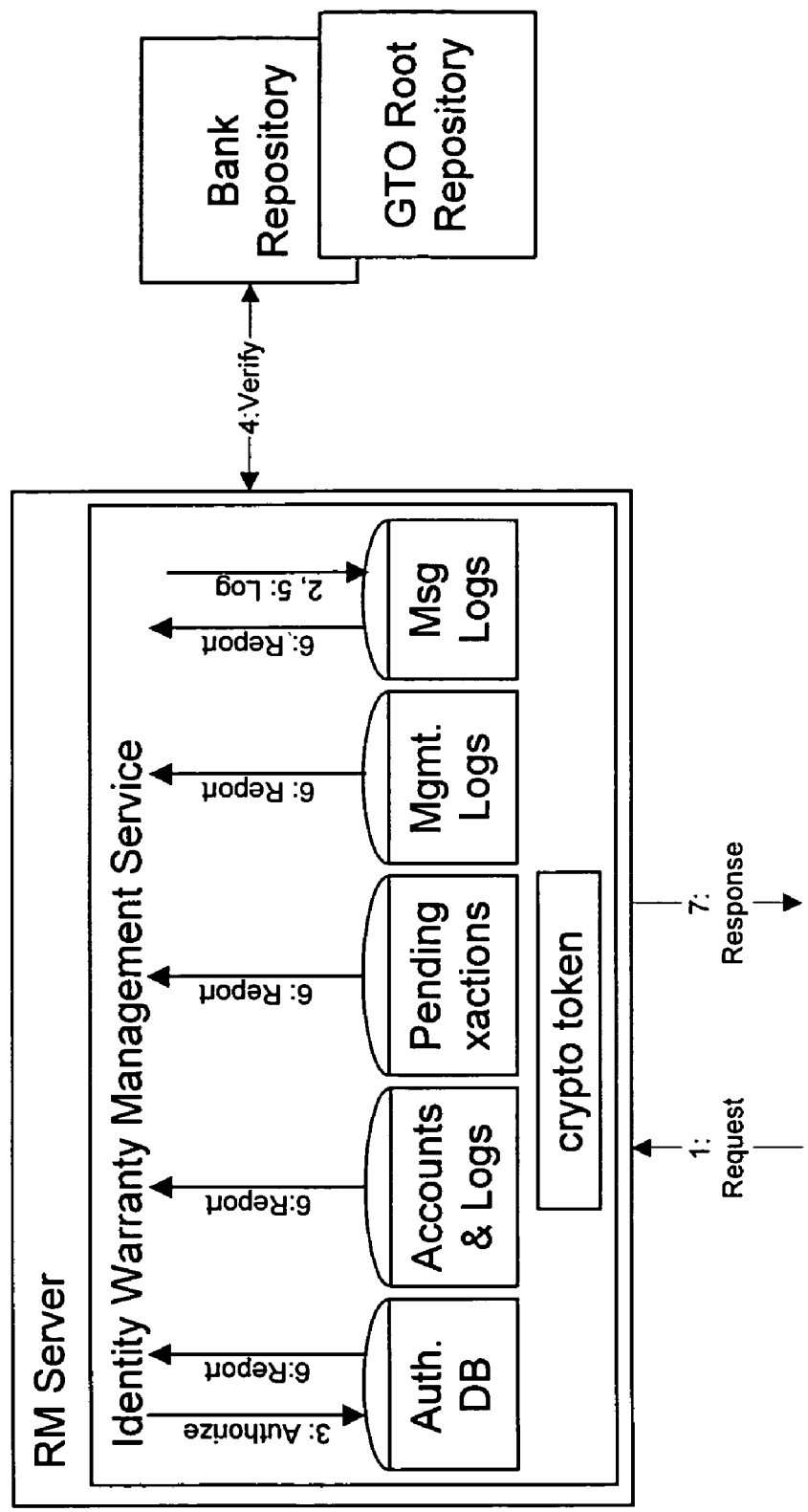

In the diagram in FIG. 28, "Auth DB" is the IBIWS Authorization database, "Accounts and Logs" stands for Identity Warranty Accounts, the RPBIWS Identity Warranty Transaction Log, the IBIWS Transaction Log, the CSS Log, and the IB internal list of outstanding Identity Warranties, "Pending xactions" stands for the IBIWS Pending Commands, and "Mgmt Logs" stands for the IWMS Log.

With reference to FIG. 28,
1. Management report command message contents (1):
   i. Management command target, e.g., "Identity Warranty Accounts"
   ii. Report selection criterion (e.g., "all records between Jan. 1, 1991 and Jan. 2, 1991")
2. Log report request (2).
3. Authorize command: Check the entry for the IWMS Authorization Database for the Subject DN from the Utility Certificate includes a record listing "report" permission for the management command target (3).
4. Verify administrator certificate: check the extensions for the Utility Certificate; check the Bank Repository for the status of the Utility certificate, log OCSP response (4, 5).
5. Execute command: Invoke the database stored procedure (or directory list procedure for the message log) to generate the report response for the target specified in the request (6).
6. Return the response (7).

Other IWMS Commands

Management commands other than "report" are encoded as CMS SignedData messages and conveyed over SSL v3 with client certificate. Authentication of the client and verification of the client certificate is the same as for the RPBIWS, IBIWS, and CSS. Authorization is administered via the IWMS authorization database and via the quorum of required approvers.

Figure 29:
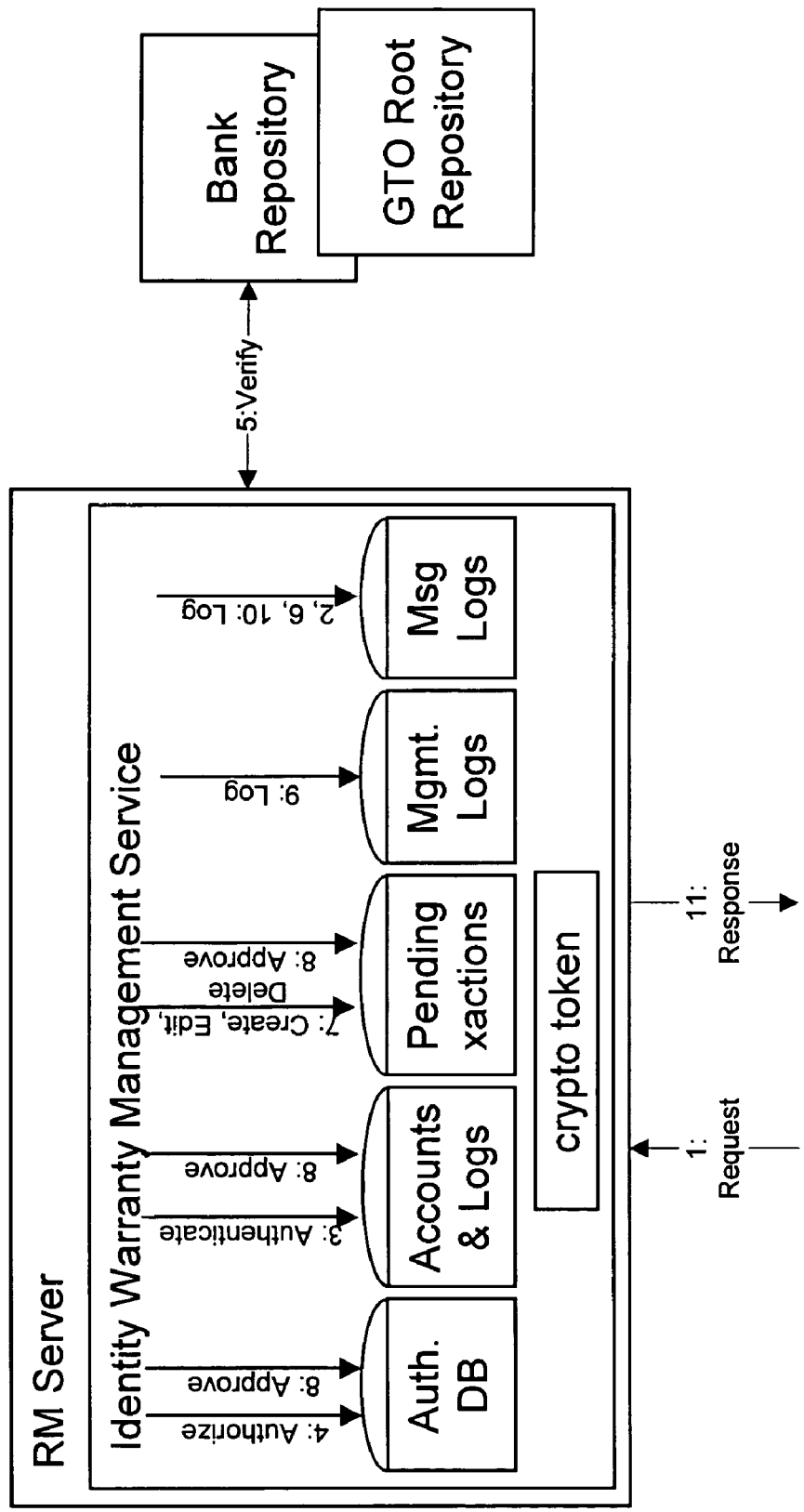

In the diagram in FIG. 29, "Auth DB" is the IBIWS Authorization database, "Accounts and Logs" stands for Identity Warranty Accounts, the RPBIWS Identity Warranty Transaction Log, the IBIWS Transaction Log, the CSS Log, and the IB internal list of outstanding Identity Warranties, "Pending xactions" stands for the IBIWS Pending Commands, and "Mgmt Logs" stands for the IWMS Log.

With reference to FIG. 29,
1. Management command message contents (1):
    i. AdminRequest (command, target, parameters)
2. Log request (2).
3. Authenticate Administrator: check that the account from the Administrator Identity Warranty certificate in the Request exists in the accounts database and that the SSL client certificate identifier in the account matches the SSL client certificate for the session (3).
4. Authorize command for Administrator: compare the management command and target with the permissions listed for the Administrator Identity Warranty Certificate Subject DN in the IWMS Authorization Database (4).
5. Verify Administrator certificates: check the extensions for the Administrator Utility Certificate; check the extensions for the certificates in the chain for the Administrator Identity Warranty Certificate; check the Bank Repository for the status of the RP certificate; check the Repository for the status of the Bank Repository and Bank CA certificates, log OCSP responses (5, 6).
6. Execute command:
    i. Created, edit, delete commands extract add a new entry to the IWMS Pending Commands Database (7).
    i. Approve command applies entry from IWMS Pending Commands Database to target (8).
7. Record the transaction (9),
8. Sign, log and return the response (10, 11).

IWMS Authorization Database

The RM implements an authorization model to determine whether or not a bank employee will be allowed to perform their required operation. The model partitions the Signing Party database according to the Distinguished Name of the Signing Party. Entries in an access control file specify which employees, known as the client, have access to particular branch of the tree, known as the target, and what types of operations they can perform on entities under the branch. For example:

| Client | Target | Rights |
| --- | --- | --- |
| CN = Agent 99, OU = Spies, O = Control, C = US | OU = Spies, O = Control, C = US | Raise Limit Disable Revoke |
|  | CN = Agent 86, OU = Spies, O = Control, C = US | Shoot |

When deciding if a client is authorized to perform an operation the longest DN match (i.e., the one with the lowest level) is used. In the example above, if the Agent 99 tried to revoke Agent 86's certificate, the second entry would be used, not the first, and the operation would be disallowed. While this short summary does not do the model justice, we believe it is flexible enough to support appropriate delegation to subsidiaries.

Account modifications may have an additional requirement that they be approved by more than one party. The initial implementation will allow each RM to set a run-time quorum on modification operations. When an appropriate bank employee connects to the AMS, they can review "change requests" or add their own. Once a request has been approved by the necessary quorum, the RM will act upon the change. The initiator may cancel a change request.

CMS Profile

This section profiles the use of CMS for:
1. the initial message from signer to relying party;
2. the identity warranty request from the relying party to the relying party bank;
3. the forwarded identity warranty request from the relying party bank to the issuing bank;
4. the identity warranty offer from the issuing bank to the relying party bank;
5. the forwarded identity warranty offer from the relying party bank to the signing party;
6. the identity warranty acceptance from the relying party to the relying party bank;
7. the forwarded identity warranty acceptance from the relying party bank to the issuing bank;
8. the identity warranty from the issuing bank to the relying party bank;
9. the forwarded identity warranty from the relying party bank to the relying party.

Notation is as defined in the certificate profile specification. In the following tables:
1) The "support" column indicates requirements on origination and reception; e.g., "o/m" means an element is optional on origination and mandatory on reception;
2) "m" indicates support is mandatory (although the element need not be present in every message);
3) "o" indicates support is optional;
4) "x" indicates the element is prohibited;
5) "r" indicates the element is required to be present (on origination).

Initial Transaction

TABLE 1A

Signer Contract

| Field | Support |
| --- | --- |
| version | mr/m |
| ContractID | mr/m |
| TransactionType | m/m |
| PaymentType | m/m |
| AmountLimit | m/m |
| TimeLimit | m/m |
| RelyingPartyID | m/m |
| ContractAmount | m/m |
| ContractExpires | m/m |
| Extensions | o/m |

TABLE 1B

Signed Transaction Message

| Field | Support | Notes |
| --- | --- | --- |
| Version | mr/m | 1 |
| DigestAlgorithms | mr/m | SHA-1 (only 1) |
| EncapContentInfo | mr/m |  |
| contentType | mr/m | id-gto-signerContract |
| content | o/m | SignerContract, see Table 1A |
| certificates | m/m | chain from SP to root |
| certificate | m/m |  |
| extendedCertificate | o/o |  |

TABLE 1B-continued

Signed Transaction Message

| Field | Support | Notes |
|---|---|---|
| attrCert | o/o | |
| crls | o/o | |
| signerInfos | mr/m | 1 |
| version | mr/m | 1 |
| issuerAndSerialNumber | mr/m | |
| digestAlgorithm | mr/m | SHA-1 |
| signedAttrs | mr/m | |
| contentType | mr/m | id-gto-signerContract |
| messageDigest | mr/m | digest of signer contract |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |
| transaction | mr/m | unstructured |
| signing party authorization data | o/m | card & signature security data (CSSD) |

Identity Warranty Request

TABLE 2A

Identity Warranty Request

| Field | Support |
|---|---|
| version | mr/m |
| warrantyAmount | mr/m |
| warrantyExpires | mr/m |
| requestType | m/m |
| extensions | o/m |

TABLE 2B

Identity Warranty Request Message

| Field | Support | Notes |
|---|---|---|
| version | mr/m | 1 |
| digestAlgorithms | mr/m | SHA-1 (only 1) |
| encapContentInfo | mr/m | |
| contentType | mr/m | id-gto-signerContract |
| content | o/m | SignerContract, see Table 1A |
| certificates | m/m | chain from SP to plus chain from RP to root |
| certificate | m/m | |
| extendedCertificate | o/o | |
| attrCert | o/o | |
| crls | o/o | |
| signerInfos[0] | mr/m | 2, this one from signed transaction |
| version | mr/m | 1 |
| issuerAndSerialNumber | mr/m | |
| digestAlgorithm | mr/m | SHA-1 |
| signedAttrs | mr/m | |
| contentType | mr/m | id-gto-signerContract |
| messageDigest | mr/m | digest of SignerContract |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |
| signing party authorization data | o/m | card & signature security data (CSSD) |
| SignerInfos[1] | mr/m | This one added by Relying Party |
| version | mr/m | 1 |
| issuerAndSerialNumber | mr/m | |
| digestAlgorithm | mr/m | SHA-1 |
| signedAttrs | mr/m | |
| contentType | mr/m | id-gto-signerContract |
| messageDigest | mr/m | digest of SignerContract |

TABLE 2B-continued

Identity Warranty Request Message

| Field | Support | Notes |
|---|---|---|
| signingTime | m/m | |
| warrantyRequest | mr/m | See TABLE 4.2A |
| signingCertificate | mr/m | |
| signatureAlgorithm | mr/m | RSA (PKCS #1) |
| signature | mr/m | |
| unsignedAttrs | o/m | |
| countersignature | o/o | |

Forwarded Identity Warranty Request

TABLE 3A

Relying Party Bank Info

| Field | Support |
|---|---|
| VERSION | mr/m |
| extensions | o/m |

TABLE 3B

Forwarded Identity Warranty Request Message

| Field | Support | Notes |
|---|---|---|
| version | mr/m | 1 |
| digestAlgorithms | mr/m | SHA-1 (only 1) |
| encapContentInfo | mr/m | |
| contentType | mr/m | id-gto-signerContract |
| content | o/m | SignerContract, see Table 1A |
| certificates | m/m | chains from SP, RP, and RPB to root |
| certificate | m/m | |
| extendedCertificate | o/o | |
| attrCert | o/o | |
| crls | o/o | |
| signerInfo[0] | mr/m | 3, this one from signed transaction |
| version | mr/m | 1 |
| issuerAndSerialNumber | mr/m | |
| digestAlgorithm | mr/m | SHA-1 |
| signedAttrs | mr/m | |
| contentType | mr/m | id-gto-signerContract |
| messageDigest | mr/m | digest of SignerContract |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |
| signing party authorization data | o/m | card & signature security data (CSSD) |
| signerInfo[1] | mr/m | This one from request |
| version | mr/m | 1 |
| issuerAndSerialNumber | mr/m | |
| digestAlgorithm | mr/m | SHA-1 |
| signedAttrs | mr/m | |
| contentType | mr/m | id-gto-signerContract |
| messageDigest | mr/m | digest of SignerContract |
| signingTime | m/m | |
| warrantyRequest | mr/m | See Table 2A |
| signingCertificate | mr/m | |
| signatureAlgorithm | mr/m | RSA (PKCS #1) |
| signature | mr/m | |
| unsignedAttrs | o/m | |
| countersignature | o/o | |
| signerInfo[2] | mr/m | This one signed by Relying Party Bank |
| version | mr/m | 1 |
| issuerAndSerialNumber | mr/m | |
| digestAlgorithm | mr/m | SHA-1 |
| signedAttrs | mr/m | |
| contentType | mr/m | id-gto-signerContract |
| messageDigest | mr/m | digest of SignerContract |
| signingTime | m/m | |

TABLE 3B-continued

Forwarded Identity Warranty Request Message

| Field | Support | Notes |
|---|---|---|
| rpBankInfo | mr/m | See Table 3A |
| signingCertificate | mr/m | |
| signatureAlgorithm | mr/m | RSA (PKCS #1) |
| signature | mr/m | |
| unsignedAttrs | o/m | |
| countersignature | o/o | |

Identity Warranty Offer
TABLE 4A

Attribute Digest

| Field | Support |
|---|---|
| VERSION | mr/m |
| attributeId | mr/m |
| randomPad | mr/m |
| digestValue | mr/m |

TABLE 4B

Identity Warranty Offer

| Field | Support |
|---|---|
| VERSION | mr/m |
| transactionId | mr/m |
| warrantyAmount | mr/m |
| warrantyExpires | mr/m |
| warrantyFee | mr/m |
| offerExpires | mr/m |
| extensions | o/m |

TABLE 4C

Identity Warranty Offer Message

| Field | Support | Notes |
|---|---|---|
| version | mr/m | 1 |
| digestAlgorithms | mr/m | SHA-1 (only 1) |
| encapContentInfo | mr/m | |
| contentType | mr/m | id-gto-warrantyOffer |
| content | o/m | attribute digest, see Table 4A |
| certificates | m/m | Chain from IB to root |
| certificate | m/m | |
| extendedCertificate | o/o | |
| attrCert | o/o | |
| crls | o/o | |
| signerInfos | mr/m | only 1 |
| version | mr/m | 1 |
| issuerAndSerialNumber | mr/m | |
| digestAlgorithm | mr/m | SHA-1 |
| signedAttrs | mr/m | |
| contentType | mr/m | id-gto-warrantyOffer |
| messageDigest | mr/m | digest of attribute digest |
| signingTime | m/m | |
| signingCertificate | mr/m | |
| signatureAlgorithm | mr/m | RSA (PKCS #1) |
| signature | mr/m | |
| unsignedAttrs | o/m | |
| warrantyOffer | mr/o | See Table 4B |
| countersignature | o/o | |

Forwarded Identity Warranty Offer
TABLE 4C

Forwarded Identity Warranty Offer Message

| Field | Support | Notes |
|---|---|---|
| version | Mr/m | 1 |
| digestAlgorithms | Mr/m | SHA-1 (only 1) |
| encapContentInfo | Mr/m | |
| contentType | Mr/m | id-gto-warrantyOffer |
| content | o/m | attribute digest, see Table 4A |
| certificates | m/m | chains from IB and RPB to root |
| certificate | m/m | |
| extendedCertificate | o/o | |
| attrCert | o/o | |
| crls | o/o | |
| signerInfo[0] | mr/m | 2, this one from offer |
| version | mr/m | 1 |
| issuerAndSerialNumber | mr/m | |
| digestAlgorithm | mr/m | SHA-1 |
| signedAttrs | mr/m | |
| contentType | mr/m | id-gto-warrantyOffer |
| messageDigest | mr/m | digest of attribute digest |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |
| signerInfo[1] | mr/m | this one new |
| version | mr/m | 1 |
| issuerAndSerialNumber | mr/m | |
| digestAlgorithm | mr/m | SHA-1 |
| signedAttrs | mr/m | |
| contentType | mr/m | id-gto-warrantyOffer |
| messageDigest | mr/m | digest of attribute digest |
| signingTime | m/m | |
| warrantyOffer | mr/m | See TABLE 4B |
| signingCertificate | mr/m | |
| signatureAlgorithm | mr/m | RSA (PKCS #1) |
| signature | mr/m | |
| unsignedAttrs | o/m | |
| certificate status | mr/m | |
| countersignature | o/o | |

Identity Warranty Acceptance
TABLE 6A

Identity Warranty Acceptance

| Field | Support |
|---|---|
| VERSION | mr/m |
| transactionID | mr/m |
| acceptanceStatus | mr/m |
| extensions | o/m |

TABLE 4.6B

Identity Warranty Acceptance Message

| Field | Support | Notes |
|---|---|---|
| Version | mr/m | 1 |
| DigestAlgorithms | mr/m | SHA-1 (only 1) |
| EncapContentInfo | mr/m | |
| contentType | mr/m | id-gto-warrantyAcceptance |
| content | o/m | Identity Warranty acceptance, see Table 6A |
| certificates | m/m | Chain from RP to root |
| certificate | m/m | |
| extendedCertificate | o/o | |
| attrCert | o/o | |
| crls | o/o | |
| signerInfos | mr/m | only 1 |
| version | mr/m | 1 |
| issuerAndSerialNumber | mr/m | |
| digestAlgorithm | mr/m | SHA-1 |
| signedAttrs | mr/m | |

TABLE 4.6B-continued

Identity Warranty Acceptance Message

| Field | Support | Notes |
|---|---|---|
| contentType | mr/m | id-gto-warrantyAcceptance |
| messageDigest | mr/m | digest of identity warranty acceptance |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |

Forwarded Identity Warranty Acceptance
TABLE 5A

Forwarded Identity Warranty Acceptance Message

| Field | Support | Notes |
|---|---|---|
| version | mr/m | 1 |
| digestAlgorithms | mr/m | SHA-1 (only 1) |
| encapContentInfo | mr/m | |
| contentType | mr/m | id-gto-warrantyAcceptance |
| content | o/m | Identity Warranty acceptance, see Table 6A |
| certificates | m/m | chains from RP and RPB to root |
| certificate | m/m | |
| extendedCertificate | o/o | |
| attrCert | o/o | |
| crls | o/o | |
| signerInfo[0] | mr/m | 2, this one from acceptance |
| version | mr/m | 1 |
| issuerAndSerialNumber | mr/m | |
| digestAlgorithm | mr/m | SHA-1 |
| signedAttrs | mr/m | |
| contentType | mr/m | id-gto-warrantyAcceptance |
| messageDigest | mr/m | digest of identity warranty acceptance |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |
| signerInfo[1] | mr/m | this one new |
| version | mr/m | 1 |
| issuerAndSerialNumber | mr/m | |
| digestAlgorithm | mr/m | SHA-1 |
| signedAttrs | mr/m | |
| contentType | mr/m | id-gto-warrantyAcceptance |
| messageDigest | mr/m | digest of identity warranty acceptance |
| signingTime | m/m | |
| rpBankInfo | mr/m | See Table 3A |
| signingCertificate | mr/m | |
| signatureAlgorithm | mr/m | RSA (PKCS #1) |
| signature | mr/m | |
| unsignedAttrs | o/m | |
| countersignature | o/o | |

Identity Warranty
TABLE 8A

Identity Warranty

| Field | Support |
|---|---|
| VERSION | mr/m |
| transactionId | mr/m |
| signerContract | mr/m |
| warrantyRequest | mr/m |
| warrantyAmount | mr/m |
| warrantyExpires | mr/m |
| warrantyFee | mr/m |
| extensions | o/m |

TABLE 8B

Identity Warranty Message

| Field | Support | Notes |
|---|---|---|
| version | mr/m | 1 |
| digestAlgorithms | mr/m | SHA-1 (only 1) |
| encapContentInfo | mr/m | |
| contentType | mr/m | id-gto-identityWarranty |
| content | o/m | attribute digest, see Table 4A |
| certificates | m/m | Chain from IB to root |
| certificate | m/m | |
| extendedCertificate | o/o | |
| attrCert | o/o | |
| crls | o/o | |
| signerInfos | mr/m | only 1 |
| version | mr/m | 1 |
| issuerAndSerialNumber | mr/m | |
| digestAlgorithm | mr/m | SHA-1 |
| signedAttrs | mr/m | |
| contentType | mr/m | id-gto-identityWarranty |
| messageDigest | mr/m | digest of attribute digest |
| signingTime | m/m | |
| signingCertificate | mr/m | |
| signatureAlgorithm | mr/m | RSA (PKCS #1) |
| signature | mr/m | |
| unsignedAttrs | o/m | |
| identityWarranty | mr/m | see Table 8A |
| countersignature | o/o | |

Forwarded Identity Warranty
TABLE 9A

Forwarded Identity Warranty Message

| Field | Support | Notes |
|---|---|---|
| version | mr/m | 1 |
| digestAlgorithms | mr/m | SHA-1 (only 1) |
| encapContentInfo | mr/m | |
| contentType | mr/m | id-gto-identityWarranty |
| content | o/m | attribute digest, see Table 4A |
| certificates | m/m | chains from IB and RPB to root |
| certificate | m/m | |
| extendedCertificate | o/o | |
| attrCert | o/o | |
| crls | o/o | |
| signerInfo[0] | mr/m | 2, this one from warranty |
| version | mr/m | 1 |
| issuerAndSerialNumber | mr/m | |
| digestAlgorithm | mr/m | SHA-1 |
| signedAttrs | mr/m | |
| contentType | mr/m | id-gto-identityWarranty |
| messageDigest | mr/m | digest of attribute digest |
| signingTime | m/m | |
| signingCertificate | mr/m | |
| signatureAlgorithm | mr/m | RSA (PKCS #1) |
| signature | mr/m | |
| unsignedAttrs | o/m | |
| countersignature | o/o | |
| signerInfo[1] | mr/m | this one new |
| version | mr/m | 1 |
| issuerAndSerialNumber | mr/m | |
| digestAlgorithm | mr/m | SHA-1 |
| signedAttrs | mr/m | |
| contentType | mr/m | id-gto-identityWarranty |
| messageDigest | mr/m | digest of attribute digest |
| signingTime | m/m | |
| signingCertificate | mr/m | |
| identityWarranty | mr/m | see Table 8A |
| signatureAlgorithm | mr/m | RSA (PKCS #1) |
| signature | mr/m | |
| unsignedAttrs | o/m | |
| certificate status | mr/m | |
| countersignature | o/o | |

Identity Warranty Error

TABLE 10A

Identity Warranty Acknowledgement

| Field | Support |
|---|---|
| VERSION | mr/m |
| error | mr/m |
| transactionID | mr/m |
| certStatus | mr/m |

TABLE 10B

Identity Warranty Error Message

| Field | Support | Notes |
|---|---|---|
| Version | mr/m | 1 |
| DigestAlgorithms | mr/m | SHA-1 (only 1) |
| EncapContentInfo | mr/m | |
| ContentType | mr/m | id-gto-warrantyError |
| Content | o/m | Identity Warranty error, see Table 10A |
| Certificates | m/m | Chain from RPB or IB to root |
| Certificate | m/m | |
| ExtendedCertificate | o/o | |
| AttrCert | o/o | |
| Crls | o/o | |
| SignerInfos | mr/m | only 1 |
| version | mr/m | 1 |
| issuerAndSerialNumber | mr/m | |
| digestAlgorithm | mr/m | SHA-1 |
| signedAttrs | mr/m | |
| contentType | mr/m | id-gto-warrantyError |
| messageDigest | mr/m | digest of identity warranty error |
| signingTime | m/m | |
| signingCertificate | mr/m | |
| signatureAlgorithm | mr/m | RSA (PKCS #1) |
| Signature | mr/m | |
| UnsignedAttrs | o/m | |
| Certificate status | mr/m | |
| Countersignature | o/o | |

Database Design

This section describes the Reliance Manager (RM) database, the component used by the four RM services to store and manipulate account information, transaction logs, and management authorization records. In particular, this section describes: the database schema: an enumeration of the tables, their fields, and the inter-table relationships the stored procedures used to retrieve and manipulate database information the class library that provides access the database's stored procedures.

The following terminology is used herein:

Authorization Database: An enumeration of privileges for a (secure) identifier, maintained in a database to authorize management commands.

Assurance: The on-line service that guarantees the identity of a subscriber certificate for a contract signed by the subscriber's private key against a monetary amount of proven losses by the on-line client.

Foreign Key: A column in one database table whose values match those of a primary key in another.

Primary Key: The column or combination of columns in a database table that uniquely identifies the row.

During normal operation, the RM facility requires access to various information, including:

Subscriber and relying party accounts
Transaction logs
Pending management transactions
Management authorization records This information is maintained in an SQL database at the issuing and relying party banks. The RM services use a class library layered on ODBC to access the database. (As used herein, ODBC refers to Open Database Connectivity, an application programming interface (API) that enables writing applications that are independent of any particular database management system (DBMS)) Stored procedures perform the actual data manipulation and retrieval; the primary function of the class library is to bind C++ arguments to those of the stored procedures and then invoke the stored procedures. A preferred embodiment uses SQL Server™ on Windows N™; using ODBC enhances portability to other environments, e.g., Oracle on Unix.

The Guardian database is accessed through ODBC and therefore relies on the availability of an ODBC class library and associated drivers. These components are currently available for the initial target platform (NT/SQL Server). ODBC drivers are available for other databases including Oracle, Informix, and Sybase running on a number of Unix™ variants, including Sun Solaris, HP-UX, and IBM AIX.

The RM architecture depends on a mechanism to identify a database account given one (or possibly more than one) relying party or subscriber certificate. The PKI architecture specification certificate profile stipulates the use of the subjectDirectoryAttributes extension with the guardianAccountNumber attribute as the mechanism for associating certificates to database accounts.

As with any relational database, the information in the RM database is stored in a set of tables. This section describes those tables, their contents, and interrelations.

The database reflects the fact that a bank can simultaneously play the role of both an issuing and relying party bank. Thus, unique account and transaction log tables exist for each role. If a specific bank is serving just one role, the tables associated with the other role are present but remain empty.

Accounts Account information is stored in the subscriber and replying party account tables. Accounts are uniquely identified by an account number, which is available in a certificate's guardianAccountNumber extension attribute. During creation, an account is assigned a parent account number, identifying the account's creator. Accounts are used to apply limits to assurance transactions, and in the case of relying parties, limit certificate status transactions. They are also used to cross reference identity (or warranty) certificates with utility (i.e., SSL) certificates. Finally, accounts contain distinguished names, used during authorization of management commands.

Logs: To support auditing, billing, restoration of assurance upon contract expiration, and rollback in the face of errors, all RM activity is recorded in a set of transaction logs. The subscriber and relying party log tables serve this purpose.

Separate tables are maintained for each class of RM activity, including:

assurance transactions
certificate status requests
management activity (account creation, modification, etc.)
changes to the assurance transaction log To enforce consistency, database updates and the accompanying log operation are performed as atomic actions using SQL transaction statements.

Management Authorization Tables

An authorization model controls the execution of management commands. For example, a bank employee wishing to add a new account must be authorized to do so. The management authorization table contains records specifying the actions (i.e., account creation) a client (i.e., a bank employee) is authorized to perform against specific targets (i.e., a subscriber organization). Clients and targets are specified using distinguished names (DNs)

Pending Management Transactions

RM management service policy requires that management operations be approved before being executed. Building on the previous example, a bank employee might request and be authorized to create an account; a bank manager would expected to eventually approve the request. This model requires that pending management requests be saved in the database until they are approved (or rejected). The pending transaction table holds management requests that are awaiting approval.

Each entry contains sufficient information to reconstruct the requested management transaction, including an action code, an target account (relying or signing party) indicator, client and target DNs, an account number, and a BLOB (binary large object). BLOB content is not interpreted by the database; it is simply a convenient mechanism for the RM management service to store additional command-specific data.

Stored Procedures

Database activity is preferably implemented as a set of stored procedures, which the RM Services access through the RMDB library. Stored procedures are available to perform each of the following actions:

Relying party:
  perform assurance transaction
  log assurance transaction
  create report from assurance transaction log
  perform certificate status transaction
  log certificate status transaction
  create report from certificate status transaction log
  create/edit account
  log create/edit account
  create/edit management authorization record
  log create/edit management authorization record
Signing party:
  perform assurance transaction
  log assurance transaction
  edit assurance transaction log
  log edit assurance transaction log
  create/edit account
  log create/edit account
  create/edit management authorization record
  log create/edit management authorization record Note that under normal circumstances the log functions are invoked atomically as part of the underlying operation. For example, "perform assurance transaction" calls "log assurance transaction" directly during the execution of an assurance transaction. However, the log functions are also accessible directly from higher layers to support error conditions detected by the RM services, such as the receipt of an invalid certificate.

RMDB Library

The RMDB library provides the interface used by the RM services to access the database's stored procedures. There is a one-to-one mapping of functions in the library to database stored procedures. A typical library function binds the set of C++ arguments to those of the stored procedures, invokes the stored procedure, and passes the stored procedure status back to its caller. The library is layered on ODBC to allow for porting to other platforms, such as Unix/Oracle.

Service Capabilities

RM services are all implemented to provide the maximum degree of interoperability, scalability, and availability. RM services preferably use standard protocols for maximum interoperability. At the front end (i.e., the client), RM protocols preferably make use of standard web protocols, data types, and encoding algorithms.

Each of the RM services—Certificate Status, Identity Warranty, Identity Warranty Management—is preferably implemented as HTTP POST/RESPONSE message pairs, where the application payload is CMS.

Using standard protocols minimizes the complexity of the client software. RM messages are designed such that a client only requires the services of signing and CMS plugins to generate certificate status or Requests. Note that response validation and archiving would require additional capabilities.

At the back end (i.e., the database), RM services preferably invoke stored procedures written in standard SQL and accessed through a generic database API. The list of stored procedures fully describes the services required of the database. This approach is designed to allow a variety of databases depending on available services and scalability requirements.

The capability to scale up to large numbers of accounts and a high volume of network traffic requires complex combinations of software and hardware support. RM services are implemented so they can be migrated to platforms that support high scalability.

The implementation architecture preferably makes use of standard and easily-portable programming abstractions for synchronous and asynchronous control flow (e.g., threads) which fit smoothly with and take full advantage of multi-processor systems.

RM services achieve high availability through a mix of software architecture and database services. To implement full-time operation, the RM management service will preferably provide run-time loading and unloading of protocol and other services. Similarly, the software architecture closely monitors and manages constrained resources such as dynamic memory, network connections, and the like.

To recover from local hardware failure and other network disaster scenarios, the RM services may be run in hot-standby mode when combined with a replicating database. The database manages replication and distribution of account and transaction information to a remote site, where a standby server resides off the network. In the event of a power or network failure at the primary site, the company connects the backup site to the network and updates routing information in its network configuration to redirect requests to the new server.

Relying Party Architecture

RP environments are likely to vary widely, from stand-alone command-line tools to a service integrated within application environments such as web browsers or client environments particular to a given bank: SAP, PeopleSoft, etc.

To avoid restricting the RP to any particular client environment, the RM software provides the RP service as a software development kit (RPSDK). The RPSDK includes library functions and documentation for invoking Identity Warranty, Certificate Status, and RM Management services, together with reference clients for all client services.

The RPSDK invokes cryptographic functions through a cryptographic token service interface. For greatest compatibility across token implementations, the RPSDK uses the cryptographic device interface specified by PKCS#11.

Security Considerations

The RM system according to the present invention preferably implements SSL v3, with client certificates and uses this to achieve transport-level integrity and data privacy. The RM servers also use SSL v3 to achieve a limited use host-based authentication.

Application-level security provides authentication and authorization services. Support for application-level privacy is preferably implemented in conjunction with support for encryption-certified private keys and is not planned for the at this time.

RM clients (both Relying Party and administrative) sign requests and RM servers sign responses with keys certified for RM use. RM clients include their certificate chains in their request; RM servers will include their chain in the response in order to reduce the amount of intelligence needed on the client.

To verify message integrity, RM servers and clients use the public keys in their partner's certificate to regenerate and compare signatures on the request and response PDUs.

To authenticate a client, the RM server first uses the account number from the certificate to look up the SSL client certificate for the account from the appropriate RM accounts database. If the account and SSL client certificates are valid, the RM server then checks with the level-one bank and repositories to verify all certificates in the client's certificate chain have been published and that none of the certificates in the client's certificate chain have been revoked.

To prepare a response, the server verifies the non-revoked status of its own certificate chain by sending OCSP queries to the local and repositories. The server includes the OCSP responses, together with the repository signatures, in the PDU it returns to the client.

An RM client authenticates the server's response using local copies of the Root and Bank Repository OCSP Signing Certificates. To authenticate and verify the server's response, the client uses its local copies of the certificate to verify the signatures on the OCSP responses. Then, it verifies the non-revoked status of the RM server certificate, and finally it uses the public key in the RM server certificate to verify the signature on the response PDU.

To provide non-repudiation for the responses the server sends to the client, the server saves copies of the CMS SignedData messages, with their SignerInfo signatures and certificates.

Authorization varies per transaction type. The RPBIWS authorizes Requests against the Spending Balance and Spending Limit in the Relying Party Identity Warranty Account. The IBIWS authorizes Forwarded Requests against the Identity Warranty Balance and Limits in the Signing Party Identity Warranty Account and Signing Party Group Account (if one exists). Administrative commands are authorized by the records in the IWMS Authorization Database and by the approver quorum.

The following assumptions are made regarding preferred embodiments of the present invention:

1. All entities in a Guardian (RM) transaction are authorized participants of the certificate infrastructure and have been issued a authenticated certificate.
2. Guardian (RM) provides the interface between Issuing Banks and Relying Party Bank and interfaces with the Repository. Communication with the bank and root repositories uses OCSP for status checking.
3. Private Keys are distributed in tamper-resistant hardware (e.g., smart cards, PCMCIA etc.).
4. Guardian (RM) will be installed and initialized offline.
5. Communication between Signing Party and Replying Party is out of band of the private banking network.
6. Signing Party sends Replying Party digitally signed contract with all the necessary information for Guardian (RM) processing.
7. A request for an increase in an Issuing Bank's assurance limit is communicated offline.
8. Signing Party's initialization process includes request for modification of assurance level, as initial assurance level is set at zero.
9. Message flow covers assurance request and certificate status check 10. Guardian (RM) maintains a database of all transactions of its clients, including assurance accounts of all of its clients.
11. Guardian (RM) takes no liability for caching; therefore, each assurance request requires an active certificate check.
12. Each PFI is responsible for synchronizing time on the server in accordance with the system rules.
13. System rules define and resolve any issues associated with exchange rates.
14. When an identity warranty certificate is issued a utility certificate is issued. When an identity warranty certificate is revoked, a utility certificate is revoked.

Functional Requirements

The following functional requirements are made regarding preferred embodiments of the present invention:

Assurance Accounts—Each subscriber receiving a TBL Certificate preferably has an assurance account in their Issuing Bank's Guardian (RM) database. This database identifies the Signing Party by an account identifier. The Guardian (RM) assurance database contains information on each Signing Party's allowable aggregate assurance and current outstanding assurance. (Initialization of assurance accounts occurs in conjunction with the issuance of the certificate, with the corporate entity requesting assurance limits for each Signing Party.)

Management of Assurance Accounts—Assurance accounts are preferably managed on an account-by-account basis. There is preferably complete protection between closed user groups. No information particular to one customer may be compromised by information from another user.

Assurance and Status Requests—Requests for assurance or status must preferably be logged. Guardian (RM) must preferably never grant an assurance request if there is insufficient assurance available in the relevant SP account.

Reason Codes—All responses for assurance must preferably be able to carry reason codes that describe reasons for responses, especially refusal of assurance, as well as other state information of entities in the response path that may be relevant.

The message sent by an RPB to the RP in response to an assurance request is preferably sufficiently signed by all appropriate parties, that RP need validate the signatures on the response and the certificates of the signatories of the response.

Logs—Guardian (RM) preferably records of all transactions, including rejected transactions.

Logs—All Guardian (RM) transactions are preferably time-stamped.

Reports—Guardian (RM) preferably generates on demand reports containing information about all transactions that it processes, including assurance modifications and account requests.

Reports—RPB must preferably be able to dynamically view status of RP transactions.

Assurance Transaction—Signing Party must preferably be able to limit the amount of assurance on a transaction.

Assurance Transaction—Banks can preferably set pricing for identity warranty requests offered through Guardian (RM).

Assurance Transaction—Assurance transactions are preferably classified by category codes (e.g., FX for foreign exchange, PURCH for corporate purchasing, EMAIL for S/MIME, etc). This classification allows collection of data so those banks can track risk associated with certain types of transactions.

Billing and Payment for Services—Payment is preferably done out of band based upon detailed transaction reporting to banks.

Payment for Assurance—Guardian (RM) preferably maintains authorized spending accounts for customers. Guardian (RM) preferably denies assurance request when designated spending account for an assurance transaction that has been exceeded.

Billing Dispute—Dispute resolution is preferably done manually, based upon system rules.

Claims Processing—claims processing is preferably done manually, based upon system rules.

Claims Processing—Guardian (RM) must preferably implement appropriate rules for handling requests for assurance after being notified of a claim.

Claims Processing—A Unique Transaction ID is preferably generated at Signing Party that follows the life of a transaction.

User Interface (UI)—UI must preferably be consistent across Guardian (RM) components and straight forward to use.

Distributed Operation—Guardian (RM) must preferably be able to be operated at each Level 1 PFI.

System Requirements

The following system requirements are made regarding preferred embodiments of the present invention:

Guardian (RM) processing should preferably take no more than thirty (30) seconds per transaction with five concurrent transactions, assuming no public network latency.

Payload Based Design—To the extent possible, protocols should focus on message content, not the definition of new or modification of existing transport protocols. (This requirement must be balanced with the need to maintain adequate security.)

Standards-Based Design—Protocols are preferably standards-based (e.g., HTTP/SSL, SMTP/SMIME) where this is consistent with operational and security requirements.

Implement Four-Corner Messaging Model—Requests and responses must preferably work within the four corner model whereby RPs communicate by/through their RPB and Signing Parties through their Issuing Bank.

Extensibility—A system according to the present invention is preferably designed to facilitate addition of new request/response types, field values and parameters subject to the approval of these parameters in the PKI.

Integration—A system according to the present invention is preferably compatible with end user and server-based integration, avoiding unnecessary requirements for additional PIN or password based authentication.

Deployment—A system according to the present invention should preferably minimize use of specialized software and custom protocols. System should leverage the PKI.

Audit—A system according to the present invention should preferably have a robust audit mechanism to aid in dispute resolution.

Internationalization Support—A system according to the present invention preferably must be able to address internationalization concerns.

Certificates—A system according to the present invention should preferably be able to handle certificate expiration and revocation.

Operational Requirements

The following operational requirements are made regarding preferred embodiments of the present invention:

The cumulative total processing time for each step shall preferably not exceed the limit set forth in the system requirements, and the time for any single step in the chain shall preferably not exceed one-third of that limit.

Certificate Capacity—A system according to the present invention should preferably be able to handle up to 100,000 accounts.

Usage—System operations must preferably be available on a continuous use basis (24×7). Guardian (RM) must preferably be engineered such that hardware failures, maintenance, upgrades, and other system wide events do not affect the availability of the overall system as seen by end users. The system should preferably have the ability to securely roll operations to a full backup system running in a different location without a significant degradation in performance. Full 24×7 availability may be achieved over time by a phased set of rollovers, with each system participating for some fraction of the 24×7 cycle.

Deployment—A system according to the present invention should preferably allow for processing at application servers within the Signing Party/Relying Party's company.

System Integration—Guardian (RM) preferably uses standards (i.e., OCSP, SSL v3, etc.) making it easier to integrate with other systems and network services.

Backup—A system according to the present invention should preferably be able to create full and delta backups of all Guardian (RM) data.

Audit Logs—A system according to the present invention should preferably be able to keep full logs of all requests from a corporation for changes to Signing Party's assurance account.

Access Control—No request from one corporation or user group may in any way change the information or policies for a Signing Party in another corporation.

Security Requirements

Hardware Tokens—Cryptographic aspects and signing must preferably be hardware-based such as smartcards and PCMCIA devices.

Hardware Tokens—Cryptography must preferably be implemented using best available algorithms at the time e.g., RSA, DES, Triple DES, and SHA1.

Transport Level Security—Guardian (RM) must preferably provide standards based transport layer security for all system communications.

Application Level Security—For high value transactions, Guardian (RM) must preferably provide end-to-end application layer integrity.

Auditability—The signed assurance requests and records of action taken by Guardian (RM) are part of records provided to the involved banks. These records are preferably protected against alternation and transmitted securely.

Secret Keys—There is preferably a standard procedure for replacing the Guardian (RM) secret keys.

Secret Keys—There is preferably a method for reasonably recovering from known compromise of a Guardian (RM) secret key.

Access Control—Guardian (RM) preferably protects account information from unauthorized outside access.

Communication Security—Communications between Guardian (RM) and the banks that establish or alter user accounts preferably have integrity and confidentiality protection. Techniques preferably support non-repudiation.

Communication Security—Parameters associated with the transmission of assurance request and the response preferably have integrity and where necessary confidentiality protection. Request and response preferably support non-repudiation.

Identity Warranty Service (IWS)

The Guardian (RM) Identity Warranty Service guarantees the identity of a warranty certificate for a contract signed by the associated private key. The guarantee is against a monetary amount of proven losses by the Relying Party.

The following requirements are made regarding assurance accounts in preferred embodiments of the present invention:
1. Subscribers receiving an Identity Warranty Certificate will have an assurance account in their Issuing Bank's Guardian (RM) database. This account must be created by the Issuing Bank.
2. The account identifier is unique within the bank.
3. The Guardian (RM) account contains information on each Signing Party's maximum allowable aggregate assurance.
4. The Guardian (RM) account contains information on each Signing Party's current outstanding assurance.
5. When an assurance account is created, the assurance limits will be established by the corporate entity requesting assurance limits for each Signing Party.
6. Guardian (RM) maintains authorized spending information for each account.
7. Guardian (RM) must deny assurance requests that would exceed the Signing Party account balance.

The following requirements are made regarding Assurance Transactions (request/offer/accept) in preferred embodiments of the present invention:
1. Signing Party may be able to limit the amount of assurance on a transaction.
2. Signing Party may be able to set expiration on when assurance may be requested
3. SP may designate the specific RP that may request assurance.
4. Banks will be able to set pricing for assurance requests.
5. Amount requested in Identity Warranty request by the RP would be amount offered by the IB if an offer were made.
6. Warranty request does not include business document but does include hash of the document for identification.
7. Requesting assurance produces offer, which includes fee information, and this may be accepted or rejected by RP.
8. The RP is not required to respond to an offer. If no response is made, the offer will expire after an expiration period.
9. The mechanism shall not preclude requesting assurance which is immediately granted without requiring an offer or acceptance. This is useful in an 800 number type service where the RP does not pay for the assurance (e.g., It is prepaid or paid by the Signing Party).
10. RP only deals with RPB, SP with IB.

The following requirements are made regarding Assurance Transactions (Signatures and Security) in preferred embodiments of the present invention:
1. To trust an assurance message, the Relying Party need only verify the information in the assurance message: the signature of the Relying Party Bank, the certificate of the Relying Party Bank, the status of the Relying Party Bank signed by the Root Repository, and the certificate of the Root Repository
2. All assurance messages are signed using Identity Warranty certificates of the parties involved.
3. All parties in transaction must sign messages using their appropriate PKI identity, using their appropriate Identity Warranty certificate.
4. The Identity Warranty service identity private key are stored on hardware token.

The following requirements are made regarding the use of standards in preferred embodiments of the present invention:
1. CMS is used to encode assurance transaction data.
2. SSL v3 with client authentication is used to transport assurance transactions.
3. The RP SSL client certificate must be a Utility certificate. An entry for this Utility Certificate must appear in the account associated with the Identity Warranty Certificate used to sign the Identity Warranty message. The Identity Warranty service does not need to check for revocation of this utility certificate since it is paired with the Identity Warranty certificate.

The following requirements are made regarding the Integration with Bank Systems in preferred embodiments of the present invention:
1. Provide callout to allow pricing of warranty offer at both RPB and IB.
2. Provide callouts for currency conversions at both RPB and IB.

The following requirements are made regarding Authorization in preferred embodiments of the present invention:
1. Support RPB authorization callout of RP warranty request.
2. Support IB authorization callout of RPB forwarded warranty request.
3. Support RPB authorization callout of RP warranty accepts.
4. Support IB authorization callout of RPB warranty accepts.
5. Support RPB authorization callout of RP certificate status requests.

The following requirements are made regarding Management, billing and Administration in preferred embodiments of the present invention:
1. All assurance transaction messages will be saved for subsequent use in claims processing.
2. All claims processing is out of band, with no protocol or Guardian (RM) processing defined.

3. Assurance transactions are classified by category codes (e.g., FX for foreign exchange, PURCH for Corporate purchasing; EMAIL for S/MIME, etc)—this will allow collection of data so that banks will be able to track risk associated with certain types of transactions.
4. Adequate records are kept so that banks can bill for each RP warranty request.

Certificate Status Service (CSS)

The Certificate Status Service (CSS) determines whether or not a certificate was issued by a Certificate Authority (CA) and whether or not the certificate has not been revoked.

On-line Certificate Status Protocol (OCSP) is a protocol that responds to queries about the existence and status of a certificate; a central design goal is to eliminate the need for client-side CRL processing. The OCSP is preferably implemented by repositories. As used herein, an OCSP Responder is a server that responds to OCSP queries.

In preferred embodiments of the present invention, regarding the use of OCSP:
1. Guardian (RM) provides the Relying Party the ability to request status of Identity Warranty Certificates as well as Utility Certificates.
2. Guardian (RM) responds to OCSP requests from a Relying Party with OCSP responses.
3. Guardian (RM) responds to OCSP requests from other registered Guardian (RM) with OCSP responses.
4. Guardian (RM) is able to process OCSP v1.0 as defined by the IETF.
5. Guardian (RM) signs OCSP requests and responses with the private key associated with its Certificate Status identity certificate. This identity is separate from the other Guardian (RM) identities such as that associated with the Identity Warranty and Identity Warranty management services.

In preferred embodiments of the present invention, regarding status service:
1. Each Guardian (RM) maintains configuration data to determine which non-local Guardian (RM) to contact for certificate validation, based on the certificate issuer DN.
2. OCSP requests to non-local Guardian (RM)s are new requests signed by the local Guardian (RM). Forwarded responses are resigned using the Guardian (RM) Certificate Status identity.
3. Relying Party and peer Guardian (RM) identities are validated when processing OCSP requests.

In preferred embodiments of the present invention, regarding standards: The identity and utility certificates are linked. The SSL v3 with client authentication must be the utility certificate issued in conjunction with the identity warranty certificate.

In preferred embodiments of the present invention, regarding Signatures and Security:
1. All RP OCSP requests must be signed using the RP Identity Warranty certificate and include the certificate path for the RP Identity Warranty certificate.
2. Guardian (RM) always validates remote Guardian (RM)s and its CertValidator by contacting the root. No caching is performed.
3. The Guardian (RM) Certificate Status private key and certificate are stored on hardware token.
4. Utility and Identity Warranty certificates used in Guardian (RM) processing must conform to the Architecture certificate profiles. Guardian (RM) must be able to process certificates conforming to these profiles.

In preferred embodiments of the present invention, regarding Management, Billing and Administration:
1. All OCSP transactions are logged.
2. Adequate records are kept so that banks can bill for each RP warranty request.

Identity Warranty Management Service

The Identity Warranty Management Service implements management actions for the Guardian (RM) Server.

In preferred embodiments of the present invention, regarding Identity Warranty Management Service Administration:
1. Each Guardian (RM) has a local database that contains information about its Identity Warranty Accounts.
2. Guardian (RM) provides access for one administrator on initial installation.
3. Guardian (RM) validates the administrator certificate chain prior to allowing the administrator use of the system.
4. Guardian (RM) allows for control of operations with the capability to edit peer configuration data, etc.

In preferred embodiments of the present invention, regarding Identity Warranty Management Service Management of Assurance Accounts:
1. Guardian (RM) allows the administrator to create, modify or delete Identity Warranty Accounts.
2. Guardian (RM) can manage and view as appropriate:
Identity Warranty Accounts
Identity Warranty Transaction Log
IB internal list of outstanding targets
RPBIWS Identity Warranty Transaction Log
IBIWS Transaction Log
CSS Log Identity Warranty Accounts
3. Guardian (RM) must protect customer information. No information particular to one customer may be compromised by information from another user.

In preferred embodiments of the present invention, regarding Identity Warranty Management Service Monitoring: Service monitoring commands are preferably implemented in HTTP POST/RESPONSE message against HTTPS URL and authorized against the client's SSL identity (Utility) Certificate.

In preferred embodiments of the present invention, regarding Identity Warranty Management Service Reports:
1. Guardian (RM) can generate on demand reports containing the following information:
Status of Guardian (RM) Services.
All Identity Warranty Transactions since requested time.
Accounts with Identity Warranty balance equal to Identity Warranty limit.
2. RPB can dynamically view status of RP transactions.

In preferred embodiments of the present invention, regarding Identity Warranty Management Service Logging:
1. Guardian (RM) logs information related to status of server application.
2. All Guardian (RM) transactions must be time-stamped.
3. Guardian (RM) logs all Identity Warranty and OCSP messages including:
Identity Warranty messages it receives from RP client.
Identity Warranty messages it receives from other Guardian (RM) servers.
Identity Warranty messages it generates itself.
Certificate Status (OCSP) messages it receives from OCSP responders.

Certificate Status (OCSP) messages it receives from the local CertValidator.

Certificate Status (OCSP) messages it receives from the CertValidator.

Certificate Status (OCSP) messages it receives from other Guardian (RM) Servers.

Guardian (RM) logs all changes to the Identity Warranty Account.

In preferred embodiments of the present invention, regarding Identity Warranty Management Service Claims Processing:

1. Guardian (RM) must implement appropriate rules for handling requests for assurance after being notified of a claim.
2. Guardian (RM) Server must also be able to update assurance accounts when claims are resolved.
3. Guardian (RM) detects reuse of old transaction identifiers.

Hardware Requirements (HDW)

Although the system according to the present invention can operate on any appropriate computer system, an implementation of the system shall preferably operate on the following a minimum hardware/software platform:

Hardware
Pentium Pro 450
128 Mbytes RAM
8–10 Gbyte SCSI Drives
Network Card (TBD)
Hardware Token Reader (TBD)
Hardware Token (TBD)
Software
Windows NT 4.0 w/Service Pack 3
Hardware Token Drivers
Microsoft SQL Server v 7

Guardian (RM) will preferably require separate hardware and software for each configuration. No other software applications should be installed.

Performance Requirements (PER)

To ensure reasonable response times for both requests and reporting, a preferred embodiment will meet the following requirements: Guardian (RM) processing should take no more than thirty (30) seconds per transaction with five (5) concurrent transactions, subject to public network latency.

Security

Crypto and signing must preferably be hardware-based such as with smartcards and PCMCIA devices. Cryptographic algorithms must preferably be standard. e.g., RSA, DES, Triple DES, and SHA1.

Guardian (RM) must preferably provide standards-based transport layer security for all system communications. Guardian (RM) must preferably provide end-to-end application layer integrity.

Auditability—The signed assurance requests and records of action taken by Guardian (RM) are preferably part of records provided to the involved banks. These records are preferably protected against alternation and transmitted securely.

There is preferably a standard procedure for replacing Guardian (RM) secret keys. Also, there is preferably a method for reasonably recovering from known compromise of a Guardian (RM) secret key.

Guardian (RM) preferably protects account information from unauthorized outside access.

Communications between Guardian (RM) and the banks that establish or alter user accounts preferably have integrity and confidentiality protection. Techniques preferably support non-repudiation for integrity.

Parameters associated with the transmission of assurance request and the response preferably have integrity and where necessary confidentiality protection. Request and response support non-repudiation.

Guardian (RM) preferably protects account information from unauthorized outside access.

Standards (STD)

CMS will preferably be used to encode all Identity Warranty messages.

A system according to the present invention shall preferably support at least the September 1998 draft of the On-line Certificate Status Protocol (OCSP) specification—<draft-ietf-pkix-ocsp-07.txt>. The OCSP responds to queries about the existence and status of a certificate; a central design goal is to eliminate the need for client-side CRL processing. The OCSP is preferably implemented by repositories.

The system shall preferably support SSL version 3.

The system shall preferably use HTTP over SSL for administration and management.

Card and Signature Security Data

The Card and Signature Security Data (CSSD) is a signature over the hash of the transaction, and several data items maintained on the card. These items preferably include:

a) card number
b) warranty signature version number
c) card authentication cryptogram version number
d) warranty transaction counter
e) utility transaction counter
f) CSSD counter
g) cardholder verification results This information may be used by the issuing bank's risk management processes, to detect fraudulent use of the card.

If a signature scheme with recovery is used, these items may be carried in the signature block and recovered during signature verification. If not, the items must be conveyed as one or more additional attributes. In any case, the signature itself must be conveyed as an attribute (which need not be signed). Design of these additional attributes will be completed once the signature scheme is determined.

Management Protocol

This sections defines a management protocol for Reliance Manager. In particular, the messages between an RM administrator (RMA) and RM are defined.

The protocol is based on the use of CMS (formerly PKCS #7) to encapsulate transactions, using the CMS signedData construct. The individual messages are specified and encoded using ASN.1 DER (which is also used for CMS itself). The signedData instance may be further encoded for transfer (e.g., using base64 encoding), and further protection (e.g., SSL or S/MIME) may be applied, although these features are not discussed further in this paper. The identity of the signer is contained in its certificate chain. The message flow is shown in the diagram in FIG. 30.

Figure 30:
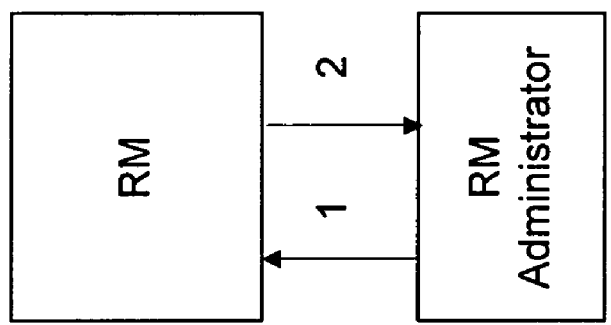
FIG. 30 depicts Management Protocol Message Flows according to some embodiments of this invention.

With reference to FIG. 30, the messages are follows:

1. Management Command
2. Status

Management Protocol

This section defines the formats of the management protocol messages. The management protocol comprises a single request/response round trip between RM administrator and the RM Administration Service.

Management protocol messages are encapsulated using CMS SignedData as the message content.

The content of the request is the management command. The content of the response is the management command status.

The message originator assembles and signs the message content and additional authenticated or unauthenticated attributes (i.e. SignerInfo).

Management Request

To start an assurance transaction, the RM Administrator creates a CMS SignedData message containing the adminRequest structure, whose syntax is specified below. The content type for the message is "management command"; this is included as the message content signed attribute, per the CMS specification.

```
AdminRequest ::= SEQUENCE {2
        version         Version,
        command         AdminCommandType,
        target          AdminTargetType,
        balance         [1] MonetaryValue OPTIONAL,
        certificate     [2] X509 OPTIONAL,
        ...
        extensions      Extensions OPTIONAL - none currently
defined}
AdminCommandType ::= ENUMERATED { create(0), modify(1),
read(2), delete(3), ... }
AdminTargetType ::= ENUMERATED { idWarrantyAccount(0),
idWarrantyRecord(1), idWarrantyXAction(2), authorizationDb(3), ... }
- target database
```

Management Response

To respond to an assurance transaction, the RM Administration service creates a CMS SignedData message containing the adminResponse structure, whose syntax is specified below. The content type for the message is "management response"; this is included as the message content signed attribute, per the CMS specification.

```
AdminResponse ::= SEQUENCE {
        version         Version,
        status          AdminStatusType,
        ...
        extensions      Extensions OPTIONAL - none currently
defined}
AdminStatusType ::= ENUMERATED { ok(0), noPermission(1),
badCert(2) ... }
```

Thus, a reliance manager for an electronic transaction system is provided. One skilled in the art will appreciate that the present invention can be practiced by other than the described embodiments, which are presented for purposes of illustration and not limitation, and the present invention is limited only by the claims that follow.

What is claimed is:

1. An electronic transaction system comprising:
    an authority issuing electronic signals representing subscriber assurance of an attribute of a subscriber to the system; and
    a reliance server obtaining electronic signals representing information regarding the subscriber assurance issued by the issuing authority, the reliance server issuing electronic signals representing a signed warranty offer to a relying party, the signed warranty offer being based at least on the subscriber attribute assurance, wherein the reliance server only provides the signed warranty offer if the relying party is authorized to make a request for said warranty.

2. A system as in claim 1 wherein the reliance server uses a secure hardware device to sign the warranty.

3. A system as in claim 2 wherein the secure hardware device contains a key certified by a certification authority.

4. A system as in claim 1 wherein the reliance server bases a decision to sign the warranty offer on criteria including
    (a) attributes of an issuing authority certificate,
    (b) attributes concerning the issuing authority that are not contained in an issuing authority certificate, and
    (c) attributes of the request for said warranty.

5. A system as in claim 1 wherein the reliance server bases a decision to sign the warranty offer on criteria which are defined through scripts.

6. A system as in claim 1 wherein the reliance server treats each request from a particular relying party independently of all other requests from the same relying party.

7. A system as in claim 1 wherein each request from a particular relying party includes information that allows the reliance server to determine the policy regarding issuance of a signed warranty offer.

8. A system as in claim 1 wherein the reliance server produces secure logs of all transactions.

9. A system as in claim 1 wherein the warranty being offered to a relying party is conditioned to be rolled back if the relying party does not accept the offer within a set time limit.

10. A system as in claim 1 wherein the issuing authority limits a level of warranty.

11. A system as in claim 10 wherein the issuing authority limits the level of warranty by setting overall limits for any transaction.

12. A method of managing reliance in an electronic transaction system, the method comprising:
    an issuing bank (IB) providing a transaction bearing liability (TBL) certificate to a subscriber;
    the subscriber forming and signing a transaction, the signed transaction including information contained in the TBL certificate, and forwarding the signed transaction to a relying party;
    the relying party forwarding an assurance request based on the transaction to a relying party bank;
    the relying party bank issuing a signed warranty offer to the relying party, the signed warranty offer being based at least on information in the TBL certificate, wherein the relying party bank only provides the signed warranty offer if the relying party is authorized to make a request for said warranty.

13. A method as in claim 12 wherein the relying party bank uses a secure hardware device to sign the warranty.

14. A method as in claim 13 wherein the secure hardware device contains a key certified by a certification authority.

15. A method as in claim 12 wherein the relying party bank bases a decision to sign the warranty offer on criteria including
    (a) attributes of the TBL certificate,
    (b) attributes concerning the issuing bank that are not contained in a certificate, and
    (c) attributes of the request for said warranty.

16. A method as in claim 12 wherein the relying party bank bases a decision to sign the warranty offer on criteria which are defined through scripts.

17. A method as in claim 12 wherein the relying party bank treats each request from a particular relying party independently of all other requests from the same relying party.

18. A method as in claim 12 wherein a request from a particular relying party includes information that allows the relying party bank to determine the policy regarding issuance of a signed warranty offer.

19. A method as in claim 12 further comprising:
the relying party bank producing secure logs of all functions.

20. A method as in claim 12 further comprising:
rolling back the warranty being offered to the relying party if the relying party does not accept the offer within a set time limit.

21. A method as in claim 12 further comprising:
the issuing bank limiting a level of warranty.

22. A method as in claim 21 wherein the issuing bank limits the level of warranty by setting overall limits for any transaction.

23. A method as in claim 12 wherein the relying party forwards the assurance request using an open network protocol.

24. A method as in claim 12 further comprising:
the relying parry bank verifying that the relying party is authorized to make the request, the verification being based on a relying party's identity certificate and on attributes determined by the relying party bank.

25. A method as in claim 12 further comprising:
by the relying party bank, maintaining a warranty account to track warranties that have been issued for each relying party.

26. A method as in claim 12 further comprising:
by the relying party bank, maintaining a record of outstanding warranties that have been issued for a group of relying party accounts.

27. A method as in claim 12 further comprising:
by the relying party bank, providing alert messages when certain warranty thresholds have been reached.

28. A method as in claim 12 further comprising:
by the relying party bank, making requests for information from other systems to determine whether or not to issue the warranty offer.

29. A system as in claim 5, wherein the scripts are configured under a secure administration process.

30. A system as in claim 10, wherein the level of warranty is configured to be given for each transaction.

31. A method as in claim 16, wherein the scripts are configured under a secure administration process.

32. A method as in claim 21, wherein the level of warranty is configured to be given for each transaction.

33. A method as in claim 24, wherein the verification based on attributes determined by the relying party bank is based on information requested by the relying party bank from other systems.

* * * * *